(12) United States Patent
Morishita et al.

(10) Patent No.: US 11,268,181 B2
(45) Date of Patent: *Mar. 8, 2022

(54) HOT-DIP GALVANIZED STEEL SHEET

(71) Applicant: NIPPON STEEL CORPORATION, Tokyo (JP)

(72) Inventors: Atsushi Morishita, Tokyo (JP); Taihei Kaneto, Tokyo (JP); Satoshi Uchida, Tokyo (JP); Tatsuya Nakada, Tokyo (JP); Yuji Yamaguchi, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 155 days.

This patent is subject to a terminal disclaimer.

(21) Appl. No.: 16/633,529

(22) PCT Filed: Jul. 31, 2017

(86) PCT No.: PCT/JP2017/027637
§ 371 (c)(1),
(2) Date: Jan. 23, 2020

(87) PCT Pub. No.: WO2019/026106
PCT Pub. Date: Feb. 7, 2019

(65) Prior Publication Data
US 2020/0232083 A1    Jul. 23, 2020

(51) Int. Cl.
*C22C 38/06* (2006.01)
*C22C 38/04* (2006.01)
(Continued)

(52) U.S. Cl.
CPC .............. *C23C 2/06* (2013.01); *B32B 15/01* (2013.01); *B32B 15/012* (2013.01);
(Continued)

(58) Field of Classification Search
CPC ..... B32B 15/01; B32B 15/013; B32B 15/012; B32B 15/014; B32B 15/043; B32B 15/18;
(Continued)

(56) References Cited

U.S. PATENT DOCUMENTS

| 10,953,631 B2 * | 3/2021 | Morishita ............... C22C 38/54 |
| 2004/0234807 A1 | 11/2004 | Suzuki et al. |

(Continued)

FOREIGN PATENT DOCUMENTS

| CN | 101984130 A | 3/2011 |
| JP | 9-176815 A | 7/1997 |

(Continued)

OTHER PUBLICATIONS

International Search Report for PCT/JP2017/027637 dated Oct. 24, 2017.

(Continued)

*Primary Examiner* — Michael E. La Villa
(74) *Attorney, Agent, or Firm* — Birch, Stewart, Kolasch & Birch, LLP

(57) ABSTRACT

A hot-dip galvanized steel sheet including: a hot-dip galvanizing layer on at least one side of a base steel sheet. The hot-dip galvanizing layer has a Fe content of more than 0% to 3.0% and an Al content of more than 0% to 1.0%. The hot-dip galvanized steel sheet includes a Fe—Al alloy layer provided on an interface between the hot-dip galvanizing layer and the base steel sheet and a fine-grain layer provided in the base steel sheet and directly in contact with the Fe—Al alloy layer. The Fe—Al alloy layer has a thickness of 0.1-2.0 µm. The fine-grain layer has an average thickness of 0.1-5.0 µm, includes a ferrite phase with an average grain diameter of 0.1-3.0 µm, and contains oxides of one or more out of Si and Mn, a maximum diameter of the oxides being 0.01-0.4 µm.

8 Claims, 1 Drawing Sheet

(51) Int. Cl.
*C22C 38/00* (2006.01)
*C22C 38/02* (2006.01)
*C23C 2/06* (2006.01)
*C23C 2/40* (2006.01)
*C23C 2/02* (2006.01)
*B32B 15/01* (2006.01)
*C21D 9/48* (2006.01)
*C21D 8/04* (2006.01)
*C21D 6/00* (2006.01)
*C23C 2/28* (2006.01)
*C22C 38/08* (2006.01)
*C22C 38/12* (2006.01)
*C22C 38/14* (2006.01)
*C22C 38/16* (2006.01)
*C22C 38/18* (2006.01)
*C21D 8/02* (2006.01)
*C21D 9/46* (2006.01)
*C22C 38/58* (2006.01)
*C22C 38/42* (2006.01)
*C22C 38/44* (2006.01)
*C22C 38/48* (2006.01)
*C22C 38/54* (2006.01)
*C22C 38/20* (2006.01)
*C22C 38/22* (2006.01)
*C22C 38/26* (2006.01)
*B32B 15/04* (2006.01)
*C22C 38/24* (2006.01)
*C22C 38/50* (2006.01)
*C22C 38/28* (2006.01)
*C22C 38/38* (2006.01)
*C22C 38/40* (2006.01)
*C22C 38/46* (2006.01)
*B32B 15/18* (2006.01)
*C22C 38/32* (2006.01)
*C23C 30/00* (2006.01)
*C23C 2/12* (2006.01)
*C23C 2/26* (2006.01)
*C23C 28/00* (2006.01)
*C23C 28/02* (2006.01)

(52) U.S. Cl.
CPC ............ *B32B 15/013* (2013.01); *B32B 15/04* (2013.01); *B32B 15/043* (2013.01); *B32B 15/18* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0257* (2013.01); *C21D 8/0263* (2013.01); *C21D 8/0405* (2013.01); *C21D 8/0426* (2013.01); *C21D 8/0436* (2013.01); *C21D 8/0473* (2013.01); *C21D 9/46* (2013.01); *C21D 9/48* (2013.01); *C22C 38/00* (2013.01); *C22C 38/001* (2013.01); *C22C 38/002* (2013.01); *C22C 38/004* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/02* (2013.01); *C23C 2/12* (2013.01); *C23C 2/26* (2013.01); *C23C 2/28* (2013.01); *C23C 2/40* (2013.01); *C23C 28/025* (2013.01); *C23C 28/028* (2013.01); *C23C 28/3225* (2013.01); *C23C 30/00* (2013.01); *C23C 30/005* (2013.01); *C21D 2211/001* (2013.01); *C21D 2211/002* (2013.01); *C21D 2211/005* (2013.01); *C21D 2211/008* (2013.01); *Y10T 428/12757* (2015.01); *Y10T 428/12792* (2015.01); *Y10T 428/12951* (2015.01); *Y10T 428/12958* (2015.01); *Y10T 428/12972* (2015.01); *Y10T 428/12979* (2015.01)

(58) Field of Classification Search
CPC ....... C22C 38/00; C22C 38/58; C22C 38/001; C22C 38/002; C22C 38/02; C22C 38/06; C22C 38/08; C22C 38/16; C22C 38/22; C22C 38/26; C22C 38/28; C22C 38/32; C22C 38/38; C22C 38/04; C22C 38/12; C22C 38/14; C22C 38/18; C22C 38/20; C22C 38/24; C22C 38/40; C22C 38/42; C22C 38/44; C22C 38/46; C22C 38/48; C22C 38/50; C22C 38/54; C22C 38/005; C22C 38/004; C23C 30/00; C23C 30/005; C23C 2/06; C23C 2/40; C23C 2/12; C23C 2/26; C23C 2/28; C23C 28/3225; C23C 28/025; C23C 28/028; C23C 2/02; C21D 6/001; C21D 6/002; C21D 6/005; C21D 6/008; C21D 2211/001; C21D 2211/002; C21D 2211/005; C21D 2211/008; C21D 8/0205; C21D 8/0226; C21D 8/0263; C21D 8/0257; C21D 8/0405; C21D 8/0426; C21D 8/0436; C21D 8/0473; C21D 9/46; C21D 9/48; Y10T 428/12757; Y10T 428/12792; Y10T 428/12951; Y10T 428/12958; Y10T 428/12972; Y10T 428/12979
See application file for complete search history.

(56) References Cited

U.S. PATENT DOCUMENTS

| | | | |
|---|---|---|---|
| 2007/0051438 A1 | 3/2007 | Honda et al. | |
| 2014/0234660 A1 | 8/2014 | Kawata et al. | |
| 2014/0255724 A1 | 9/2014 | Yamanaka et al. | |
| 2014/0287263 A1 | 9/2014 | Kawata et al. | |
| 2015/0191813 A1* | 7/2015 | Maki | C23C 2/26 148/531 |
| 2017/0305114 A1 | 10/2017 | Kawata et al. | |
| 2017/0313028 A1 | 11/2017 | Kawata et al. | |
| 2017/0314115 A1 | 11/2017 | Kawata et al. | |
| 2017/0314116 A1 | 11/2017 | Kawata et al. | |
| 2018/0010207 A1 | 1/2018 | Futamura et al. | |
| 2020/0230918 A1* | 7/2020 | Morishita | C22C 38/26 |

FOREIGN PATENT DOCUMENTS

| | | |
|---|---|---|
| JP | 11-140587 A | 5/1999 |
| JP | 2001-26853 A | 1/2001 |
| JP | 2001-303226 A | 10/2001 |
| JP | 2002-88459 A | 3/2002 |
| JP | 2003-55751 A | 2/2003 |
| JP | 2003-96541 A | 4/2003 |
| JP | 2005-60742 A | 3/2005 |
| JP | 2005-60743 A | 3/2005 |
| JP | 2005-200750 A | 7/2005 |
| JP | 2008-19465 A | 1/2008 |
| JP | 2011-111675 A | 6/2011 |

(56) References Cited

FOREIGN PATENT DOCUMENTS

| JP | 2013-163827 A | 8/2013 |
|---|---|---|
| TW | I452170 B | 9/2014 |
| TW | I564404 B | 1/2017 |
| WO | WO 2013/047739 A1 | 4/2013 |
| WO | WO 2013/047812 A1 | 4/2013 |
| WO | WO 2013/047821 A1 | 4/2013 |
| WO | WO 2016/072477 A1 | 5/2016 |
| WO | WO 2016/072478 A1 | 5/2016 |
| WO | WO 2016/072479 A1 | 5/2016 |
| WO | WO 2016/111273 A1 | 7/2016 |

OTHER PUBLICATIONS

Written Opinion of the International Searching Authority for PCT/JP2017/027637 (PCT/ISA/237) dated Oct. 24, 2017.
International Preliminary Report on Patentability and English translation of the Written Opinion of the International Searching Authority (Forms PCT/IB/338, PCT/IB/373, and PCT/ISA/237) for International Application No. PCT/JP2017/027637, dated Feb. 13, 2020.

\* cited by examiner

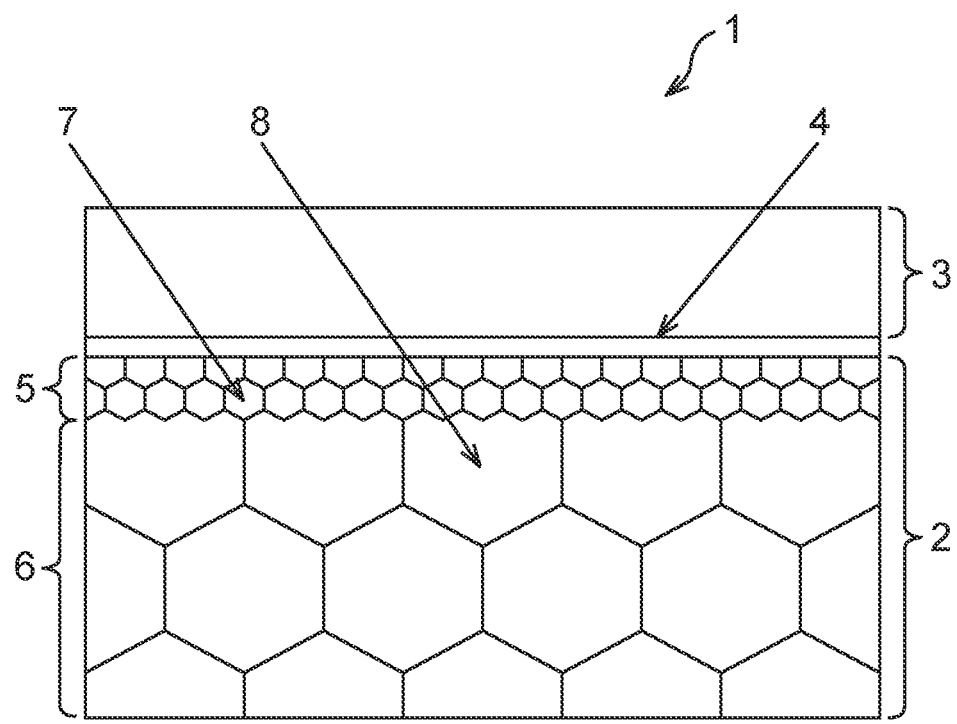

HOT-DIP GALVANIZED STEEL SHEET

TECHNICAL FIELD

The present invention relates to a hot-dip galvanized steel sheet excellent in strength, ductility, hole expandability, plating adhesion, and appearance uniformity.

BACKGROUND ART

There is an increasing need for an increase in the strength of steel sheets used mainly as framework members of automobiles. For achieving high strength and excellent formability, these high-strength steel sheets usually contain alloy elements represented by Si and Mn which contribute to a strength improvement. However, the alloy elements represented by Si and Mn also work to deteriorate plating adhesion.

Automobile steel sheets, which are usually used outdoors, are usually required to further have excellent corrosion resistance.

In the use as outer panels of automobiles and the like, heavy-load bending (hem bending) is usually applied to peripheral portions of the panels by presswork. Steel sheets having undergone heavy-load bending, hole expanding, and so on by presswork are often used not only in the automobile outer panels but also in other applications. The heavy-load bending, hole expanding, and so on, if applied to a conventional hot-dip galvanized steel sheet, may cause a plating layer to peel off a base steel sheet at its worked portion. Such peeling of the plating layer causes this portion to lose corrosion resistance, leading to a problem of early corrosion or rusting of the base steel sheet. Even if the plating layer does not go so far as to peel off, the plating layer loses its adhesion with the base steel sheet, and even a small gap therebetween, if any, allows the outside air or water to enter the gap, so that the plating layer loses its anti-corrosion function. This results in the early corrosion and rusting of the base steel sheet as in the above.

Because of these problems, as a high-strength steel sheet which is used with the heavy-load bending and so on being applied thereto, a plated steel sheet including a hot-dip galvanizing layer and having excellent adhesion between a plating layer and a base steel sheet is strongly desired.

With the aim of increasing the adhesion of a plating layer, methods have been proposed, typically, by Patent Literatures 1 to 3, for instance, which generate oxides in an inner portion of a steel sheet and reduce oxides which are present in an interface between base iron and the plating layer to cause the peeling of plating. However, if such oxides are generated in a steel sheet surface layer, carbon in the steel sheet surface layer bonds with oxygen to be gasified. The consequent separation of the carbon from the steel sheet may greatly reduce the strength of a region from which the carbon separates. The reduction in the strength of the steel sheet surface layer leads to deterioration in fatigue resistance which strongly depends on the properties of the surface layer portion, giving rise to a concern about a great decrease in fatigue strength.

Further, with the aim of increasing the adhesion of a plating layer, Patent Literature 4 proposes a method that additionally applies a new annealing step and an acid pickling step before an ordinary annealing step to reform a surface of a base steel sheet to increase plating adhesion. The method described in Patent Literature 4, however, requires a larger number of steps than an ordinary method of manufacturing a high-strength steel sheet and thus has a cost problem.

Further, Patent Literature 5 proposes a method that increases the adhesion of plating by removing carbon from a surface layer portion of a base steel sheet. The method described in Patent Literature 5, however, greatly reduces the strength of a region from which the carbon is removed. Accordingly, the method described in Patent Literature 5 deteriorates fatigue resistance which greatly depends on the properties of the surface layer portion and thus involves a concern about a great reduction in fatigue strength.

Further, Patent Literatures 6, 7 each propose a steel sheet that has a plating layer whose Mn, Al, and Si amounts are controlled to suitable ranges, and thus has improved plating adhesion. The steel sheets described in Patent Literatures 6, 7 require the high-precision control of the amounts of the elements in the plating layer at the time of the manufacture, which is a heavy operational burden and involves a cost problem.

As a method to increase plating adhesion, Patent Literature 8 proposes a high-strength steel sheet in which a microstructure of a steel sheet is made up only of ferrite. The steel sheet described in Patent Literature 8, however, is not capable of having a sufficiently high strength because its microstructure is made up only of soft ferrite.

Alloyed hot-dip galvanized steel sheets having undergone an alloying treatment after a hot-dip galvanizing treatment are in wide use. The alloying treatment is a treatment that heats a plating layer to a melting point of Zn or higher to diffuse a large quantity of Fe atoms from the inside of a base steel sheet into the plating layer, thereby turning the plating layer into a layer mainly made up of a Zn—Fe alloy. For example, Patent Literatures 9, 10, 11 each propose an alloyed hot-dip galvanized steel sheet excellent in plating adhesion. However, to fully alloy a plating layer, it is necessary to heat the steel sheet to a high temperature. The heating of the steel sheet to the high temperature is not preferable since it changes the quality of a microstructure inside the steel sheet to easily generate an especially coarse iron-based carbide, so that the properties of the steel sheet may be impaired.

On the other hand, a hot-dip galvanized steel sheet described in, for example, Patent Literature 12 has a problem of uneven appearance because the Fe content in its plating layer is not uniform in the width direction.

CITATION LIST

Patent Literature

Patent Literature 1: Japanese Laid-open Patent Publication No. 2008-019465
Patent Literature 2: Japanese Laid-open Patent Publication No. 2005-060742
Patent Literature 3: Japanese Laid-open Patent Publication No. 09-176815
Patent Literature 4: Japanese Laid-open Patent Publication No. 2001-026853
Patent Literature 5: Japanese Laid-open Patent Publication No. 2002-088459
Patent Literature 6: Japanese Laid-open Patent Publication No. 2003-055751
Patent Literature 7: Japanese Laid-open Patent Publication No. 2003-096541
Patent Literature 8: Japanese Laid-open Patent Publication No. 2005-200750

Patent Literature 9: Japanese Laid-open Patent Publication No. 11-140587

Patent Literature 10: Japanese Laid-open Patent Publication No. 2001-303226

Patent Literature 11: Japanese Laid-open Patent Publication No. 2005-060743

Patent Literature 12: International Publication Pamphlet No. WO 2016/072477

SUMMARY OF INVENTION

Technical Problem

In consideration of the current circumstances described above, it is an object of the present invention to provide a hot-dip galvanized steel sheet excellent in strength, ductility, hole expandability, spot weldability, plating adhesion, and appearance uniformity.

Solution to Problem

The present inventors repeated earnest studies with the aim of obtaining a hot-dip galvanized steel sheet excellent in plating adhesion and appearance uniformity. As a result, it has been found out that, even when a steel sheet containing large amounts of Si and Mn is used as a plating substrate, it is possible to reduce the occurrence and spreading of cracks during working and reduce plating peeling which starts from the cracks, by forming a specific fine-grain layer made up of very fine grains of ferrite phases, directly under a Fe—Al alloy layer formed on an interface between a plating layer, which is formed using a plating bath containing a specific amount of Al, and a base steel sheet. Further, it has become clear that, in the case where the steel sheet containing the large amounts of Si and Mn is used as the plating substrate, an internal oxide layer is formed nonuniformly in a width direction of the steel sheet, and this causes a nonuniform Fe content in the plating layer of the hot-dip galvanized steel sheet, resulting in uneven appearance. Then, the present inventors further conducted earnest studies regarding the cause of the nonuniform formation of the internal oxide layer and have made it clear that the nonuniform formation is ascribable to a width-direction variation in the concentration of oxygen in a hot-rolled steel sheet after it is coiled. The present inventors conducted further earnest studies with the aim of reducing such uneven appearance ascribable to the plating layer. As a result, it has been found out that it is possible to obtain a hot-dip galvanized steel sheet excellent not only in plating adhesion but also in appearance uniformity, by controlling the thicknesses of the fine-grain layer and the Fe—Al alloy layer in the width direction of the steel sheet to specific ranges.

The present invention was completed based on the above findings, and its modes are as follows.

(1)

A hot-dip galvanized steel sheet including a hot-dip galvanizing layer on at least one side of a base steel sheet, wherein the base steel sheet has a chemical composition comprised by, in mass %, C: 0.040% to 0.400%,
Si: 0.05% to 2.50%,
Mn: 0.50% to 3.50%,
P: 0.0001% to 0.1000%,
S: 0.0001% to 0.0100%,
Al: 0.001% to 1.500%,
N: 0.0001% to 0.0100%,
O: 0.0001% to 0.0100%,
Ti: 0.000% to 0.150%,
Nb: 0.000% to 0.100%,
V: 0.000% to 0.300%,
Cr: 0.00% to 2.00%,
Ni: 0.00% to 2.00%,
Cu: 0.00% to 2.00%,
Mo: 0.00% to 2.00%,
B: 0.0000% to 0.0100%,
W: 0.00% to 2.00%,
Ca, Ce, Mg, Zr, La, and REM: 0.0000% to 0.0100% in total, and
the balance: Fe and an impurity, and wherein the hot-dip galvanizing layer has a Fe content of more than 0% and 3.0% or less and an Al content of more than 0% and 1.0% or less, the hot-dip galvanized steel sheet including:

a Fe—Al alloy layer provided on an interface between the hot-dip galvanizing layer and the base steel sheet, the Fe—Al alloy layer having a thickness of 0.1 μm to 2.0 μm, and a difference between a maximum value and a minimum value of the thickness of the Fe—Al alloy layer in a width direction of the base steel sheet being within 0.5 μm; and a fine-grain layer provided in the base steel sheet and directly in contact with the Fe—Al alloy layer, the fine-grain layer having an average thickness of 0.1 μm to 5.0 μm, the fine-grain layer including a ferrite phase with an average grain diameter of 0.1 μm to 3.0 μm, the fine-grain layer containing oxides of one or more out of Si and Mn, a maximum diameter of the oxides being 0.01 μm to 0.4 μm, and a difference between a maximum value and a minimum value of the thickness of the fine-grain layer in the width direction of the base steel sheet being within 2.0 μm.

(2)

The hot-dip galvanized steel sheet according to (1), wherein the base steel sheet satisfies Formula 1 below, where [Si] is a Si content (mass %) and [Al] is an Al content (mass %), and wherein a volume fraction of retained austenite is 1% or more in a ⅛ thickness to ⅜ thickness range whose middle is a ¼ thickness of a total thickness of the base steel sheet from a surface of the base steel sheet, $$[Si]+0.7[Al] \geq 0.30 \quad \text{(Formula 1).}$$

(3)

The hot-dip galvanized steel sheet according to (1) or (2), wherein a plating deposition amount per one of surfaces of the hot-dip galvanizing layer is 10 g/m² or more and 100 g/m² or less.

(4)

The hot-dip galvanized steel sheet according to any one of (1) to (3), wherein, in the chemical composition, one of or any combination of Ti: 0.001% to 0.150%,
Nb: 0.001% to 0.100%, and
V: 0.001% to 0.300% is satisfied.

(5)

The hot-dip galvanized steel sheet according to any one of (1) to (4), wherein, in the chemical composition, one of or any combination of Cr: 0.01% to 2.00%,
Ni: 0.01% to 2.00%,
Cu: 0.01% to 2.00%, Mo: 0.01% to 2.00%,
B: 0.0001% to 0.0100%, and
W: 0.01% to 2.00%
is satisfied.

(6)

The hot-dip galvanized steel sheet according to any one of (1) to (5), wherein, in the chemical composition,
Ca, Ce, Mg, Zr, La, and REM: 0.0001% to 0.0100% in total
is satisfied.

Advantageous Effects of Invention

According to the present invention, it is possible to provide a hot-dip galvanized steel sheet excellent in strength, ductility, hole expandability, spot weldability, plating adhesion, and appearance uniformity.

BRIEF DESCRIPTION OF DRAWINGS

FIG. 1 is a sectional view illustrating a hot-dip galvanized steel sheet according to an embodiment of the present invention.

DESCRIPTION OF EMBODIMENTS

An embodiment of the present invention will be hereinafter described in detail.

First, a hot-dip galvanized steel sheet according to the embodiment of the present invention will be described with reference to the attached drawing. FIG. 1 is a sectional view illustrating the hot-dip galvanized steel sheet according to the embodiment of the present invention. The hot-dip galvanized steel sheet 1 according to the embodiment includes a hot-dip galvanizing layer 3 above a surface of a base steel sheet 2, includes a Fe—Al alloy layer 4 on an interface between the hot-dip galvanizing layer 3 and the surface of the base steel sheet 2, and includes, in the base steel sheet 2, a fine-grain layer 5, which is in contact with the Fe—Al alloy layer 4, and a decarburized layer 6.

(Base Steel Sheet 2)

A chemical composition of the base steel sheet 2 included in the hot-dip galvanized steel sheet 1 according to the embodiment of the present invention and a slab used for the manufacture of the base steel sheet 2 will be described. The hot-dip galvanized steel sheet 1 according to the embodiment of the present invention is manufactured through the casting of the slab, hot rolling, cold rolling, annealing, plating, and so on, which will be described in detail later. Therefore, in the chemical composition of the base steel sheet 2 and the slab used for the manufacture thereof, not only the properties of the base steel sheet 2 but also these treatments are taken into consideration. In the description below, "%" which is a unit of the content of each element contained in the base steel sheet 2 or the slab means "mass %" unless otherwise mentioned. The base steel sheet has a chemical composition represented by C: 0.040% to 0.400%, Si: 0.05% to 2.50%, Mn: 0.50% to 3.50%, P: 0.0001% to 0.1000%, S: 0.0001% to 0.0100%, Al: 0.001% to 1.500%, N: 0.0001% to 0.0100%, O: 0.0001% to 0.0100%, Ti: 0.000% to 0.150%, Nb: 0.000% to 0.100%, V: 0.000% to 0.300%, Cr: 0.00% to 2.00%, Ni: 0.00% to 2.00%, Cu: 0.00% to 2.00%, Mo: 0.00% to 2.00%, B: 0.0000% to 0.0100%, W: 0.00% to 2.00%, Ca, Ce, Mg, Zr, La, and REM: 0.0000% to 0.0100% in total, and the balance: Fe and an impurity. Examples of the impurity include those contained in a raw material such as ore and scrap and those contained during manufacturing steps.

(C: 0.040% to 0.400%)

C increases the strength of the base steel sheet. The C content higher than 0.400% leads to poor spot weldability. Therefore, the C content is set to 0.400% or less. In view of spot weldability, the C content is preferably set to 0.300% or less, and more preferably 0.220% or less. To obtain a higher strength, the C content is preferably set to 0.055% or more, and more preferably 0.070% or more.

(Si: 0.05% to 2.50%)

Si restrains the generation of an iron-based carbide in the base steel sheet to increase strength and formability. On the other hand, Si embrittles the steel sheet. With the Si content being more than 2.50%, the cast slab easily breaks. Therefore, the Si content is set to 2.50% or less. Since Si forms oxides in a surface of the base steel sheet during the annealing to greatly impair the adhesion of plating, the Si content is preferably set to 2.00% or less, and more preferably 1.60% or less. With the Si content being less than 0.05%, a large amount of a coarse iron-based carbide is generated at the time of the plating of the base steel sheet, leading to poor strength and formability. Therefore, the Si content is set to 0.05% or more. To restrain the generation of the iron-based carbide, the Si content is preferably set to 0.10% or more, and more preferably 0.25% or more.

(Mn: 0.50% to 3.50%)

Mn increases the hardenability of the base steel sheet to increase strength. With the Mn content being more than 3.50%, a portion with a high Mn concentration is formed at a sheet-thickness middle portion of the base steel sheet, easily causing embrittlement and a crack of the cast slab. Therefore, the Mn content is set to 3.50% or less. In view of deterioration in spot weldability, the Mn content is preferably set to 3.00% or less, and more preferably 2.80%. With the Mn content being less than 0.50%, a large amount of a soft structure is formed during cooling after the annealing, making it difficult to obtain a sufficiently high tensile strength. Therefore, the Mn content is set to 0.50% or more. To obtain a higher strength, the Mn content is preferably set to 0.80% or more, and more preferably 1.00% or more.

(P: 0.0001% to 0.1000%)

P embrittles steel material. With the P content being more than 0.1000%, the cast slab easily breaks. Therefore, the P content is set to 0.1000% or less. Further, P embrittles a portion melted by spot welding. In order for a welded joint to have a sufficient strength, the P content is preferably set to 0.0400% or less, and more preferably 0.0200% or less. Controlling the P content to less than 0.0001% leads to a great increase in the manufacturing cost. Therefore, the P content is set to 0.0001% or more, and more preferably 0.0010% or more.

(S: 0.0001% to 0.0100%)

S forms coarse MnS by bonding with Mn to deteriorate formability such as ductility, stretch flangeability, and bendability. Therefore, the S content is set to 0.0100% or less. Further, S deteriorates spot weldability. Therefore, the S content is preferably set to 0.0060% or less, and more preferably 0.0035% or less. Controlling the S content to less than 0.0001% leads to a great increase in the manufacturing cost. Therefore, the S content is set to 0.0001% or more, preferably 0.0005% or more, and more preferably 0.0010% or more.

(Al: 0.001% to 1.500%)

Al embrittles the steel material. With the Al content being more than 1.500%, the cast slab easily breaks. Therefore, the Al content is set to 1.500% or less. In view of deterioration in spot weldability, the Al content is preferably set to 1.200% or less, and more preferably 1.000% or less. A lower limit value of the Al content is not limited, but Al is contained as an impurity in steel. Controlling the Al content to less than 0.001% leads to a great increase in the manufacturing cost. Therefore, the Al content is set to 0.001% or more. Al is an oxidizing element of the steel. To more sufficiently obtain the deoxidation effect, the Al content is preferably set to 0.010% or more.

(N: 0.0001% to 0.0100%)

N forms a coarse nitride to deteriorate formability such as ductility, stretch flangeability, and bendability. With the N content being more than 0.0100%, formability greatly deteriorates. Therefore, the N content is set to 0.0100% or less. Too high a N content may cause the occurrence of a blowhole during welding, and therefore, the N content is preferably set to 0.0070% or less, and more preferably 0.0050% or less. A lower limit value of the N content is not limited, but N is contained as an impurity in the steel. Controlling the N content to less than 0.0001% leads to a great increase in the manufacturing cost. Therefore, the N content is set to 0.0001% or more, preferably 0.0003% or more, and more preferably 0.0005% or more.

(O: 0.0001% to 0.0100%)

O forms oxides to deteriorate formability such as ductility, stretch flangeability, and bendability. With the O content being more than 0.0100%, formability greatly deteriorates. Therefore, the O content is set to 0.0100% or less, preferably 0.0050% or less, and more preferably 0.0030% or less. A lower limit value of the O content is not limited, but O is contained as an impurity in the steel. Controlling the O content to less than 0.0001% leads to a great increase in the manufacturing cost. Therefore, the N content is set to 0.0001% or more, preferably 0.0003% or more, and more preferably 0.0005% or more.

([Si]+0.7[Al]: 0.30 or more)

Si and Al restrain the generation of a carbide accompanying bainite transformation. To obtain retained austenite, a predetermined amount or more of Si and/or Al is preferably contained. This is because the retained austenite is capable of producing a TRIP effect. From this point of view, the base steel sheet preferably satisfies Formula 1 below, where [Si] is the Si content (mass %) and [Al] is the Al content (mass %). That is, a value of the left side ([Si]+0.7[Al]) of Formula 1 below is preferably 0.30 or more, more preferably 0.45 or more, and still more preferably 0.70 or more.

$$[Si]+0.7[Al] \geq 0.30 \quad \text{(Formula 1)}$$

Ti, Nb, V, Cr, Ni, Cu, Mo, B, W, Ca, Ce, Mg, Zr, La, and REM are not essential elements but are optional elements which may be contained in the steel sheet in appropriate amounts not exceeding predetermined amounts.

(Ti: 0.000% to 0.150%)

Ti increases the strength of the steel sheet by precipitate strengthening, strengthening by grain refinement through the restraint of the growth of ferrite crystal grains, and dislocation strengthening through the restraint of recrystallization. Therefore, Ti may be contained. With the Ti content being more than 0.150%, the precipitation of a carbonitride increases, possibly leading to poor formability. Therefore, the Ti content is set to 0.150% or less. In view of formability, the Ti content is preferably set to 0.080% or less. A lower limit value of the Ti content is not limited, but to sufficiently obtain the strength increasing effect, the Ti content is preferably set to 0.001% or more. To obtain the above effect more sufficiently, the Ti content is more preferably set to 0.010% or more.

(Nb: 0.000% to 0.100%)

Nb increases the strength of the steel sheet by precipitate strengthening, strengthening by grain refinement through the restraint of the growth of ferrite crystal grains, and dislocation strengthening through the restraint of recrystallization. Therefore, Nb may be contained. With the Nb content being more than 0.100%, the precipitation of a carbonitride increases, possibly leading to poor formability. Therefore, the Nb content is set to 0.100% or less. In view of formability, the Nb content is preferably set to 0.060% or less. A lower limit value of the Nb content is not limited, but to sufficiently obtain the strength increasing effect, the Nb content is preferably set to 0.001% or more. To obtain the above effect more sufficiently, the Nb content is more preferably set to 0.005% or more.

(V: 0.000% to 0.300%)

V increases the strength of the steel sheet by precipitate strengthening, strengthening by grain refinement through the restraint of the growth of ferrite crystal grains, and dislocation strengthening through the restraint of recrystallization. Therefore, V may be contained. With the V content being more than 0.300%, the precipitation of a carbonitride increases, possibly leading to poor formability. Therefore, the V content is set to 0.300% or less, and more preferably 0.200% or less. A lower limit value of the V content is not limited, but to sufficiently obtain the strength increasing effect, the V content is preferably set to 0.001% or more, and more preferably 0.010% or more.

(Cr: 0.00% to 2.00%)

Cr restrains phase transformation at high temperatures to further increase the strength of the steel sheet. Therefore, Cr may be contained instead of part of C and/or Mn. With the Cr content being more than 2.00%, workability in the hot rolling is impaired, possibly leading to a decrease in productivity. Therefore, the Cr content is set to 2.00% or less, and more preferably 1.20% or less. A lower limit value of the Cr content is not limited, but to sufficiently obtain the effect of further increasing the strength, the Cr content is preferably set to 0.01% or more, and more preferably 0.10% or more.

(Ni: 0.00% to 2.00%)

Ni restrains phase transformation at high temperatures to further increase the strength of the steel sheet. Therefore, Ni may be contained instead of part of C and/or Mn. With the Ni content being more than 2.00%, weldability may be impaired. Therefore, the Ni content is set to 2.00% or less, and more preferably 1.20% or less. A lower limit value of the Ni content is not limited, but to sufficiently obtain the effect of further increasing the strength, the Ni content is preferably set to 0.01% or more, and more preferably 0.10% or more.

(Cu: 0.00% to 2.00%)

Cu is present in the steel as fine grains to increase strength. Therefore, Cu may be contained instead of part of C and/or Mn. With the Cu content being more than 2.00%, weldability may be impaired. Therefore, the Cu content is set to 2.00% or less, and preferably 1.20% or less. A lower limit value of the Cu content is not limited, but to sufficiently obtain the effect of further increasing the strength, the Cu content is preferably set to 0.01% or more, and more preferably 0.10% or more.

(Mo: 0.00% to 2.00%)

Mo restrains phase transformation at high temperatures to further increase the strength of the steel sheet. Therefore, Mo may be contained instead of part of C and/or Mn. With the Mo content being more than 2.00%, workability in the hot rolling is impaired, possibly leading to a decrease in productivity. Therefore the Mo content is set to 2.00% or less, and preferably 1.20% or less. A lower limit value of the Mo content is not limited, but to sufficiently obtain the effect of further increasing the strength, the Mo content is preferably set to 0.01% or more, and more preferably 0.05% or more.

(B: 0.0000% to 0.0100%)

B restrains phase transformation at high temperatures to further increase the strength of the steel sheet. Therefore, B may be contained instead of part of C and/or Mn. With the B content being more than 0.0100%, workability in the hot rolling is impaired, possibly leading to a decrease in productivity. Therefore, the B content is set to 0.0100% or less. In view of productivity, the B content is preferably set to 0.0050% or less. A lower limit value of the B content is not limited, but to sufficiently obtain the effect of further increasing the strength, the B content is preferably set to 0.0001% or more, and more preferably 0.0005% or more.

(W: 0.00% to 2.00%)

W restrains phase transformation at high temperatures to further increase the strength of the steel sheet. Therefore, W may be contained instead of part of C and/or Mn. With the W content being more than 2.00%, workability in the hot rolling is impaired, possibly leading to a decrease in productivity. Therefore, the W content is set to 2.00% or less, and more preferably 1.20% or less. A lower limit value of the W content is not limited, but to sufficiently obtain the effect of further increasing the strength, the W content is preferably set to 0.01% or more, and more preferably 0.10% or more.

(Ca, Ce Mg, Zr, La, and REM: 0.0000% to 0.0100% in total)

Ca, Ce, Mg, Zr, La, or REM improves formability. Therefore, Ca, Ce, Mg, Zr, La, or REM may be contained. With the total content of Ca, Ce, Mg, Zr, La, and REM being more than 0.0100%, ductility may be impaired. Therefore, the content of Ca, Ce, Mg, Zr, La, and REM is set to 0.0100% or less in total, and preferably 0.0070% or less in total. A lower limit value of the content of Ca, Ce, Mg, Zr, La, and REM is not limited, but to sufficiently obtain the effect of improving the formability of the steel sheet, the content of Ca, Ce, Mg, Zr, La, and REM is preferably set to 0.0001% or more in total, and more preferably 0.0010% or more in total. Note that REM stands for Rare Earth Metal and refers to an element belonging to the lanthanide series. In the embodiment of the present invention, REM and Ce are added as, for example, mischmetal, and elements of the lanthanide series may be contained in combination other than La and Ce. Elements of the lanthanide series other than La and Ce may be contained as impurities. Further, metal La and metal Ce may be contained.

Ti, Nb, V, Cr, Ni, Cu, Mo, B, and W may be contained as impurities as long as the contents of these elements are less than the upper limit values. Ca, Ce, Mg, Zr, La, and REM also may be contained as impurities as long as their total amount is less than the aforesaid upper limit value.

(Hot-Dip Galvanizing Layer 3)

[The Fe Content in the Hot-Dip Galvanizing Layer 3: More than 0% and 3.0% or Less]

The Fe content in the hot-dip galvanizing layer 3 is more than 0% and 3.0% or less. It is practically difficult to manufacture the hot-dip galvanizing layer 3 whose Fe content is 0%. Therefore, the Fe content is set to more than 0%. In view of obtaining plating adhesion, the Fe content is preferably set to 0.3% or more, and more preferably 0.5% or more. With the Fe content being more than 3.0%, plating adhesion deteriorates. Therefore, the Fe content is set to 3.0% or less. In view of obtaining plating adhesion, the Fe content is preferably set to 2.5% or less, and more preferably 2.0% or less.

[The Al Content in the Hot-Dip Galvanizing Layer 3: More than 0% and 1.0% or Less]

The Al content in the hot-dip galvanizing layer 3 is more than 0% and 1.0% or less. With the Al content being 0%, Fe atoms diffuse into the hot-dip galvanizing layer 3 to cause the progress of alloying in which a Zn—Fe alloy is generated, leading to a decrease in plating adhesion. Therefore, the Al content is set to more than 0%. In view of restraining such progress of the alloying, the Al content is preferably set to 0.1% or more, and more preferably 0.2% or more. With the Al content being more than 1.0%, plating adhesion deteriorates. Therefore, the Al content is set to 1.0% or less. In view of obtaining plating adhesion, the Al content is preferably set to 0.8% or less, and more preferably 0.5% or less.

[A Plating Deposition Amount Per One of Surfaces in the Hot-Dip Galvanizing Layer 3: 10 $g/m^2$ or More and 100 $g/m^2$ or Less]

With a plating deposition amount being less than 10 $g/m^2$, sufficient corrosion resistance is not obtained in some cases. Therefore, the plating deposition amount is preferably set to 10 $g/m^2$ or more. In view of corrosion resistance, the plating deposition amount is more preferably set to 20 $g/m^2$ or more, and still more preferably 30 $g/m^2$ or more. With the plating deposition amount being more than 100 $g/m^2$, electrodes are greatly damaged at the time of spot welding and the diameter of a molten nugget is reduced when the welding is continuously performed, possibly leading to deterioration in the strength of the welded joint. Therefore, the plating deposition amount is preferably set to 100 $g/m^2$ or less. In view of continuous weldability, the plating deposition amount is more preferably set to 93 $g/m^2$ or less, and still more preferably 85 $g/m^2$ or less.

The hot-dip galvanizing layer 3 may contain one or more of Ag, B, Be, Bi, Ca, Cd, Co, Cr, Cs, Cu, Ge, Hf, I, K, La, Li, Mg, Mn, Mo, Na, Nb, Ni, Pb, Rb, Sb, Si, Sn, Sr, Ta, Ti, V, W, Zr, and REM. These elements, when contained, improve corrosion resistance and workability.

The hot-dip galvanizing layer 3 may contain a columnar crystal made up of a $\xi$ phase ($FeZn_{13}$). In view of plating adhesion, a coverage ratio of the $\xi$ phase on the whole interface between the hot-dip galvanizing layer 3 and the base steel sheet 2 is preferably set to less than 20%.

(Fe—Al Alloy Layer 4)

[The Thickness of the Fe—Al Alloy Layer 4: 0.1 µm to 2.0 µm]

In the embodiment of the present invention, the Fe—Al alloy layer 4 is formed on the interface between the hot-dip galvanizing layer 3 and the surface of the base steel sheet 2. By forming the Fe—Al alloy layer 4, it is possible to restrain the alloying in which the Zn—Fe alloy is generated and restrain deterioration in plating adhesion. It is also possible to reduce the occurrence of uneven appearance due to uneven alloying. Uneven appearance due to uneven alloying tends to occur more in a hot-dip galvanized steel sheet not having undergone an alloying treatment than in an alloyed hot-dip galvanized steel sheet having undergone the alloying treatment after hot-dip galvanizing treatment. With the thickness of the Fe—Al alloy layer 4 being less than 0.1 µm, plating adhesion and appearance deteriorate. Therefore, the thickness of the Fe—Al alloy layer 4 is set to 0.1 µm or more. With the thickness of the Fe—Al alloy layer 4 being more than 2.0 µm, plating adhesion deteriorates. Therefore, the thickness of the Fe—Al alloy layer 4 is set to 2.0 µm or less, and preferably 1.0 µm or less.

[A Difference Between the Maximum Value and the Minimum Value of the Thickness of the Fe—Al Alloy Layer 4 in the Width Direction of the Base Steel Sheet 2: Within 0.5 µm]

A difference between the maximum value and the minimum value of the thickness of the Fe—Al alloy layer 4 in the width direction of the base steel sheet 2 means a difference between the maximum value and the minimum value of values obtained when the thickness of the Fe—Al alloy layer 4 is measured totally at eight places, that is, positions 50 mm distant from both edges of the Fe—Al alloy layer 4 and positions dividing a gap between the aforesaid 50 mm-distant positions into seven equal parts. The smaller the thickness of the Fe—Al alloy layer 4, the more the alloying in which the Zn—Fe alloy is generated progresses. Therefore, the larger the difference in the thickness of the Fe—Al alloy layer 4 in the width direction of the base steel sheet 2, the more the uneven alloying occurs. If the difference between the maximum value and the minimum value of the thickness of the Fe—Al alloy layer 4 is more than 0.5 µm, plating adhesion and plating appearance uniformity deteriorate. Therefore, the difference between the maximum value and the minimum value of the thickness of the Fe—Al alloy layer 4 is set to within 0.5 µm, more preferably within 0.4 µm, and still more preferably within 0.3 µm.

(Fine-Grain Layer 5)

In the base steel sheet 2, the fine-grain layer 5, which is in contact with the Fe—Al alloy layer 4, and the decarburized layer 5 are provided. The fine-grain layer 5 and the decarburized layer 6 are layers which are generated due to the progress of a decarburization reaction under a condition where a temperature range and an atmosphere of the annealing are controlled to a specific range and a specific atmosphere as described later. Accordingly, a structure forming the fine-grain layer 5, except oxides and inclusion particles, is substantially mostly composed of ferrite phases 7, and a structure forming the decarburized layer 6, except oxides and inclusion particles, is substantially mostly composed of ferrite phases 8. Specifically, a volume fraction of the ferrite phases 7 and that of the ferrite phases 8 are 70% or more, and the balance is one kind of a mixed structure or more out of an austenite phase, a bainite phase, a martensite phase, and a pearlite phase. The fine-grain layer 5 is present in a case where an average grain diameter of the ferrite phases 7 in an outermost portion of the base steel sheet 2 is ½ or less of an average grain diameter of the ferrite phases 8 in the decarburized layer 6. A boundary of the fine-grain layer 5 and the decarburized layer 6 is a boundary at which the average grain diameter of the ferrite phases 7 in the fine-grain layer 5 becomes more than ½ of the average grain diameter of the ferrite phases 8 of the decarburized layer 6.

[An Average Thickness of the Fine-Grain Layer 5: 0.1 µm to 5.0 µm]

With an average thickness of the fine-grain layer 5 being less than 0.1 µm, a crack occurs, and its extension cannot be restrained, leading to poor plating adhesion. Therefore, the average thickness of the fine-grain layer 5 is set to 0.1 µm or more, preferably 0.2 µm or more, and more preferably 0.3 µm or more. With the average thickness of the fine-grain layer 5 being more than 5.0 µm, the alloying in which the Zn—Fe alloy is generated progresses to increase the Fe content in the hot-dip galvanizing layer 3, leading to poor plating adhesion. Therefore, the average thickness of the fine-grain layer 5 is set to 5.0 µm or less, preferably 4.0 µm or less, and more preferably 3.0 µm.

[The Average Grain Diameter of the Ferrite Phases 7: 0.1 µm to 3.0 µm]

With the average grain diameter of the ferrite phases 7 being less than 0.1 µm, a crack occurs, and its extension cannot be restrained, leading to poor plating adhesion. Therefore, the average grain diameter of the ferrite phases 7 is set to 0.1 µm or more. With the average grain diameter of the ferrite phases 7 being more than 3.0 µm, plating adhesion deteriorates. Therefore, the average grain diameter of the ferrite phases 7 is set to 3.0 µm or less, and preferably 2.0 µm or less.

The average thickness of the fine-grain layer 5 and the average grain diameter of the ferrite phases 7 in the fine-grain layer 5 are measured by the following methods. A sample whose observation surface is a section, of the base steel sheet 2, parallel to a rolling direction is taken out from the hot-dip galvanized steel sheet 1. The observation surface of the sample is worked with a CP (Cross section polisher) device, and a reflected electron image in FE-SEM (Field Emission Scanning Electron Microscopy) is observed at a magnification of ×5000 and the measurement is performed.

[The Maximum Diameter of Oxides: 0.01 µm to 0.4 µm]

The fine-grain layer 5 contains oxides of one or more out of Si and Mn. Examples of the oxides include one or more selected from a group consisting of $SiO_2$, $Mn_2SiO_4$, $MnSiO_3$, $Fe_2SiO_4$, $FeSiO_3$, and MnO. These oxides are formed inside the base steel sheet 2 in a specific temperature range during the annealing as described later. Since oxide particles restrain the growth of ferrite phase crystals in the surface layer of the base steel sheet 2, the fine-grain layer 5 is formed. With the maximum diameter of the oxides being less than 0.01 µm, the fine-grain layer 5 is not sufficiently formed, leading to poor plating adhesion. Therefore, the maximum diameter of the oxides is set to 0.01 µm or more, and preferably 0.05 µm or more. With the maximum diameter of the oxides being more than 0.4 µm, the ferrite phases 7 become coarse and the fine-grain layer 5 is not sufficiently formed, and besides, the oxides themselves become starting points of the peeling of the plating to deteriorate plating adhesion. Therefore, the maximum diameter of the oxides is set to 0.4 µm or less, and preferably 0.2 µm or less.

The maximum diameter of the oxides is measured by the following method. From the hot-dip galvanized steel sheet 1, samples whose observation surfaces are sections, of the base steel sheet 2, parallel to the rolling direction are collected. The observation surfaces of the samples are worked with FIB (Focused Ion Beam), whereby thin film samples are fabricated. Thereafter, the thin film samples are observed at a magnification of ×30000 using FE-TEM (Field Emission Transmission Electron Microscopy). The thin film samples are each observed in five fields of view, and the maximum diameter out of measurement values measured in all the fields of view is found as the maximum diameter of the oxides.

[A Difference Between the Maximum Value and the Minimum Value of the Thickness of the Fine-Grain Layer 5 in the Width Direction of the Base Steel Sheet 2: Within 2.0 µm]

A difference between the maximum value and the minimum value of the thickness of the fine-grain layer 5 in the width direction of the base steel sheet 2 means a difference between the maximum value and the minimum value of values obtained when the thickness of the fine-grain layer 5 is measured totally at eight places, that is, positions 50 mm distant from both edges of the fine-grain layer 5 and positions dividing a gap between the aforesaid 50 mm-distant positions into seven equal parts. The larger the thickness of the fine-grain layer 5, the more the alloying in which the Zn—Fe alloy is generated progresses. Therefore, the larger the difference in the thickness of the fine-grain layer 5 in the width direction of the base steel sheet 2, the more the uneven alloying occurs. If the difference between the maximum value and the minimum value of the thickness of the fine-grain layer 5 is more than 2.0 μm, plating adhesion and plating appearance uniformity deteriorate. Therefore, the difference between the maximum value and the minimum value of the thickness of the fine-grain layer 5 is set to within 2.0 μm, more preferably within 1.5 μm, and still more preferably within 1.0 μm.

[Microstructure]

A microstructure of the base steel sheet 2 in the hot-dip galvanized steel sheet 1 according to the embodiment of the present invention is not limited but is preferably the following microstructure. The properties of steel sheet vary depending on the microstructure. In quantifying the microstructure, since the quantification in the whole region of the steel sheet is not realistic, the microstructure in a ⅛ thickness to ⅜ thickness range whose middle is a ¼ thickness from the surface of the base steel sheet 2 is regarded as the typical microstructure of the steel sheet, and is quantified and regulated. In the middle portion of the sheet thickness, the microstructure changes due to strong solidification segregation, and this cannot be said as the typical microstructure of the steel sheet. Near the surface layer of the base steel sheet 2, the microstructure changes due to a local temperature change and/or a reaction with the outside air and this microstructure cannot be said as the typical microstructure of the steel sheet.

The microstructure of the base steel sheet 2 in the hot-dip galvanized steel sheet 1 according to the embodiment of the present invention may be one or more of granular ferrite, acicular ferrite, non-recrystallized ferrite, pearlite, bainite, bainitic ferrite, martensite, tempered martensite, retained austenite, and coarse cementite. In the base steel sheet 2, in order to obtain properties suitable for the use purpose of the hot-dip galvanized steel sheet 1, a volume fraction breakdown, structure sizes, and arrangement of phases and structures can be appropriately selected.

[Retained Austenite: 1% or More]

The retained austenite is a structure which greatly enhances a balance between strength and ductility. If the volume fraction of the retained austenite in the ⅛ thickness to ⅜ thickness range whose middle is the ¼ thickness from the surface of the base steel sheet 2 is less than 1%, the effect of enhancing the balance between strength and ductility may be small. Therefore, the volume fraction of the retained austenite is preferably set to 1% or more. To further enhance the balance between strength and ductility, the volume fraction of the retained austenite is more preferably set to 3% or more, and still more preferably 5% or more. To obtain a large amount of the retained austenite, the C content is greatly increased. However, the large amount of C is liable to greatly impair weldability. Therefore, the volume fraction of the retained austenite is preferably set to 25% or less. The retained austenite transforms into hard martensite as it deforms, and this martensite works as a starting point of breakage, possibly leading to poor stretch flangeability. Therefore, the volume fraction of the retained austenite is more preferably set to 20% or less.

The volume fractions of the structures included in the base steel sheet 2 of the hot-dip galvanized steel sheet 1 according to the embodiment of the present invention are measured by the following methods, for instance.

The volume fraction of the retained austenite included in the base steel sheet 2 of the hot-dip galvanized steel sheet 1 according to the embodiment of the present invention is evaluated by an X-ray diffraction method. In the ⅛ to ⅜ thickness range whose middle is the ¼ thickness from the surface of the base steel sheet 2, a surface parallel to a sheet surface is mirror-polished, an area fraction of FCC (Face Centered Cubic) iron is measured by the X-ray diffraction method, and an obtained measurement value is defined as the volume fraction of the retained austenite.

The volume fractions of the ferrite, the bainitic ferrite, the bainite, the tempered martensite, the fresh martensite, the pearlite, and the coarse cementite included in the base steel sheet 2 in the hot-dip galvanized steel sheet 1 according to the embodiment are measured with FE-SEM (Field Emission Scanning Electron Microscope). A sample whose observation surface is a section, of the base steel sheet 2, parallel to the rolling direction is taken out. The observation surface of this sample is polished and nital-etched. The ⅛ to ⅜ thickness range whose middle is the ¼ thickness of the sheet thickness of the observation surface is observed with FE-SEM, and the area fraction is measured, and an obtained measurement value is regarded as the volume fraction.

The sheet thickness of the base steel sheet 2 is not limited in the hot-dip galvanized steel sheet 1 according to this embodiment. In view of the flatness of the hot-dip galvanized steel sheet 1 and controllability during the cooling, the sheet thickness of the base steel sheet 2 is preferably set to 0.6 mm or more and less than 5.0 mm.

Next, a method of manufacturing the hot-dip galvanized steel sheet according to the embodiment of the present invention will be described. This method includes the casting of the slab having the aforesaid chemical composition, the hot rolling, the cold rolling, the annealing, the plating, and the cooling after the plating. Between the annealing and the plating and/or in the cooling after the plating, a bainite transformation treatment is performed as needed to obtain the retained austenite.

(Casting)

First, the slab to be subjected to the hot rolling is cast. As the slab to be subjected to the hot rolling, a continuously cast slab or one manufactured with a thin slab caster or the like is usable.

(Hot Rolling)

To reduce the anisotropy of crystal orientation ascribable to the casting, a heating temperature of the slab is preferably set to 1080° C. or higher, and more preferably 1150° C. or higher. On the other hand, an upper limit value of the heating temperature of the slab is not limited. Controlling the heating temperature of the slab to higher than 1300° C. may require the supply of a large amount of energy to greatly increase the manufacturing cost. Therefore, the heating temperature of the slab is preferably set to 1300° C. or lower.

The heating of the slab is followed by the hot rolling. A lower than 850° C. completion temperature of the hot rolling (rolling completion temperature) may result in an increase in rolling reaction force to make it difficult to stably obtain a predetermined sheet thickness. Therefore, the completion temperature of the hot rolling is preferably set to 850° C. or higher, and more preferably 875° C. or higher. Controlling the completion temperature of the hot rolling to higher than 980° C. may require the heating of the steel sheet during a period from the end of the heating of the slab up to the completion of the hot rolling, possibly leading to an increase in the cost. Therefore, the completion temperature of the hot rolling is preferably set to 980° C. or lower, and more preferably 960° C. or lower.

Next, the hot-rolled steel sheet having undergone the hot rolling is coiled as a coil. An average cooling rate of cooling before the coiling after the hot rolling is preferably set to 10° C./second or more. This is intended to promote the transformation at a lower temperature to make the grain diameter of the hot-rolled steel sheet small and make an effective crystal grain diameter of the base steel sheet after the cold rolling and the annealing small.

A coiling temperature is preferably set to 350° C. or higher and 750° C. or lower. As the microstructure of the hot-rolled steel sheet, pearlite and/or coarse cementite which has a major axis of 1 μm or more is generated in a dispersed manner, to localize a strain introduced into the hot-rolled steel sheet by the cold rolling. This is intended to thereafter cause reverse transformation into austenite having various crystal orientations in the annealing. Consequently, the effective crystal grains of the base steel sheet after the annealing becomes fine. The coiling temperature of lower than 350° C. may not cause the generation of the pearlite and/or the coarse cementite. Therefore, the coiling temperature is preferably set to 350° C. or higher. To decrease the strength of the hot-rolled steel sheet to facilitate the cold rolling, the coiling temperature is more preferably set to 450° C. or higher. If the coiling temperature is higher than 750° C., belt-shaped pearlite and ferrite which are long in the rolling direction may be generated, and the effective crystal grains of the base steel sheet, which are generated from the ferrite after the cold rolling and the annealing, may elongate in the rolling direction to become coarse. Therefore, the coiling temperature is preferably set to 750° C. or lower. To reduce the effective crystal grain diameter of the base steel sheet after the annealing, the coiling temperature is more preferably set to 680° C. or lower. After the hot-rolled steel sheet is coiled, an internal oxide layer is sometimes formed with its thickness in the middle portion being larger than in the edge portion of the steel sheet, and the internal oxide layer is nonuniformly formed under a scale layer. This becomes noticeable when the coiling temperature is higher than 650° C. If the internal oxide layer is not removed even by later-described acid pickling and the cold rolling, the fine-grain layer and the Fe—Al alloy layer are nonuniformly formed, possibly leading to poor plating adhesion and appearance uniformity. Therefore, the coiling temperature is more preferably set to 650° C. or lower.

Next, the hot-rolled steel sheet manufactured in this manner is acid-pickled. The acid pickling removes oxides formed in the surface of the hot-rolled steel sheet and thus contributes to an improvement in platability of the base steel sheet. The acid pickling may be performed once or may be performed separately a plurality of times. The internal oxide layer generated under the scale layer is preferably removed as much as possible by strengthening the acid pickling, in view of the uniform formation of the fine-grain layer and the Fe—Al alloy layer and the consequent appearance uniformity. An acid pickling condition is not limited as long as the internal oxide layer can be removed. For example, in view of acid pickling efficiency and economic efficiency, hydrochloric acid is preferably used for the acid pickling. As an example of the condition for removing the internal oxide layer, the concentration of the hydrochloric acid is preferably set to 5 mass % or more in terms of hydrogen chloride, an acid pickling temperature is preferably set to 80° C. or higher, and an acid pickling time is preferably set to 30 seconds or longer. For example, if the coiling temperature is higher than 650° C., it is preferable to more strengthen the acid pickling to remove the internal oxide layer as much as possible, and the acid pickling time is more preferably set to 60 seconds or longer.

(Cold Rolling)

Next, the hot-rolled steel sheet having undergone the acid-pickling is cold-rolled. With the total reduction ratio being more than 85%, the steel sheet loses ductility and may fracture during the cold rolling. Therefore, the total reduction ratio is preferably set to 85% or less, more preferably 75% or less, and still more preferably 70% or less. A lower limit value of the total reduction ratio is not limited. With the total reduction ratio being less than 0.05%, the base steel sheet becomes nonuniform in shape and the plating does not adhere thereon uniformly, possibly leading to impaired appearance. Therefore, the total reduction ratio is preferably set to 0.05% or more, and more preferably 0.10% or more. The cold rolling is preferably performed in a plurality of passes, but the number of the passes of the cold rolling and the distribution of the reduction ratio to each pass may be any.

With the total reduction ratio being more than 10% and less than 20%, recrystallization does not progress sufficiently in the subsequent annealing, and coarse crystal grains which include a large number of dislocations and have lost malleability remain near the surface layer of the steel sheet, possibly leading to poor bendability and fatigue resistance. Therefore, it is effective to reduce the total reduction ratio to reduce the accumulation of the dislocations on the crystal grains, thereby leaving the malleability of the crystal grains. It is also effective to increase the total reduction ratio to cause the sufficient progress of the recrystallization in the annealing, thereby causing a worked structure to have recrystallized grains with less accumulation of the dislocations inside. In view of reducing the accumulation of the dislocations on the crystal grains, the total reduction ratio is preferably set to 10% or less, and more preferably 5.0% or less. On the other hand, to cause the sufficient progress of the recrystallization in the annealing, the total reduction ratio is preferably set to 20% or more, and more preferably 30% or more.

(Annealing)

Next, the cold-rolled steel sheet is annealed. In the annealing, a continuous annealing-plating line having a preheating zone, a soaking zone, and a plating zone is preferably used. Preferably, the cold-rolled steel sheet passes through the preheating zone and the soaking zone while being annealed, the annealing is finished by the time the cold-rolled steel sheet reaches the plating zone, and the cold-rolled steel sheet is plated in the plating zone.

In the case where the continuous annealing-plating line is used as described above, the following method is preferably used, for instance. In particular, in order to uniformly generate the predetermined fine-grain layer and Fe—Al alloy layer to obtain plating adhesion and appearance uniformity, it is important to control an atmosphere and a heating method in the preheating zone and control an atmosphere in the soaking zone.

In the preheating zone, the cold-rolled steel sheet is passed while being heated to 400° C. to 800° C. using a preheating burner whose air ratio is set to 0.7 to 1.0, under an atmosphere where $\mathrm{Log}(P(H_2O)/P(H_2))$, which is a Log value of a ratio of a water vapor partial pressure $P(H_2O)$ and a hydrogen partial pressure $P(H_2)$, is controlled to $-1.7$ to $-2.0$. Adjusting the ratio of the water vapor partial pressure $P(H_2O)$ and the hydrogen partial pressure $P(H_2)$ in the preheating zone has an influence on the widthwise uniformity of the precipitation of the Fe—Al alloy phase to the interface in the subsequent hot-dip galvanization and on the surface properties of the steel sheet not having undergone the plating. Adjusting the air ratio in the preheating zone restrains an oxide film of a strong deoxidizing element such as Si from being generated in the surface of the steel sheet. Adjusting the ratio of the water vapor partial pressure $P(H_2O)$ and the hydrogen partial pressure $P(H_2)$ as well as adjusting the air ratio restrains excessive decarbonization on the surface of the steel sheet. This is intended to restrain an excessive Fe—Zn alloy reaction at the grain boundaries of the surface of the steel sheet to selectively cause the Fe—Al alloy reaction in the subsequent plating step. The selective occurrence of the Fe—Al alloy reaction promotes the uniform formation of the Fe—Al alloy layer, making it possible to obtain excellent plating adhesion and appearance uniformity. With $Log(P(H_2O)/P(H_2))$ being more than −0.2, the Fe—Zn alloying easily occurs in the subsequent plating step to increase the Fe concentration in the plating. Consequently, plating adhesion deteriorates and uneven appearance tends to occur. On the other hand, with $Log(P(H_2O)/P(H_2))$ being less than −1.7, a portion having a high carbon concentration is generated in the surface of the steel sheet and the fine-grain layer is not formed in the surface, leading to poor plating adhesion.

"Air ratio" is a ratio of the volume of the air contained in a mixed gas of a unit volume and the volume of the air theoretically necessary for the complete combustion of a fuel gas contained in the mixed gas of the unit volume, and is expressed by the following formula.

Air ratio=[the volume (m³) of the air contained in the mixed gas of the unit volume]/[the volume (m³) of the air theoretically necessary for the complete combustion of the fuel gas contained in the mixed gas of the unit volume]

With the air ratio being more than 1.0, a Fe oxide film is excessively generated in the surface layer portion of the steel sheet, the decarburized layer after the annealing is enlarged, and the fine-grain layer is also generated excessively. Consequently, the alloying of the plating progresses excessively, leading to poor plating adhesion, chipping resistance, and powdering resistance. Therefore, the air ratio is preferably set to 1.0 or less, and more preferably 0.9 or less. With the air ratio being less than 0.7, the fine-grain layer is not formed, leading to poor plating adhesion. Therefore, the air ratio is preferably set to 0.7 or more, and more preferably 0.8 or more.

If the temperature of the steel sheet passing through the preheating zone is lower than 400° C., the fine-grain layer cannot be sufficiently formed. Therefore, the temperature of the steel sheet passing through the preheating zone is preferably set to 400° C. or higher, and more preferably 600° C. or higher. If the temperature of the steel sheet passing through the preheating zone is higher than 800° C., coarse oxides containing Si and/or Mn are generated in the surface of the steel sheet, leading to poor plating adhesion. Therefore, the temperature of the steel sheet passing through the preheating zone is preferably set to 800° C. or lower, and more preferably 750° C. or lower.

If a heating rate in the preheating zone is low, internal oxidation progresses, resulting in the generation of coarse oxides in the inner portion of the steel sheet. In particular, the heating rate in 600° C. to 750° C. is important. To reduce the generation of the coarse oxides due to the excessive decarburization of the surface layer portion of the steel sheet, an average heating rate in 600° C. to 750° C. is preferably set to 1.0° C./second or higher. If the average heating rate is lower than 1.0° C./second, the coarse oxides are generated in the fine-grain layer, leading to poor plating adhesion and powdering resistance. Therefore, the average heating rate is preferably set to 1.0° C./second or higher. In view of reducing the generation of the coarse oxides due to the excessive decarburization of the surface layer portion of the steel sheet, the average heating rate is more preferably set to 1.5° C./second or higher, and still more preferably 2.0° C./second or higher. In view of making the treatment time in the preheating zone sufficiently long, the average heating rate is preferably set to 50° C./second or lower. The average heating rate of 50° C./second or lower facilitates forming the fine-grain layer uniformly, making it possible to obtain the hot-dip galvanizing layer excellent in plating adhesion and appearance uniformity.

The maximum heating temperature in the annealing is an important factor for controlling the volume fraction of the microstructure involved in the formability of the steel sheet to the predetermined range. If the maximum heating temperature is low, the coarse iron-based carbide is left undissolved in the steel, leading to poor formability. To sufficiently solid-dissolve the iron-based carbide to enhance formability, the maximum heating temperature is preferably set to 750° C. or higher. In particular, to obtain the retained austenite, the maximum heating temperature is more preferably set to (Ac1+50°) C. or higher. An upper limit value of the maximum heating temperature is not limited, but in view of plating adhesion, to reduce the oxides generated in the surface of the base steel sheet, the maximum heating temperature is preferably set to 950° C. or lower, and more preferably 900° C. or lower.

The Ac1 point of the steel sheet is a starting point of austenite reverse transformation. Specifically, the AC1 point is obtained by cutting out a small piece from the hot-rolled steel sheet having undergone the hot rolling, heating the small piece to 1200° C. at 10° C./second, and measuring cubical expansion during this period.

The maximum heating temperature in the annealing is reached in the soaking zone. In an atmosphere in this heating zone, $Log(P(H_2O)/P(H_2))$ is controlled to −1.7 to −0.2. If $Log(P(H_2O)/P(H_2))$ is less than −1.7, the fine-grain layer is not formed, leading to poor plating adhesion. Therefore, $Log(P(H_2O)/P(H_2))$ is preferably set to −1.7 or more. If $Log(P(H_2O)/P(H_2))$ is more than −0.2, decarburization excessively progresses, resulting in a great reduction in a hard phase in the surface layer of the base steel sheet, and coarse oxides are formed in the fine-grain layer, leading to poor plating adhesion and powdering resistance. Therefore, $Log(P(H_2O)/P(H_2))$ is preferably set to −2.0 or less.

With $Log(P(H_2O)/P(H_2))$ in the soaking zone being −1.7 to −0.2, Si oxides and/or Mn oxides being starting points of plating peeling are not formed in the uppermost layer of the steel sheet, and fine oxides of Si and/or Mn whose maximum diameter is 0.01 µm to 0.4 µm are formed in the inner portion of the surface layer of the steel sheet. The fine oxides of Si and/or Mn restrain the growth of Fe recrystallization during the annealing. Further, since water vapor in the annealing atmosphere decarburizes the surface layer of the base steel sheet, the microstructure in the surface layer of the base steel sheet having undergone the annealing becomes the ferrite phases. As a result, in the surface layer of the base steel sheet having undergone the annealing, a fine-grain layer with an average thickness of 0.1 µm to 5.0 µm, in which an average grain diameter of the ferrite phases is 0.1 µm to 3.0 µm, and which contains the oxides of Si and/or Mn whose maximum diameter is 0.01 µm to 0.4 µm is formed.

A condition of cooling before the plating, that is, before the steel sheet reaches a plating bath after the maximum heating temperature is reached, is not limited. To obtain the retained austenite, the generation of pearlite and cementite is restrained. For this purpose, as the condition of the cooling before the plating, an average cooling rate from 750° C. to 700° C. is preferably set to 1.0° C./second or higher, and more preferably 5.0° C./second or higher. An upper limit value of the average cooling rate is not limited, but to obtain an excessively high average cooling rate, a special cooling facility or a coolant not interfering with the plating is sometimes used. From this point of view, the average cooling rate from 750° C. to 700° C. is preferably set to 100° C./second or lower, and more preferably 70° C./second or lower.

Subsequently to the cooling before the plating, to obtain the tempered martensite, the steel sheet may be subjected to a martensite transformation treatment in which the steel sheet is retained in a predetermined temperature range for a predetermined time, during a period from the time when the temperature of the steel sheet reaches 500° C. up to the time when it reaches the plating bath. The martensite transformation treatment temperature is preferably set to a martensite transformation start temperature (Ms point) or lower, and more preferably (Ms point—20°) C. or lower. The martensite transformation treatment temperature is preferably set to 50° C. or higher, and more preferably 100° C. or higher. The martensite transformation treatment time is preferably set to 1 second to 100 seconds, and more preferably 10 seconds to 60 seconds. Martensite obtained in the martensite transformation treatment changes into the tempered martensite when the steel sheet enters the high-temperature plating bath at the time of the plating.

The Ms point can be calculated by the following formula, where VF is the volume fraction (%) of the ferrite, [C] is the C content (mass %), [Si] is the Si content (mass %), [Mn] is the Mn content (mass %), [Cr] is the Cr content (mass %), [Ni] is the Ni content (mass %), and [Al] is the Al content (mass %). It is difficult to directly measure the volume fraction of the ferrite during the manufacture of the hot-dip galvanized steel sheet. Therefore, a small piece is cut out from the cold-rolled steel sheet which has not yet passed to the continuous annealing line, this small piece is annealed under the same temperature history as that when the cold-rolled steel sheet passes through the continuous annealing line, a volume change of the ferrite in the small piece is measured, and a value calculated using the measurement value is defined as the volume fraction (VF) of the ferrite.

Ms point [° C.]=541−474[C]/(1−VF)−15[Si]−35 [Mn]−17[Cr]−17[Ni]+19[Al]

After the cooling before the plating, to obtain the retained austenite, the steel sheet may be subjected to the bainite transformation treatment in which it is retained in a temperature range of 250° C. to 500° C. for a predetermined time. The bainite transformation treatment may be performed between the annealing and the plating, may be performed at the time of the cooling after the plating, or may be performed both between the annealing and the plating and at the time of the cooling after the plating.

In the case where the bainite transformation treatment is performed both between the annealing and the plating and at the time of the cooling after the plating, the total retention time of the bainite transformation treatment is preferably set to 15 seconds or longer and 500 seconds or shorter. If the total retention time is shorter than 15 seconds, the bainite transformation does not sufficiently progress and the retained austenite cannot be sufficiently obtained. Therefore, the total retention time is preferably set to 15 seconds or longer, and more preferably 25 seconds or longer. If the total retention time is longer than 500 seconds, pearlite and/or coarse cementite is generated. Therefore, the total retention time is preferably set to 500 seconds or shorter, and more preferably 300 seconds or shorter.

In the case where the bainite transformation treatment is performed between the annealing and the plating, if the bainite transformation treatment temperature is higher than 500° C., pearlite and/or coarse cementite is generated, and the retained austenite cannot be obtained. Therefore, the bainite transformation treatment temperature is preferably set to 500° C. or lower. To promote the concentration of carbon to the austenite accompanying the bainite transformation, the bainite transformation treatment temperature is more preferably set to 485° C. or lower, and still more preferably 470° C. or lower. If the bainite transformation treatment temperature is lower than 250° C., the bainite transformation does not progress sufficiently, and the retained austenite cannot be obtained. Therefore, the bainite transformation treatment temperature is preferably set to 250° C. or higher. For the efficient progress of the bainite transformation, the bainite transformation treatment temperature is more preferably set to 300° C. or higher, and more preferably 340° C. or higher. In the case where the bainite transformation treatment and the martensite transformation treatment are both performed after the cooling before the plating, the martensite transformation treatment precedes the bainite transformation treatment.

(Plating)

Next, the obtained base steel sheet is immersed in the plating bath. The plating bath has a composition in which zinc is the main element and an effective Al amount is 0.180 mass % to 0.250 mass %, the effective Al amount being a value equal to the total Al amount in the plating bath from which the total Fe amount therein is subtracted. If the effective Al amount in the plating bath is less than 0.180 mass %, the Fe—Al alloy layer is not sufficiently formed, and Fe enters the hot-dip galvanizing layer to impair plating adhesion. Therefore, the effective Al amount in the plating bath is preferably set to 0.180 mass % or more, more preferably 0.185 mass % or more, and still more preferably 0.190 mass % or more. If the effective Al amount in the plating bath is more than 0.250 mass %, the Fe—Al alloy layer on the interface between the surface of the base steel sheet and the hot-dip galvanizing layer is excessively generated, leading to impaired plating adhesion. Therefore, the effective Al amount in the plating bath is preferably set to 0.250 mass % or less, more preferably 0.240 mass % or less, and still more preferably 0.230 mass % or less.

The plating bath may contain one kind of element or more out of Ag, B, Be, Bi, Ca, Cd, Co, Cr, Cs, Cu, Ge, Hf, I, K, La, Li, Mg, Mn, Mo, Na, Nb, Ni, Pb, Rb, Sb, Si, Sn, Sr, Ta, Ti, V, W, Zr, and REM. Depending on the contents of the elements, the corrosion resistance and workability of the hot-dip galvanizing layer are improved.

If a plating bath temperature is lower than 440° C., the viscosity of the plating bath excessively increases, making it difficult to control the thickness of the hot-dip galvanizing layer to impair the appearance of the hot-dip galvanized steel sheet. Therefore, the temperature of the plating bath is preferably set to 440° C. or higher, and more preferably 445° C. or higher. If the plating bath temperature is higher than 470° C., a large amount of fume is generated, making the safe manufacture difficult. Therefore, the plating bath temperature is preferably set to 470° C. or lower, and more preferably 460° C. or lower.

If the temperature of the base steel sheet when the steel sheet enters the plating bath is lower than 430° C., a large quantity of heat is given to the plating bath to stabilize the temperature of the plating bath at 440° C. or higher, which is not practical. Therefore, the temperature of the base steel sheet when the steel sheet enters the plating bath is preferably set to 430° C. or higher. To form the predetermined Fe—Al alloy layer, the temperature of the base steel sheet when the steel sheet enters the plating bath is more preferably set to 440° C. or higher. If the temperature of the base steel sheet when the steel sheet enters the plating bath is higher than 480° C., facilities for removing a large quantity of heat from the plating bath are used to stabilize the temperature of the plating bath at 470° C. or lower, resulting in an increased manufacturing cost. Therefore, the temperature of the base steel sheet when the steel sheet enters the plating bath is preferably set to 480° C. or lower. To form the predetermined Fe—Al alloy layer, the temperature of the base steel sheet when the steel sheet enters the plating bath is more preferably set to 470° C. or lower.

The temperature of the plating bath is preferably stabilized at a temperature within a range of 440° C. to 470° C. An unstable temperature of the plating bath makes the Fe content in the Fe—Al alloy layer and the hot-dip galvanizing layer nonuniform to make the appearance of the plating layer nonuniform, leading to poor plating adhesion. To stabilize the temperature of the plating bath, the temperature of the steel sheet when it enters the plating bath is preferably substantially equal to the temperature of the plating bath. Specifically, in view of the limit of the temperature controllability of actual manufacturing facilities, the temperature of the steel sheet when it enters the plating bath is preferably set to within ±10° C. of the temperature of the plating bath, and more preferably within ±5° C. of the temperature of the plating bath.

After the immersion in the plating bath, to make the plating deposition amount a predetermined amount, it is preferable to spray a high-pressure gas mainly containing nitrogen to the surface of the steel sheet to remove excess zinc of the surface layer. Thereafter, the steel sheet is cooled to a room temperature. During the cooling, up to a temperature (350° C.) at which the diffusion of the Fe atoms from the base steel sheet to the hot-dip galvanizing layer scarcely progresses and the generation of the phase almost stops, a cooling rate is preferably set to 1° C./second or higher in view of obtaining plating adhesion.

After the cooling to 350° C., to obtain the retained austenite, the bainite transformation treatment which retains the steel sheet in a temperature range of 250° C. to 350° C. may be performed. If the bainite transformation treatment temperature is lower than 250° C., the bainite transformation does not sufficiently progress and the retained austenite cannot be sufficiently obtained. Therefore, the bainite transformation treatment temperature is preferably set to 250° C. or higher. For the efficient progress of the bainite transformation, the bainite transformation treatment temperature is more preferably set to 300° C. or higher. If the bainite transformation treatment temperature is higher than 350° C., the Fe atoms excessively diffuse from the base steel sheet to the hot-dip galvanizing layer, leading to poor plating adhesion. Therefore, the bainite transformation treatment temperature is preferably set to 350° C. or lower, and more preferably 340° C. or lower.

To further stabilize the retained austenite, a reheat treatment may be performed after the steel sheet is cooled to 250° C. or lower. A treatment temperature and a treatment time of the reheat treatment may be appropriately set as needed. If the reheat treatment temperature is lower than 250° C., a sufficient effect is not obtained. Therefore, the reheat treatment temperature is preferably set to 250° C. or higher, and more preferably 280° C. or higher. If the reheat treatment temperature is higher than 350° C., the Fe atoms diffuse from the base steel sheet to the hot-dip galvanizing layer, leading to poor plating adhesion. Therefore, the reheat treatment temperature is preferably set to 350° C. or lower, and more preferably 330° C. or lower. If the reheat treatment time is longer than 1000 seconds, the above effect saturates. Therefore, the reheat treatment time is preferably set to 1000 seconds or shorter.

In this manner, the hot-dip galvanized steel sheet of the embodiment of the present invention can be manufactured.

In the embodiment of the present invention, for example, a film made up of a phosphorus oxide and/or a composite oxide containing phosphorus may be applied on the surface of the hot-dip galvanizing layer of the hot-dip galvanized steel sheet obtained by the above-described method. The film made up of the phosphorus oxide and/or the composite oxide containing the phosphorus is capable of functioning as a lubricant to protect the hot-dip galvanizing layer formed on the surface of the base steel sheet when the hot-dip galvanized steel sheet is worked.

In the embodiment of the present invention, for example, the hot-dip galvanized steel sheet cooled to the room temperature may be cold-rolled with a reduction ratio of 3.00% or less, for the purpose of shape correction.

The method of manufacturing the hot-dip galvanized steel sheet according to the embodiment of the present invention is preferably applied to the manufacture of a hot-dip galvanized steel sheet whose base steel sheet has a sheet thickness of 0.6 mm or more and less than 5.0 mm. If the sheet thickness of the base steel sheet is less than 0.6 mm, it is sometimes difficult to keep the shape of the base steel sheet flat. If the sheet thickness of the base steel sheet is 5.0 mm or more, it is sometimes difficult to control the cooling in the annealing and the plating.

It should be noted that the above-described embodiments only present specific examples in carrying out the present invention, and the technical scope of the present invention should not be construed in a limited manner by these. That is, the present invention can be embodied in a variety of forms without departing from its technical idea or its main feature.

EXAMPLE

Next, examples of the present invention will be described. Conditions in the examples are only condition examples adopted for confirming the feasibility and effect of the present invention, and the present invention is not limited to these condition examples. The present invention can adopt various conditions as long as they do not depart from the spirit of the present invention and achieve the object of the present invention.

Slabs having the chemical compositions (steel type A to steel type AT) shown in Table 1 to Table 4 were cast, hot-rolled under the conditions (the slab heating temperature, the rolling completion temperature) shown in Table 5 and Table 6, and cooled under the conditions (the average cooling rate from the completion of the hot rolling up to coiling, the coiling temperature) shown in Table 5 and Table 6, whereby hot-rolled steel sheets were obtained. Thereafter, using 80° C. 10% hydrochloric acid, the hot-rolled steel sheets were acid-pickled for the acid pickling times shown in Table 5 and Table 6, and cold-rolled with the reduction ratios shown in Table 5 and Table 6, whereby cold-rolled steel sheets were obtained. The underlines in Table 1 to Table 4 indicate that the relevant numerical values fall out of the ranges of the present invention. The balance in steel type A to steel type AT was made up of Fe and impurities. The underlines in Table 5 to Table 6 indicate that the relevant numerical values fall out of the ranges suitable for the manufacture of the hot-dip galvanized steel sheet.

Next, the obtained cold-rolled steel sheets were annealed under the conditions (the air ratio in the preheating zone, the preheating completion temperature in the preheating zone, $Log(P(H_2O)/P(H_2))$ in an atmosphere of the preheating zone, $Log(P(H_2O)/P(H_2))$ in an atmosphere of the reducing soaking zone, the average heating rate in a temperature range of 600° C. to 750° C., and the maximum heating temperature (Tm)) shown in Table 7 and Table 8. Note that the preheating completion temperature of Experimental Example 1 to Experimental Example 50 was set to within 623° C. to 722° C. Next, a cooling treatment was applied under the conditions (the cooling rate 1 (the average cooling rate in a temperature range of 750° C. to 700° C.), the cooling rate 2 (the average cooling rate in a temperature range of 700° C. to 500° C.), the bainite transformation treatment 1 condition (the treatment temperature, the treatment time), the martensite transformation treatment (the treatment temperature, the treatment time)) shown in Table 7 and Table 8. Note that, regarding steel sheets not undergoing the bainite transformation treatment 1 and the martensite transformation treatment, "–" is entered in the condition columns of the relevant treatments in Table 7 and Table 8. The underlines in Table 7 and Table 8 indicate that the relevant numerical values fall out of the ranges suitable for the manufacture of the hot-dip galvanized steel sheet.

Next, the steel sheets were immersed in a galvanizing bath under the plating conditions (the effective Al amount, the temperature of the plating bath (bath temperature), the steel sheet entrance temperature, the immersion time) shown in Table 9 and Table 10 to be plated. After the plating, a cooling treatment was applied under the conditions (the cooling rate (the average cooling rate in the temperature range from the steel sheet temperature after the plating to 350° C.), the bainite transformation treatment 2 condition (the treatment temperature, the treatment time), the reheat treatment condition (the treatment temperature, the treatment time)) shown in Table 9 and Table 10. Note that, regarding steel sheets not undergoing the bainite transformation treatment 2 and the reheat treatment, "–" is entered in the condition columns of the relevant treatments in Table 9 and Table 10. Further, cold rolling was applied with the reduction ratios shown in Table 9 and Table 10, whereby hot-dip galvanized steel sheets of Experimental Example 1 to Experimental Example 97 were obtained. However, the experiment of some of the experimental examples was discontinued. The underlines in Table 9 to Table 10 indicate that the relevant numerical values fall out of the ranges suitable for the manufacture of the hot-dip galvanized steel sheet.

Regarding the obtained plated steel sheets (Experimental Example 1 to Experimental Example 97), a microstructure of a base steel sheet and a hot-dip galvanizing layer were observed. Table 11 and Table 12 show the observation results of the microstructure of the base steel sheet and the hot-dip galvanizing layer. The underlines in Table 11 and Table 12 indicate that the relevant numerical values fall out of the ranges of the present invention.

First, samples whose observation surfaces were sections, of the base steel sheets, parallel to a rolling direction were collected from the hot-dip galvanized steel sheets. The observation surfaces of the samples were subjected to the structure observation with a field emission scanning electron microscope (FE-SEM) and high-resolution crystal orientation analysis by an EBSD method, the microstructure in a ⅛ thickness to ⅜ thickness range of the thickness of the sheet thickness of the base steel sheet from the surface of each of the base steel sheets was observed, and constituent structures were identified. In Table 13 and Table 14, F, WF, NRF, P, θ, BF, B, M, tM, and γ respectively indicate that granular ferrite, acicular ferrite, non-recrystallized ferrite, pearlite, coarse cementite, bainitic ferrite, bainite, martensite, tempered martensite, and retained austenite were observed.

Further, 25 mm×25 mm small pieces were collected as specimens from the hot-dip galvanized steel sheets. In a range of a ⅛ thickness to a ⅜ thickness of the sheet thickness from the surface of each of the specimens, a surface parallel to the sheet surface was mirror-finished and a volume fraction of the retained austenite (γ fraction) was measured by an X-ray diffraction method.

For finding a plating deposition amount, the hot-dip galvanizing layers were each melted using inhibitor-added hydrochloric acid and the weight before the melting and that after the melting were compared. Further, Fe and Al were quantified by ICP, whereby the Fe concentration and the Al concentration in each of the hot-dip galvanizing layers were measured.

Further, specimens whose observation surfaces were sections, of the base steel sheets, parallel to the rolling direction were collected from the hot-dip galvanized steel sheets, and using the above-described measurement method, an average thickness of a Fe—Al alloy layer formed on an interface between the surface of the base steel sheet and the hot-dip galvanizing layer, a difference between the maximum value and the minimum value of the thickness of the FeAl alloy layer in the width direction of the base steel sheet, an average thickness of a fine-grain layer in contact with the Fe—Al alloy layer, a difference between the maximum value and the minimum value of the thickness of the fine-grain layer in the width direction of the base steel sheet, an average grain diameter of ferrite phases in the fine-grain layer, and the maximum value of the diameters of oxides of one or more out of Si and Mn in the fine-grain layer were found. Table 11 and Table 12 show the results.

Next, to examine the properties of the hot-dip galvanized steel sheets, a tensile test, a hole expanding test, a bending test, an adhesion evaluation test, a spot welding test, a corrosion test, a chipping resistance test, a powdering resistance test, and plating appearance uniformity evaluation were conducted. Table 13 and Table 14 show the properties in the experimental examples.

The tensile test was conducted by the method described in JIS Z 2241 on No. 5 specimens specified in JIS Z 2201, which were fabricated from the hot-dip galvanized steel sheets, and yield strength (YS), maximum tensile strength (TS), and total elongation (El) were found. Note that, in cases where the maximum tensile strength (TS) was 420 MPa or more, the tensile property was evaluated as good.

The hole expanding test was conducted by the method described in JIS Z 2256. Ductility (total elongation) (El) and hole expandability (λ) included in formability change with the maximum tensile strength (TS), and in cases where Formula (2) below is satisfied, strength, ductility, and hole expandability were evaluated as good.

$$TS^{1.5} \times El \times \lambda^{0.5} \geq 2.0 \times 10^6 \qquad \text{Formula (2)}$$

As for plating adhesion, a Dupont impact test was conducted on the hot-dip galvanized steel sheets to which a 5% uniaxial tensile strain was given. An adhesive tape was pasted on each of the hot-dip galvanized steel sheets having undergone the impact test and thereafter was peeled off, and cases where plating did not detach were evaluated as good (⊚), cases where 5% or more of the plating detached were evaluated as bad (X), and cases where less than 5% of the plating detached were evaluated as good (◯). In the Dupont impact test, an impact head having a tip with a ½ inch radius of curvature was used, and a 3 kg weight was dropped from a height of 1 m.

For the evaluation of spot weldability, an electrode tip life test was conducted. Spot welding was continuously performed 1000 times under a welding condition under which the diameter of a molten portion became 5.3 to 5.7 times the square root of the sheet thickness, the diameter of the molten portion at the first point $d_1$ and that at the 1000th point $d_{1000}$ were compared, and cases where $d_{1000}/d_1$ was 0.90 or more were evaluated as good (◯), and cases where it was less than 0.90 were evaluated as bad (X).

In the evaluation of corrosion resistance, 150 mm×70 mm specimens cut out from the hot-dip galvanized steel sheets were used. The specimens were subjected to zinc phosphate-based dip-type chemical conversion treatment, subsequently subjected to 20 μm cation electrodeposition coating, 35 μm intermediate coating, and 35 μm top coating, and their rear surfaces and end portions were thereafter sealed with insulating tapes. In the corrosion resistance test, CCT whose one cycle was composed of 6-hr SST, 4-hr drying, 4-hr wetting, and 4-hr freezing was used. In the evaluation of corrosion resistance after the coating, cross-cuts reaching the base steel sheet were made in each coated surface with a cutter, and a blister width after 60 cycles of CCT was measured. Cases where the blister width was 3.0 mm or less were evaluated as good (◯), and cases where it was more than 3.0 mm were evaluated as bad (X).

In the evaluation of the chipping resistance, 70 mm×50 mm specimens cut out from the hot-dip galvanized steel sheets were used. First, the specimens were subjected to degreasing for automobiles, the formation of a chemical conversion film, and three-coat painting. Next, while the specimens were kept in a state of being cooled to −20° C., ten crushed stones (0.3 g to 0.5 g) were vertically sprayed to them with an air pressure of 2 kgf/cm². The spraying of the crushed stones was repeated five times per specimen. Thereafter, totally fifty chipping traces were observed in each of the specimens, and the evaluation was made according to the following criteria, based on the positions of their peeling interfaces. Those whose peeling interfaces were above the hot-dip galvanizing layers (were hot-dip galvanizing layer-chemical conversion film interfaces or electrodeposition coating-intermediate coating interfaces) were evaluated as (◯), and those having even one peeling in the plating layer-base iron interface were evaluated as bad (X).

To evaluate the workability of the hot-dip galvanizing layers, the powdering resistance was evaluated using V-bending (JIS Z 2248). The hot-dip galvanized steel sheets were each cut into 50 mm×90 mm, molded bodies were formed with a 1R–90° C. V-shaped die press, and they were used as test objects. On valley portions of the test objects, tape peeling was performed. Specifically, a cellophane adhesive tape with a width of 24 mm was pressed onto a bent portion of each of the test objects and then pulled off, and a 90 mm length portion of the cellophane adhesive tape was visually observed. Evaluation criteria were as follows. Those in which the peeling of the hot-dip galvanizing layer occupied 5% or less of the area of the worked portion was evaluated as good (◯), and those in which the peeling of the hot-dip galvanizing layer occupied more than 5% of the area of the worked portion was evaluated as bad (X).

In the evaluation of appearance uniformity, lightness (L* value) was measured totally at eight places, that is, positions 50 mm distant from both edges in the width direction of the steel sheet and positions dividing a gap therebetween into seven equal parts, and those in which a difference equal to the maximum value from which the minimum value was subtracted was less than 5 was evaluated as good (◯), those in which this difference was 5 or more and less than 10 was evaluated as slightly bad (Δ), and those in which this difference was 10 or more was evaluated as bad (X).

TABLE 1

| STEEL TYPE | CHEMICAL COMPOSITION (MASS %) | | | | | | | | REMARKS |
|---|---|---|---|---|---|---|---|---|---|
| | C | Si | Mn | P | S | Al | N | O | |
| A | 0.096 | 0.56 | 2.57 | 0.010 | 0.0020 | 0.031 | 0.0038 | 0.0011 | EXAMPLE |
| B | 0.081 | 0.61 | 1.91 | 0.013 | 0.0024 | 0.121 | 0.0042 | 0.0025 | EXAMPLE |
| C | 0.231 | 1.50 | 2.43 | 0.008 | 0.0024 | 0.058 | 0.0081 | 0.0019 | EXAMPLE |
| D | 0.249 | 0.41 | 2.02 | 0.004 | 0.0014 | 0.016 | 0.0030 | 0.0024 | EXAMPLE |
| E | 0.144 | 0.62 | 1.80 | 0.008 | 0.0007 | 0.069 | 0.0071 | 0.0014 | EXAMPLE |
| F | 0.165 | 0.78 | 1.84 | 0.016 | 0.0042 | 0.022 | 0.0046 | 0.0014 | EXAMPLE |
| G | 0.196 | 0.06 | 2.05 | 0.008 | 0.0016 | 1.034 | 0.0031 | 0.0009 | EXAMPLE |
| H | 0.175 | 0.78 | 1.70 | 0.009 | 0.0022 | 0.057 | 0.0024 | 0.0006 | EXAMPLE |
| I | 0.133 | 0.60 | 3.35 | 0.020 | 0.0011 | 0.023 | 0.0044 | 0.0023 | EXAMPLE |
| J | 0.176 | 0.44 | 2.35 | 0.004 | 0.0008 | 0.072 | 0.0046 | 0.0019 | EXAMPLE |
| K | 0.138 | 0.64 | 1.66 | 0.019 | 0.0007 | 0.016 | 0.0042 | 0.0010 | EXAMPLE |
| L | 0.339 | 0.50 | 1.78 | 0.014 | 0.0035 | 0.037 | 0.0026 | 0.0007 | EXAMPLE |
| M | 0.154 | 0.75 | 3.35 | 0.019 | 0.0023 | 0.077 | 0.0008 | 0.0026 | EXAMPLE |
| N | 0.093 | 0.68 | 1.60 | 0.017 | 0.0016 | 0.070 | 0.0016 | 0.0029 | EXAMPLE |
| O | 0.151 | 0.89 | 2.11 | 0.008 | 0.0037 | 0.052 | 0.0025 | 0.0024 | EXAMPLE |
| P | 0.197 | 0.49 | 1.49 | 0.010 | 0.0002 | 0.056 | 0.0047 | 0.0025 | EXAMPLE |
| Q | 0.100 | 1.84 | 1.90 | 0.004 | 0.0006 | 0.046 | 0.0039 | 0.0024 | EXAMPLE |
| R | 0.209 | 0.14 | 3.05 | 0.013 | 0.0010 | 1.168 | 0.0025 | 0.0005 | EXAMPLE |
| S | 0.182 | 0.73 | 2.63 | 0.032 | 0.0033 | 0.029 | 0.0020 | 0.0027 | EXAMPLE |
| T | 0.109 | 1.06 | 2.90 | 0.013 | 0.0003 | 0.072 | 0.0024 | 0.0022 | EXAMPLE |
| U | 0.138 | 0.37 | 0.85 | 0.011 | 0.0036 | 0.310 | 0.0020 | 0.0027 | EXAMPLE |
| V | 0.130 | 1.00 | 1.41 | 0.014 | 0.0038 | 0.027 | 0.0017 | 0.0024 | EXAMPLE |
| W | 0.147 | 0.60 | 2.53 | 0.004 | 0.0069 | 0.046 | 0.0017 | 0.0006 | EXAMPLE |

TABLE 1-continued

| STEEL TYPE | CHEMICAL COMPOSITION (MASS %) | | | | | | | | REMARKS |
|---|---|---|---|---|---|---|---|---|---|
| | C | Si | Mn | P | S | Al | N | O | |
| X | 0.187 | 0.79 | 1.72 | 0.008 | 0.0015 | 0.055 | 0.0040 | 0.0031 | EXAMPLE |
| Y | 0.090 | 2.22 | 2.09 | 0.010 | 0.0033 | 0.019 | 0.0019 | 0.0011 | EXAMPLE |
| Z | 0.062 | 0.80 | 2.22 | 0.018 | 0.0023 | 0.062 | 0.0032 | 0.0026 | EXAMPLE |

TABLE 2

| STEEL TYPE | CHEMICAL COMPOSITION (MASS %) | | | | | | | | REMARKS |
|---|---|---|---|---|---|---|---|---|---|
| | C | Si | Mn | P | S | Al | N | O | |
| AA | 0.184 | 0.48 | 2.25 | 0.003 | 0.0037 | 0.056 | 0.0032 | 0.0029 | EXAMPLE |
| AB | 0.158 | 1.40 | 1.84 | 0.018 | 0.0046 | 0.058 | 0.0046 | 0.0005 | EXAMPLE |
| AC | 0.108 | 0.55 | 1.21 | 0.014 | 0.0031 | 0.720 | 0.0031 | 0.0028 | EXAMPLE |
| AD | 0.107 | 0.95 | 0.64 | 0.012 | 0.0009 | 0.017 | 0.0038 | 0.0016 | EXAMPLE |
| AE | 0.174 | 3.25 | 1.90 | 0.020 | 0.0034 | 0.036 | 0.0037 | 0.0033 | COMPARATIVE EXAMPLE |
| AF | 0.126 | 0.68 | 3.77 | 0.019 | 0.0032 | 0.008 | 0.0052 | 0.0013 | COMPARATIVE EXAMPLE |
| AG | 0.100 | 0.53 | 1.96 | 0.137 | 0.0009 | 0.032 | 0.0037 | 0.0015 | COMPARATIVE EXAMPLE |
| AH | 0.145 | 0.97 | 1.95 | 0.010 | 0.0012 | 2.071 | 0.0007 | 0.0025 | COMPARATIVE EXAMPLE |
| AI | 0.091 | 0.50 | 2.47 | 0.004 | 0.0041 | 0.091 | 0.0040 | 0.0009 | EXAMPLE |
| AJ | 0.085 | 0.69 | 1.41 | 0.010 | 0.0022 | 0.103 | 0.0032 | 0.0005 | EXAMPLE |
| AK | 0.231 | 1.50 | 2.43 | 0.008 | 0.0024 | 0.058 | 0.0081 | 0.0019 | EXAMPLE |
| AL | 0.109 | 1.21 | 1.65 | 0.010 | 0.0024 | 0.031 | 0.0021 | 0.0005 | EXAMPLE |
| AM | 0.100 | 0.17 | 2.43 | 0.013 | 0.0019 | 0.072 | 0.0038 | 0.0013 | EXAMPLE |
| AN | 0.141 | 0.33 | 1.39 | 0.011 | 0.0043 | 0.003 | 0.0004 | 0.0002 | EXAMPLE |
| AO | 0.408 | 0.83 | 2.06 | 0.008 | 0.0032 | 0.031 | 0.0038 | 0.0006 | COMPARATIVE EXAMPLE |
| AP | 0.031 | 0.65 | 2.36 | 0.013 | 0.0020 | 0.045 | 0.0027 | 0.0002 | COMPARATIVE EXAMPLE |
| AQ | 0.150 | 0.65 | 0.33 | 0.013 | 0.0023 | 0.051 | 0.0034 | 0.0015 | COMPARATIVE EXAMPLE |
| AR | 0.099 | 0.75 | 1.90 | 0.012 | 0.0136 | 0.031 | 0.0037 | 0.0017 | COMPARATIVE EXAMPLE |
| AS | 0.102 | 0.65 | 2.45 | 0.011 | 0.0013 | 0.143 | 0.0198 | 0.0010 | COMPARATIVE EXAMPLE |
| AT | 0.155 | 0.75 | 1.73 | 0.009 | 0.0033 | 0.043 | 0.0038 | 0.0133 | COMPARATIVE EXAMPLE |

TABLE 3

| STEEL TYPE | CHEMICAL COMPOSITION (MASS %) | | | | | | | | | |
|---|---|---|---|---|---|---|---|---|---|---|
| | Ti | Nb | V | Cr | Ni | Cu | Mo | B | W | Ca |
| A | | | | | | | | | | |
| B | | | | | | | | | | |
| C | | | | | | | | | | |
| D | | | | | | | | | | |
| E | 0.068 | | | | | | | | | |
| F | | 0.018 | | | | | | | | |
| G | | | 0.179 | | | | | | | |
| H | | | | | 0.72 | | | | | |
| I | | | | | | 0.67 | | | | |
| J | | | | | | | 0.20 | | | |
| K | | | | | | | | 0.0010 | | |
| L | | | | | | | | | | 0.0031 |
| M | | | | | | | | | | |
| N | | | | | | | | | | |
| O | | | | | | | | | | |
| P | | | | | | | | | | |
| Q | | | | | | | | | | |
| R | 0.009 | 0.028 | | | | | | | | |
| S | | | | | 0.79 | 0.56 | | | | |
| T | 0.017 | | | | | | | 0.0025 | | |
| U | 0.009 | 0.041 | | 0.63 | | | 0.03 | | | 0.0037 |
| V | 0.017 | | 0.30 | | | | | | | |

TABLE 3-continued

| | Ti | Nb | V | Cr | Ni | Cu | Mo | B | W | Ca |
|---|---|---|---|---|---|---|---|---|---|---|
| W | | 0.026 | | | | | | | | 0.0017 |
| X | 0.009 | 0.006 | 0.033 | | | | 0.14 | 0.0004 | | 0.0004 |
| Y | | 0.019 | | | | | | | | |
| Z | 0.065 | | | 0.40 | | | | | | |

| | CHEMICAL COMPOSITION (MASS %) | | | | | | |
|---|---|---|---|---|---|---|---|
| STEEL TYPE | Ce | Mg | Zr | La | REM | Si + 0.7Al | REMARKS |
| A | | | | | | 0.58 | EXAMPLE |
| B | | | | | | 0.69 | EXAMPLE |
| C | | | | | | 1.54 | EXAMPLE |
| D | | | | | | 0.42 | EXAMPLE |
| E | | | | | | 0.67 | EXAMPLE |
| F | | | | | | 0.80 | EXAMPLE |
| G | | | | | | 0.78 | EXAMPLE |
| H | | | | | | 0.82 | EXAMPLE |
| I | | | | | | 0.62 | EXAMPLE |
| J | | | | | | 0.49 | EXAMPLE |
| K | | | | | | 0.65 | EXAMPLE |
| L | | | | | | 0.53 | EXAMPLE |
| M | 0.0008 | | | | | 0.80 | EXAMPLE |
| N | | 0.0034 | | | | 0.73 | EXAMPLE |
| O | | | 0.0021 | | | 0.93 | EXAMPLE |
| P | | | | 0.0012 | | 0.53 | EXAMPLE |
| Q | | | | | 0.0018 | 1.87 | EXAMPLE |
| R | | | | | | 0.96 | EXAMPLE |
| S | | | | | | 0.75 | EXAMPLE |
| T | | | | | | 1.11 | EXAMPLE |
| U | | | | | | 0.59 | EXAMPLE |
| V | | | | | | 1.02 | EXAMPLE |
| W | 0.0018 | | | | | 0.63 | EXAMPLE |
| X | | | | | | 0.83 | EXAMPLE |
| Y | | | | | | 2.23 | EXAMPLE |
| Z | | | | | | 0.84 | EXAMPLE |

TABLE 4

| | CHEMICAL COMPOSITION (MASS %) | | | | | | | | | | | | | | | | |
|---|---|---|---|---|---|---|---|---|---|---|---|---|---|---|---|---|---|
| STEEL TYPE | Ti | Nb | V | Cr | Ni | Cu | Mo | B | W | Ca | Ce | Mg | Zr | La | REM | Si + 0.7Al | REMARKS |
| AA | 0.046 | 0.013 | | | 0.31 | | | | | | | | | | | 0.52 | EXAMPLE |
| AB | | | | | | | | | | | | | | | 0.0036 | 1.44 | EXAMPLE |
| AC | | 0.044 | | | | | | | | | | | | | | 1.05 | EXAMPLE |
| AD | 0.052 | | | 0.80 | | 0.09 | 0.0006 | | | | | | | | | 0.96 | EXAMPLE |
| AE | | | | | | | | | | | | | | | | 3.28 | COMPARATIVE EXAMPLE |
| AF | | | | | | | | | | | | | | | | 0.69 | COMPARATIVE EXAMPLE |
| AG | | | | | | | | | | | | | | | | 0.55 | COMPARATIVE EXAMPLE |
| AH | | | | | | | | | | | | | | | | 2.42 | COMPARATIVE EXAMPLE |
| AI | | | | | | | | | | | | | | | | 0.56 | EXAMPLE |
| AJ | | | | | | | | | | | | | | | 0.38 | 0.76 | EXAMPLE |
| AK | | | | | | | | | | | | | | | | 1.54 | EXAMPLE |
| AL | | | | 1.10 | | | | | | | | | | | | 1.23 | EXAMPLE |
| AM | | | | | | | | | | | | | | | | 0.22 | EXAMPLE |
| AN | | | | | | | | | | | | | | | | 0.33 | EXAMPLE |
| AO | | | | | | | | | | | | | | | | 0.85 | COMPARATIVE EXAMPLE |
| AP | | | | | | | | | | | | | | | | 0.68 | COMPARATIVE EXAMPLE |
| AQ | | | | | | | | | | | | | | | | 0.69 | COMPARATIVE EXAMPLE |
| AR | | | | | | | | | | | | | | | | 0.77 | COMPARATIVE EXAMPLE |
| AS | | | | | | | | | | | | | | | | 0.75 | COMPARATIVE EXAMPLE |
| AT | | | | | | | | | | | | | | | | 0.78 | COMPARATIVE EXAMPLE |

TABLE 5

| EXPERIMENTAL EXAMPLE | STEEL TYPE | HOT ROLLING | | | | ACID PICKLING ACID PICKLING TIME (SECOND) | COLD ROLLING REDUCTION RATIO (%) | REMARKS |
| --- | --- | --- | --- | --- | --- | --- | --- | --- |
| | | SLAB HEATING TEMPERATURE (°C.) | ROLLING COMPLETION TEMPERATURE (°C.) | AVERAGE COOLING RATE (°C./SECOND) | COILING TEMPERATURE (°C.) | | | |
| 1 | A | 1220 | 954 | 23 | 597 | 30 | 50 | EXAMPLE |
| 2 | A | 1230 | 913 | 17 | 559 | 30 | 50 | EXAMPLE |
| 3 | A | 1235 | 906 | 14 | 601 | 30 | 50 | COMPARATIVE EXAMPLE |
| 4 | B | 1190 | 934 | 29 | 583 | 30 | 64 | EXAMPLE |
| 5 | B | 1220 | 911 | 15 | 604 | 30 | 29 | EXAMPLE |
| 6 | B | 1220 | 928 | 16 | 607 | 30 | <u>0</u> | COMPARATIVE EXAMPLE |
| 7 | C | 1190 | 888 | 27 | 584 | 30 | 42 | EXAMPLE |
| 8 | D | 1240 | 914 | 44 | 600 | 30 | 52 | EXAMPLE |
| 9 | D | 1215 | 944 | 35 | 587 | 30 | 34 | EXAMPLE |
| 10 | E | 1210 | 918 | 12 | <u>660</u> | 30 | 43 | EXAMPLE |
| 11 | E | 1210 | 918 | 12 | <u>660</u> | 60 | 43 | EXAMPLE |
| 12 | F | 1240 | 868 | 28 | 558 | 30 | 32 | EXAMPLE |
| 13 | G | 1205 | 900 | 57 | 560 | 30 | 50 | EXAMPLE |
| 14 | H | 1200 | 949 | 24 | 562 | 30 | 44 | EXAMPLE |
| 15 | I | 1210 | 921 | 63 | 587 | 30 | 42 | EXAMPLE |
| 16 | I | 1200 | 927 | 16 | 583 | 30 | 55 | EXAMPLE |
| 17 | J | 1235 | 911 | 23 | 554 | 30 | 46 | EXAMPLE |
| 18 | K | 1210 | 927 | 19 | 610 | 30 | 50 | EXAMPLE |
| 19 | L | 1210 | 904 | 63 | 553 | 30 | 0.14 | EXAMPLE |
| 20 | L | 1245 | 941 | 61 | 572 | 30 | 55 | COMPARATIVE EXAMPLE |
| 21 | M | 1235 | 896 | 17 | 542 | 30 | 39 | EXAMPLE |
| 22 | N | 1185 | 961 | 13 | <u>668</u> | 30 | 44 | EXAMPLE |
| 23 | O | 1180 | 938 | 36 | 563 | 30 | 46 | EXAMPLE |
| 24 | P | 1185 | 915 | 31 | 574 | 30 | 64 | EXAMPLE |
| 25 | Q | 1215 | 888 | 28 | 496 | 30 | 68 | EXAMPLE |
| 26 | Q | 1190 | 898 | 30 | 565 | 30 | 55 | COMPARATIVE EXAMPLE |
| 27 | R | 1195 | 899 | 18 | 614 | 30 | 65 | EXAMPLE |
| 28 | R | 1210 | 894 | 56 | 566 | 30 | <u>89</u> | COMPARATIVE EXAMPLE |
| 29 | S | 1190 | 907 | 57 | 385 | 30 | 59 | EXAMPLE |
| 30 | T | 1205 | 915 | 12 | <u>657</u> | 30 | 53 | EXAMPLE |
| 31 | U | 1225 | 905 | 46 | 566 | 30 | 41 | EXAMPLE |
| 32 | V | 1235 | 872 | 24 | 589 | 30 | 53 | EXAMPLE |
| 33 | V | 1230 | 940 | 27 | 543 | 30 | 57 | COMPARATIVE EXAMPLE |
| 34 | W | 1195 | 897 | 16 | 544 | 30 | 37 | EXAMPLE |
| 35 | X | 1185 | 924 | 22 | 579 | 30 | 42 | EXAMPLE |
| 36 | X | 1245 | 952 | 28 | 591 | 30 | 57 | COMPARATIVE EXAMPLE |
| 37 | Y | 1235 | 893 | 17 | 542 | 30 | 58 | EXAMPLE |
| 38 | Z | 1215 | 894 | 22 | 555 | 30 | 49 | EXAMPLE |
| 39 | AA | 1235 | 899 | 20 | 597 | 30 | 3.4 | EXAMPLE |
| 40 | AA | 1230 | 887 | 56 | 589 | 30 | 80 | COMPARATIVE EXAMPLE |
| 41 | AB | 1255 | 880 | 48 | 387 | 30 | 50 | EXAMPLE |
| 42 | AB | 1235 | 906 | 17 | 630 | 30 | 9.1 | COMPARATIVE EXAMPLE |
| 43 | AC | 1190 | 947 | 17 | <u>670</u> | 30 | 42 | EXAMPLE |
| 44 | AD | 1210 | 929 | 40 | <u>710</u> | 30 | 50 | EXAMPLE |
| 45 | AD | 1210 | 929 | 40 | <u>710</u> | 60 | 50 | EXAMPLE |
| 46 | AD | 1200 | 870 | 18 | 597 | 30 | 50 | COMPARATIVE EXAMPLE |
| 47 | <u>AE</u> | CRACK OCCURRED DURING COOLING OF CAST PIECE, EXPERIMENT STOPPED | | | | | | COMPARATIVE EXAMPLE |
| 48 | <u>AE</u> | CRACK OCCURRED DURING HEATING OF CAST PIECE, EXPERIMENT STOPPED | | | | | | COMPARATIVE EXAMPLE |
| 49 | <u>AG</u> | CRACK OCCURRED DURING HEATING OF CAST PIECE, EXPERIMENT STOPPED | | | | | | COMPARATIVE EXAMPLE |
| 50 | <u>AH</u> | CRACK OCCURRED DURING COOLING OF CAST PIECE, EXPERIMENT STOPPED | | | | | | COMPARATIVE EXAMPLE |

TABLE 6

| EXPERIMENTAL EXAMPLE | STEEL TYPE | HOT ROLLING | | | | ACID PICKLING | COLD ROLLING | REMARKS |
| | | SLAB HEATING TEMPERATURE (° C.) | ROLLING COMPLETION TEMPERATURE (° C.) | AVERAGE COOLING RATE (° C./SECOND) | COILING TEMPERATURE (° C.) | ACID PICKLING TIME (SECOND) | REDUCTION RATIO (%) | |
| --- | --- | --- | --- | --- | --- | --- | --- | --- |
| 51 | AI | 1225 | 948 | 23 | 589 | 30 | 50 | EXAMPLE |
| 52 | AI | 1220 | 938 | 25 | 609 | 30 | 65 | EXAMPLE |
| 53 | AI | 1220 | 912 | 21 | 564 | 30 | 81 | EXAMPLE |
| 54 | AI | 1205 | 950 | 20 | 604 | 30 | 50 | EXAMPLE |
| 55 | AI | 1220 | 918 | 20 | 609 | 30 | 50 | EXAMPLE |
| 56 | AI | 1205 | 910 | 20 | 559 | 30 | 50 | EXAMPLE |
| 57 | AI | 1215 | 940 | 20 | 560 | 30 | 40 | EXAMPLE |
| 58 | AI | 1225 | 928 | 21 | 598 | 30 | 50 | COMPARATIVE EXAMPLE |
| 59 | AI | 1200 | 915 | 25 | 571 | 30 | 50 | EXAMPLE |
| 60 | AI | 1230 | 903 | 16 | 592 | 30 | 50 | COMPARATIVE EXAMPLE |
| 61 | AJ | 1185 | 933 | 33 | 574 | 30 | 74 | EXAMPLE |
| 62 | AJ | 1215 | 909 | 18 | 595 | 30 | 29 | EXAMPLE |
| 63 | AJ | 1210 | 910 | 20 | 593 | 30 | 50 | EXAMPLE |
| 64 | AJ | 1180 | 933 | 23 | 547 | 30 | 50 | EXAMPLE |
| 65 | AJ | 1215 | 928 | 31 | 591 | 30 | 60 | EXAMPLE |
| 66 | AJ | 1200 | 920 | 19 | 584 | 30 | 60 | EXAMPLE |
| 67 | AJ | 1210 | 901 | 19 | 559 | 30 | 50 | COMPARATIVE EXAMPLE |
| 68 | AJ | 1230 | 821 | 17 | 605 | 30 | — | COMPARATIVE EXAMPLE |
| 69 | AK | 1200 | 891 | 27 | 576 | 30 | 42 | EXAMPLE |
| 70 | AK | 1230 | 927 | 66 | 575 | 30 | 42 | EXAMPLE |
| 71 | AK | 1210 | 893 | 29 | 576 | 30 | 50 | EXAMPLE |
| 72 | AK | 1220 | 904 | 21 | 249 | 30 | — | COMPARATIVE EXAMPLE |
| 73 | AK | 1195 | 878 | 15 | 604 | 30 | 42 | COMPARATIVE EXAMPLE |
| 74 | AK | 1205 | 900 | 25 | 590 | 30 | 50 | EXAMPLE |
| 75 | AK | 1220 | 917 | 34 | 585 | 30 | 50 | EXAMPLE |
| 76 | AK | 1210 | 915 | 30 | 605 | 30 | 50 | EXAMPLE |
| 77 | AK | 1195 | 909 | 24 | 558 | 30 | 50 | EXAMPLE |
| 78 | AL | 1220 | 950 | 14 | 648 | 30 | 57 | EXAMPLE |
| 79 | AL | 1210 | 936 | 36 | 637 | 30 | 50 | EXAMPLE |
| 80 | AL | 1215 | 937 | 37 | 629 | 30 | 50 | EXAMPLE |
| 81 | AL | 1200 | 906 | 19 | 604 | 30 | 50 | EXAMPLE |
| 82 | AL | 1195 | 901 | 23 | 598 | 30 | 50 | EXAMPLE |
| 83 | AL | 1230 | 899 | 20 | 605 | 30 | 50 | EXAMPLE |
| 84 | AM | 1200 | 885 | 30 | 550 | 30 | 50 | EXAMPLE |
| 85 | AN | 1240 | 885 | 28 | 565 | 30 | 59 | EXAMPLE |
| 86 | AN | 1220 | 896 | 24 | 567 | 30 | 59 | EXAMPLE |
| 87 | AN | 1210 | 900 | 20 | 588 | 30 | 59 | EXAMPLE |
| 88 | AO | 1215 | 906 | 30 | 598 | 30 | 47 | COMPARATIVE EXAMPLE |
| 89 | AP | 1225 | 914 | 33 | 593 | 30 | 59 | COMPARATIVE EXAMPLE |
| 90 | AQ | 1200 | 902 | 20 | 550 | 30 | 50 | COMPARATIVE EXAMPLE |
| 91 | AR | 1235 | 927 | 31 | 605 | 30 | 64 | COMPARATIVE EXAMPLE |
| 92 | AS | 1250 | 913 | 15 | 558 | 30 | 53 | COMPARATIVE EXAMPLE |
| 93 | AT | 1185 | 894 | 30 | 568 | 30 | 53 | COMPARATIVE EXAMPLE |
| 94 | AK | 1195 | 901 | 29 | 586 | 30 | 42 | COMPARATIVE EXAMPLE |
| 95 | AI | 1205 | 910 | 20 | 559 | 30 | 50 | COMPARATIVE EXAMPLE |
| 96 | AI | 1205 | 910 | 20 | 559 | 30 | 50 | EXAMPLE |
| 97 | AI | 1220 | 938 | 25 | 609 | 15 | 65 | COMPARATIVE EXAMPLE |
| 98 | AI | 1220 | 938 | 25 | 609 | 30 | 65 | EXAMPLE |
| 99 | AI | 1220 | 938 | 25 | 609 | 30 | 65 | COMPARATIVE EXAMPLE |

TABLE 7

| EXPERIMENTAL EXAMPLE | STEEL TYPE | ANNEALING AVERAGE HEATING RATE (° C./SECOND) | MAXIMUM HEATING TEMPERATURE Tm (° C.) | Ac1 (° C.) | Tm − Ac1 (° C.) | PREHEATING ZONE AIR RATIO | PREHEATING ZONE Log(P(H$_2$O)/P(H$_2$)) | SOAKING ZONE Log(P(H$_2$O)/P(H$_2$)) | COOLING RATE 1 (° C./SECOND) |
|---|---|---|---|---|---|---|---|---|---|
| 1 | A | 2.9 | 813 | 715 | 98 | 0.8 | −0.8 | −0.7 | 2.0 |
| 2 | A | 1.4 | 773 | 715 | 58 | 0.9 | −0.5 | −0.9 | 1.2 |
| 3 | A | 4.1 | 861 | 715 | 146 | 0.9 | −0.8 | −0.8 | 2.3 |
| 4 | B | 2.4 | 875 | 721 | 154 | 0.8 | −0.7 | −0.6 | 1.3 |
| 5 | B | 1.9 | 776 | 721 | 55 | 0.9 | −1.0 | −1.7 | 1.7 |
| 6 | B | | | | EXPERIMENT STOPPED | | | | |
| 7 | C | 2.4 | 807 | 751 | 56 | 1.0 | −0.7 | −0.5 | 2.2 |
| 8 | D | 4.4 | 875 | 717 | 158 | 0.8 | −0.8 | −0.7 | 2.4 |
| 9 | D | 5.1 | 831 | 717 | 114 | 0.9 | −0.6 | −0.6 | 3.3 |
| 10 | E | 3.5 | 838 | 717 | 121 | 0.9 | −0.8 | −0.6 | 2.2 |
| 11 | E | 3.5 | 838 | 717 | 121 | 0.9 | −0.9 | −0.9 | 2.2 |
| 12 | F | 1.6 | 844 | 731 | 113 | 0.8 | −1.0 | −0.8 | 1.0 |
| 13 | G | 3.4 | 868 | 765 | 103 | 0.8 | −0.6 | −0.9 | 1.9 |
| 14 | H | 6.0 | 875 | 714 | 161 | 0.9 | −0.8 | −1.0 | 3.3 |
| 15 | I | 2.8 | 785 | 716 | 69 | 0.8 | −0.9 | −0.6 | 2.2 |
| 16 | I | 1.6 | 849 | 716 | 133 | 0.8 | −1.0 | −1.1 | 1.1 |
| 17 | J | 2.9 | 849 | 712 | 137 | 1.0 | −0.5 | −0.6 | 2.0 |
| 18 | K | 1.4 | 877 | 715 | 162 | 0.8 | −1.0 | −1.2 | 1.8 |
| 19 | L | 2.4 | 781 | 716 | 65 | 1.0 | −0.8 | −0.8 | 2.0 |
| 20 | L | 2.0 | 873 | 716 | 157 | 0.8 | −0.9 | −0.7 | 1.1 |
| 21 | M | 2.0 | 774 | 716 | 58 | 1.0 | −0.9 | −1.0 | 1.9 |
| 22 | N | 4.6 | 803 | 723 | 80 | 0.9 | −0.7 | −0.5 | 3.4 |
| 23 | O | 3.5 | 900 | 737 | 163 | 0.9 | −1.0 | −0.9 | 1.7 |
| 24 | P | 3.1 | 789 | 733 | 56 | 1.0 | −1.1 | −1.2 | 2.5 |
| 25 | Q | 2.8 | 893 | 766 | 127 | 0.8 | −0.8 | −0.8 | 1.4 |
| 26 | Q | <u>0.3</u> | 847 | 766 | 81 | 0.8 | −0.6 | −0.9 | 1.4 |
| 27 | R | 4.2 | 834 | 762 | 72 | 0.8 | −0.7 | −0.6 | 2.7 |
| 28 | R | | | | EXPERIMENT STOPPED | | | | |
| 29 | S | 3.3 | 844 | 710 | 134 | 0.9 | −0.8 | −0.8 | 2.0 |
| 30 | T | 2.3 | 823 | 731 | 92 | 0.7 | −0.8 | −0.7 | 1.5 |
| 31 | U | 1.3 | 814 | 761 | 53 | 0.7 | −0.6 | −0.8 | 1.3 |
| 32 | V | 3.6 | 824 | 739 | 85 | 0.9 | −1.0 | −0.9 | 2.4 |
| 33 | V | 3.8 | 839 | 739 | 100 | 0.8 | −0.5 | <u>−0.1</u> | 2.0 |
| 34 | W | 2.6 | 774 | 718 | 56 | 0.9 | −0.8 | −0.7 | 2.3 |
| 35 | X | 2.5 | 843 | 724 | 119 | 0.9 | −0.6 | −1.0 | 1.5 |
| 36 | X | 2.3 | 821 | 724 | 97 | <u>1.1</u> | −0.9 | −0.8 | 1.5 |
| 37 | Y | 1.2 | 830 | 775 | 55 | 0.9 | −1.0 | −0.9 | 1.0 |
| 38 | Z | 2.4 | 784 | 727 | 57 | 0.9 | −0.8 | −0.6 | 1.3 |
| 39 | AA | 2.5 | 899 | 707 | 192 | 0.9 | −0.5 | −0.2 | 1.2 |
| 40 | AA | 1.6 | 843 | 707 | 136 | 0.8 | −0.8 | −0.7 | 1.0 |
| 41 | AB | 3.2 | 882 | 758 | 124 | 0.9 | −0.9 | −1.0 | 1.7 |
| 42 | AB | 1.2 | 785 | 758 | 27 | 1.0 | −0.8 | −0.8 | 1.0 |
| 43 | AC | 3.4 | 827 | 768 | 59 | 0.9 | −0.6 | −0.7 | 2.2 |
| 44 | AD | 2.3 | 912 | 756 | 156 | 0.8 | −0.9 | −0.6 | 1.1 |
| 45 | AD | 2.3 | 912 | 756 | 156 | 0.8 | −0.6 | −1.0 | 1.1 |
| 46 | AD | 1.4 | 782 | 756 | 26 | 0.8 | −1.1 | <u>−1.8</u> | 1.1 |
| 47 | <u>AE</u> | | | | EXPERIMENT STOPPED | | | | |
| 48 | <u>AF</u> | | | | EXPERIMENT STOPPED | | | | |
| 49 | <u>AG</u> | | | | EXPERIMENT STOPPED | | | | |
| 50 | <u>AH</u> | | | | EXPERIMENT STOPPED | | | | |

| EXPERIMENTAL EXAMPLE | ANNEALING COOLING RATE 2 (° C./SECOND) | BAINITE TRANSFORMATION TREATMENT 1 TREATMENT TEMPERATURE (° C.) | BAINITE TRANSFORMATION TREATMENT 1 TREATMENT TIME (SECOND) | MARTENSITE TRANSFORMATION TREATMENT TREATMENT TEMPERATURE (° C.) | MARTENSITE TRANSFORMATION TREATMENT TREATMENT TIME (SECOND) | REMARKS |
|---|---|---|---|---|---|---|
| 1 | 33.9 | — | — | — | — | EXAMPLE |
| 2 | 9.4 | 464 | 49 | — | — | EXAMPLE |
| 3 | 23.3 | 469 | 33 | — | — | COMPARATIVE EXAMPLE |
| 4 | 23.0 | 405 | 115 | — | — | EXAMPLE |
| 5 | 23.3 | 450 | 57 | — | — | EXAMPLE |
| 6 | | EXPERIMENT STOPPED | | | | COMPARATIVE EXAMPLE |
| 7 | 13.5 | 473 | 52 | — | — | EXAMPLE |
| 8 | 12.7 | 451 | 59 | — | — | EXAMPLE |
| 9 | 33.3 | 367 | 238 | 156 | 15 | EXAMPLE |

TABLE 7-continued

|  |  |  |  |  |  |  |
|---|---|---|---|---|---|---|
| 10 | 30.3 | 460 | 28 | — | — | EXAMPLE |
| 11 | 30.3 | 460 | 28 | — | — | EXAMPLE |
| 12 | 9.4 | 486 | 43 | — | — | EXAMPLE |
| 13 | 15.2 | 433 | 39 | — | — | EXAMPLE |
| 14 | 12.6 | 465 | 125 | — | — | EXAMPLE |
| 15 | 11.8 | 430 | 58 | — | — | EXAMPLE |
| 16 | 7.4 | 371 | 231 | — | — | EXAMPLE |
| 17 | 19.3 | 327 | 86 | — | — | EXAMPLE |
| 18 | 6.2 | 413 | 35 | — | — | EXAMPLE |
| 19 | 15.0 | 446 | 176 | — | — | EXAMPLE |
| 20 | 10.3 | 423 | 29 | — | — | COMPARATIVE EXAMPLE |
| 21 | 18.5 | — | — | — | — | EXAMPLE |
| 22 | 24.3 | — | — | — | — | EXAMPLE |
| 23 | 16.9 | 380 | 87 | — | — | EXAMPLE |
| 24 | 18.7 | 447 | 29 | — | — | EXAMPLE |
| 25 | 7.6 | — | — | — | — | EXAMPLE |
| 26 | 29.7 | 461 | 32 | — | — | COMPARATIVE EXAMPLE |
| 27 | 26.7 | 472 | 27 | — | — | EXAMPLE |
| 28 | | EXPERIMENT STOPPED | | | | COMPARATIVE EXAMPLE |
| 29 | 10.5 | — | — | — | — | EXAMPLE |
| 30 | 12.6 | 444 | 301 | — | — | EXAMPLE |
| 31 | 8.9 | 389 | 22 | — | — | EXAMPLE |
| 32 | 14.8 | 476 | 28 | — | — | EXAMPLE |
| 33 | 10.4 | 461 | 35 | — | — | COMPARATIVE EXAMPLE |
| 34 | 8.7 | — | — | — | — | EXAMPLE |
| 35 | 12.1 | 491 | 60 | — | — | EXAMPLE |
| 36 | 10.3 | 448 | 57 | — | — | COMPARATIVE EXAMPLE |
| 37 | 12.1 | — | — | — | — | EXAMPLE |
| 38 | 28.9 | 445 | 29 | — | — | EXAMPLE |
| 39 | 18.6 | 475 | 41 | — | — | EXAMPLE |
| 40 | 20.7 | — | — | — | — | COMPARATIVE EXAMPLE |
| 41 | 13.3 | 405 | 217 | — | — | EXAMPLE |
| 42 | 33.9 | — | — | — | — | COMPARATIVE EXAMPLE |
| 43 | 30.3 | 470 | 21 | — | — | EXAMPLE |
| 44 | 10.8 | — | — | — | — | EXAMPLE |
| 45 | 10.8 | — | — | — | — | EXAMPLE |
| 46 | 19.7 | — | — | — | — | COMPARATIVE EXAMPLE |
| 47 | | EXPERIMENT STOPPED | | | | COMPARATIVE EXAMPLE |
| 48 | | EXPERIMENT STOPPED | | | | COMPARATIVE EXAMPLE |
| 49 | | EXPERIMENT STOPPED | | | | COMPARATIVE EXAMPLE |
| 50 | | EXPERIMENT STOPPED | | | | COMPARATIVE EXAMPLE |

TABLE 8

| | | ANNEALING | | | | | | | |
|---|---|---|---|---|---|---|---|---|---|
| | | AVERAGE HEATING | MAXIMUM | | | | PREHEATING ZONE | | SOAKING |
| EXPERIMENTAL EXAMPLE | STEEL TYPE | RATE (° C./ SECOND) | HEATING TEMPERATURE Tm (° C.) | Ac1 (° C.) | Tm − Ac1 (° C.) | AIR RATIO | COMPLETION TEMPERATURE (° C.) | Log(P(H$_2$O)/ P(H$_2$)) | ZONE Log(P(H$_2$O)/ P(H$_2$)) |
| 51 | AI | 2.9 | 803 | 685 | 118 | 0.9 | 669 | −0.8 | −0.8 |
| 52 | AI | 23.0 | 767 | 685 | 82 | 0.9 | 641 | −1.0 | −0.7 |
| 53 | AI | 2.0 | 783 | 685 | 98 | 1.0 | 697 | −0.7 | −0.7 |
| 54 | AI | 2.0 | <u>741</u> | 685 | 56 | 0.9 | 656 | −1.1 | −0.9 |
| 55 | AI | 2.5 | 810 | 685 | 125 | 0.9 | 671 | −0.7 | −0.8 |
| 56 | AI | 2.3 | 790 | 685 | 105 | 0.9 | 723 | −1.7 | −1.1 |
| 57 | AI | 2.9 | 803 | 685 | 118 | 0.9 | 701 | −0.6 | −0.8 |
| 58 | AI | 2.5 | 810 | 685 | 125 | 0.9 | 670 | −0.9 | −0.8 |
| 59 | AI | 3.1 | 785 | 685 | 100 | 0.9 | 657 | −0.8 | −0.7 |
| 60 | AI | 4.1 | 861 | 685 | 176 | 1.0 | 664 | −0.7 | −0.9 |
| 61 | AJ | 2.4 | 835 | 713 | 122 | 0.9 | 598 | −0.9 | −0.8 |
| 62 | AJ | 2.0 | 781 | 713 | 68 | 0.9 | 700 | −1.5 | −1.0 |

TABLE 8-continued

| | | | | | | | | | |
|---|---|---|---|---|---|---|---|---|---|
| 63 | AJ | 3.1 | 790 | 713 | 77 | 0.9 | 775 | −1.2 | −1.2 |
| 64 | AJ | 2.6 | 825 | 713 | 112 | 0.9 | 716 | −0.9 | −0.8 |
| 65 | AJ | 2.4 | 805 | 713 | 92 | 0.9 | 685 | −0.8 | −0.6 |
| 66 | AJ | 2.5 | 825 | 713 | 112 | 0.8 | 685 | −0.6 | −0.8 |
| 67 | AJ | 2.8 | 815 | 713 | 102 | 0.9 | 692 | −0.9 | −0.7 |
| 68 | AJ | | | | EXPERIMENT STOPPED | | | | |
| 69 | AK | 2.4 | 807 | 738 | 69 | 1.0 | 627 | −0.8 | −1.0 |
| 70 | AK | 2.0 | 793 | 738 | 55 | 0.9 | 739 | −0.9 | −1.1 |
| 71 | AK | 2.5 | 802 | 738 | 64 | 0.9 | 636 | −0.7 | −0.6 |
| 72 | AK | | | | EXPERIMENT STOPPED | | | | |
| 73 | AK | 3.4 | 818 | 738 | 80 | 0.9 | 711 | <u>−1.9</u> | −1.2 |
| 74 | AK | 2.0 | 809 | 738 | 71 | 0.9 | 711 | −0.8 | −1.0 |
| 75 | AK | 2.0 | 801 | 738 | 63 | 0.9 | 662 | −0.9 | −0.9 |
| 76 | AK | 2.3 | 799 | 738 | 61 | 0.9 | 710 | −0.6 | −0.7 |
| 77 | AK | 1.5 | 854 | 738 | 116 | 1.0 | 715 | −0.7 | −0.6 |
| 78 | AL | 2.5 | <u>776</u> | 744 | 32 | 0.8 | 652 | −0.8 | −1.0 |
| 79 | AL | 2.5 | 806 | 744 | 62 | 0.8 | 665 | −0.8 | −0.9 |
| 80 | AL | 2.5 | 810 | 744 | 66 | 0.9 | 630 | −0.8 | −0.8 |
| 81 | AL | 2.3 | 810 | 744 | 66 | 0.8 | 637 | −0.9 | −0.8 |
| 82 | AL | 2.5 | 800 | 744 | 56 | 1.0 | 647 | −0.7 | −0.7 |
| 83 | AL | 2.4 | 807 | 744 | 63 | 0.9 | 708 | −0.5 | −0.9 |
| 84 | AM | 3.0 | 809 | 709 | 100 | 0.9 | 633 | −0.8 | −0.6 |
| 85 | AN | 3.0 | 800 | 706 | 94 | 1.0 | 639 | −1.0 | −0.7 |
| 86 | AN | 2.7 | 804 | 706 | 98 | 1.0 | 673 | −0.9 | −0.8 |
| 87 | AN | 2.9 | 801 | 706 | 95 | 1.0 | 620 | −1.1 | −1.0 |
| 88 | <u>AO</u> | 2.4 | 788 | 689 | 99 | 0.9 | 687 | −0.6 | −0.9 |
| 89 | <u>AP</u> | 3.7 | 839 | 704 | 135 | 1.0 | 656 | −0.8 | −0.7 |
| 90 | <u>AQ</u> | 2.3 | 810 | 738 | 72 | 0.8 | 619 | −0.9 | −0.6 |
| 91 | <u>AR</u> | 3.5 | 828 | 719 | 109 | 0.9 | 648 | −0.7 | −1.0 |
| 92 | <u>AS</u> | 4.7 | 805 | 713 | 92 | 0.8 | 665 | −0.9 | −0.9 |
| 93 | <u>AT</u> | 3.3 | 812 | 733 | 79 | 0.8 | 723 | −1.0 | −0.7 |
| 94 | AK | 2.5 | 807 | 738 | 69 | 1.0 | <u>813</u> | −0.8 | −0.8 |
| 95 | AI | 2.3 | 790 | 685 | 105 | 0.9 | 723 | <u>−0.1</u> | −0.6 |
| 96 | AI | 2.3 | 790 | 685 | 105 | 0.9 | 723 | −0.2 | −0.5 |
| 97 | AI | 5.0 | 767 | 685 | 82 | 0.9 | 645 | −0.9 | −0.8 |
| 98 | AI | 45 | 769 | 685 | 84 | 1.0 | 650 | −0.8 | −0.7 |
| 99 | AI | <u>55</u> | 770 | 685 | 85 | 0.9 | 639 | −0.9 | −0.8 |

| | ANNEALING | | | | | | |
|---|---|---|---|---|---|---|---|
| | | | BAINITE TRANSFORMATION TREATMENT 1 | | MARTENSITE TRANSFORMATION TREATMENT | | |
| EXPERIMENTAL EXAMPLE | COOLING RATE 1 (° C./SECOND) | COOLING RATE 2 (° C./SECOND) | TREATMENT TEMPERATURE (° C.) | TREATMENT TIME (SECOND) | TREATMENT TEMPERATURE (° C.) | TREATMENT TIME (SECOND) | REMARKS |
| 51 | 12.2 | 30.9 | — | — | — | — | EXAMPLE |
| 52 | 1.5 | 13.0 | 285 | 47 | — | — | EXAMPLE |
| 53 | 1.4 | 10.4 | 464 | 48 | — | — | EXAMPLE |
| 54 | 2.2 | 28.0 | 460 | 52 | — | — | EXAMPLE |
| 55 | <u>0.3</u> | 10.3 | 427 | 72 | — | — | EXAMPLE |
| 56 | 1.5 | 12.0 | 460 | 58 | — | — | EXAMPLE |
| 57 | 7.2 | 62.9 | 412 | 10 | — | — | EXAMPLE |
| 58 | 2.2 | 29.0 | — | — | — | — | COMPARATIVE EXAMPLE |
| 59 | 1.6 | 11.3 | 476 | 12 | — | — | EXAMPLE |
| 60 | 2.3 | 23.3 | 469 | 33 | — | — | COMPARATIVE EXAMPLE |
| 61 | 1.3 | 23.0 | 405 | 115 | — | — | EXAMPLE |
| 62 | 2.0 | 20.0 | 465 | 68 | — | — | EXAMPLE |
| 63 | 1.8 | 20.3 | 407 | 19 | — | — | EXAMPLE |
| 64 | 1.5 | 18.6 | 398 | 23 | — | — | EXAMPLE |
| 65 | 1.6 | <u>3.5</u> | 445 | 105 | — | — | EXAMPLE |
| 66 | 1.2 | 25.0 | — | — | — | — | COMPARATIVE EXAMPLE |
| 67 | 1.8 | 18.8 | 417 | 105 | — | — | COMPARATIVE EXAMPLE |
| 68 | | | EXPERIMENT STOPPED | | | | COMPARATIVE EXAMPLE |
| 69 | 2.2 | 13.5 | 473 | 52 | — | — | EXAMPLE |
| 70 | 1.5 | 43.9 | — | — | — | — | EXAMPLE |
| 71 | 2.0 | 14.9 | 479 | 58 | — | — | EXAMPLE |
| 72 | | | EXPERIMENT STOPPED | | | | COMPARATIVE EXAMPLE |
| 73 | 3.0 | 12.0 | — | — | — | — | COMPARATIVE EXAMPLE |
| 74 | 2.2 | 13.5 | — | — | — | — | EXAMPLE |
| 75 | 2.0 | 36.2 | <u>555</u> | 74 | — | — | EXAMPLE |
| 76 | 3.1 | 25.6 | <u>235</u> | 52 | — | — | EXAMPLE |

TABLE 8-continued

| | | | | | | | |
|---|---|---|---|---|---|---|---|
| 77 | 10.7 | 49.3 | 480 | 30 | — | — | EXAMPLE |
| 78 | 2.1 | 12.0 | 439 | 42 | — | — | EXAMPLE |
| 79 | 1.9 | 13.3 | 438 | 59 | — | — | EXAMPLE |
| 80 | 2.0 | 12.8 | 470 | 7 | — | — | EXAMPLE |
| 81 | 2.5 | 20.3 | 385 | 14 | — | — | EXAMPLE |
| 82 | 21.9 | 22.5 | 440 | 18 | — | — | EXAMPLE |
| 83 | 2.1 | 13.4 | 444 | 60 | — | — | EXAMPLE |
| 84 | 2.2 | 16.0 | 451 | 64 | — | — | EXAMPLE |
| 85 | 2.5 | 16.3 | 453 | 64 | — | — | EXAMPLE |
| 86 | 2.4 | 17.0 | 458 | 58 | — | — | EXAMPLE |
| 87 | 2.5 | 14.0 | 465 | 743 | — | — | EXAMPLE |
| 88 | 1.5 | 14.3 | 444 | 84 | — | — | COMPARATIVE EXAMPLE |
| 89 | 2.6 | 18.1 | 471 | 73 | — | — | COMPARATIVE EXAMPLE |
| 90 | 1.8 | 24.5 | 461 | 71 | — | — | COMPARATIVE EXAMPLE |
| 91 | 2.0 | 15.4 | 470 | 68 | — | — | COMPARATIVE EXAMPLE |
| 92 | 3.5 | 17.3 | 471 | 75 | — | — | COMPARATIVE EXAMPLE |
| 93 | 2.6 | 15.9 | 468 | 83 | — | — | COMPARATIVE EXAMPLE |
| 94 | 2.5 | 15.0 | 475 | 55 | — | — | COMPARATIVE EXAMPLE |
| 95 | 1.4 | 12.0 | 460 | 58 | — | — | COMPARATIVE EXAMPLE |
| 96 | 1.5 | 12.0 | 460 | 58 | — | — | EXAMPLE |
| 97 | 1.6 | 12.5 | 286 | 48 | — | — | COMPARATIVE EXAMPLE |
| 98 | 1.7 | 13.0 | 289 | 40 | — | — | EXAMPLE |
| 99 | 2 | 12.5 | 288 | 45 | — | — | COMPARATIVE EXAMPLE |

TABLE 9

| | | PLATING | | | | COOLING AFTER PLATING |
|---|---|---|---|---|---|---|
| EXPERIMENTAL EXAMPLE | STEEL TYPE | EFFECTIVE Al AMOUNT (%) | BATH TEMPERATURE (° C.) | STEEL SHEET ENTRANCE TEMPERATURE (° C.) | IMMERSION TIME (SECOND) | COOLING RATE (° C./SECOND) |
| 1 | A | 0.199 | 449 | 449 | 2.4 | 2.5 |
| 2 | A | 0.239 | 455 | 448 | 8.6 | 2.1 |
| 3 | A | 0.001 | 446 | 446 | 2.4 | 3.2 |
| 4 | B | 0.193 | 453 | 444 | 4.6 | 2.8 |
| 5 | B | 0.194 | 450 | 448 | 4.3 | 1.9 |
| 6 | B | EXPERIMENT STOPPED | | | | |
| 7 | C | 0.182 | 453 | 454 | 8.0 | 3 |
| 8 | D | 0.201 | 442 | 443 | 9.0 | 2.6 |
| 9 | D | 0.193 | 452 | 459 | 6.3 | 1.8 |
| 10 | E | 0.185 | 447 | 450 | 4.7 | 1.3 |
| 11 | E | 0.185 | 447 | 450 | 4.7 | 1.3 |
| 12 | F | 0.181 | 448 | 449 | 4.2 | 2 |
| 13 | G | 0.183 | 445 | 452 | 3.3 | 2.3 |
| 14 | H | 0.192 | 450 | 459 | 3.0 | 3.1 |
| 15 | I | 0.185 | 449 | 454 | 8.2 | 2.5 |
| 16 | I | 0.197 | 445 | 444 | 3.1 | 2 |
| 17 | J | 0.187 | 448 | 446 | 6.0 | 1.7 |
| 18 | K | 0.200 | 454 | 456 | 6.6 | 1.4 |
| 19 | L | 0.192 | 449 | 444 | 6.9 | 2.6 |
| 20 | L | 0.181 | 454 | 463 | 8.3 | 0.5 |
| 21 | M | 0.190 | 451 | 450 | 4.6 | 2.7 |
| 22 | N | 0.202 | 450 | 450 | 4.7 | 1.6 |
| 23 | O | 0.209 | 454 | 461 | 3.6 | 1.4 |
| 24 | P | 0.195 | 448 | 454 | 7.8 | 1.5 |
| 25 | Q | 0.195 | 452 | 447 | 4.5 | 1.8 |
| 26 | Q | 0.183 | 449 | 451 | 4.3 | 2.3 |
| 27 | R | 0.192 | 449 | 447 | 9.0 | 3.4 |
| 28 | R | EXPERIMENT STOPPED | | | | |
| 29 | S | 0.181 | 450 | 455 | 6.2 | 2.3 |
| 30 | T | 0.198 | 450 | 446 | 9.0 | 2.5 |
| 31 | U | 0.185 | 448 | 453 | 7.6 | 1.6 |
| 32 | V | 0.185 | 457 | 456 | 3.7 | 3.1 |
| 33 | V | 0.188 | 446 | 452 | 3.4 | 2.5 |

TABLE 9-continued

| | | | | | | |
|---|---|---|---|---|---|---|
| 34 | W | 0.195 | 448 | 450 | 4.4 | 2.3 |
| 35 | X | 0.188 | 450 | 455 | 3.4 | 2.2 |
| 36 | X | 0.192 | 452 | 459 | 7.7 | 1.4 |
| 37 | Y | 0.205 | 453 | 449 | 6.3 | 2.2 |
| 38 | Z | 0.198 | 445 | 441 | 2.8 | 2.1 |
| 39 | AA | 0.187 | 449 | 443 | 9.4 | 3.1 |
| 40 | AA | 0.171 | 451 | 444 | 10.2 | 2.1 |
| 41 | AB | 0.181 | 451 | 443 | 2.4 | 2.1 |
| 42 | AB | 0.255 | 454 | 457 | 4.0 | 1.5 |
| 43 | AC | 0.194 | 456 | 456 | 8.9 | 2.6 |
| 44 | AD | 0.195 | 447 | 448 | 6.1 | 3 |
| 45 | AD | 0.195 | 447 | 448 | 6.1 | 3 |
| 46 | AD | 0.181 | 448 | 441 | 3.5 | 2.6 |
| 47 | AE | | | EXPERIMENT STOPPED | | |
| 48 | AF | | | EXPERIMENT STOPPED | | |
| 49 | AG | | | EXPERIMENT STOPPED | | |
| 50 | AH | | | EXPERIMENT STOPPED | | |

| | COOLING AFTER PLATING | | | | COLD ROLLING | |
|---|---|---|---|---|---|---|
| | BAINITE TRANSFORMATION TREATMENT 2 | | REHEAT TREATMENT | | | |
| EXPERIMENTAL EXAMPLE | TREATMENT TEMPERATURE (° C.) | TREATMENT TIME (SECOND) | TREATMENT TEMPERATURE (° C.) | TREATMENT TIME (SECOND) | REDUCTION RATIO (%) | REMARKS |
| 1 | 338 | 57 | — | — | 0.16 | EXAMPLE |
| 2 | — | — | — | — | 0.20 | EXAMPLE |
| 3 | — | — | — | — | 0.23 | COMPARATIVE EXAMPLE |
| 4 | — | — | — | — | 0.11 | EXAMPLE |
| 5 | — | — | — | — | 0.12 | EXAMPLE |
| 6 | | | EXPERIMENT STOPPED | | | COMPARATIVE EXAMPLE |
| 7 | — | — | — | — | 0.00 | EXAMPLE |
| 8 | — | — | — | — | 0.21 | EXAMPLE |
| 9 | — | — | — | — | 0.16 | EXAMPLE |
| 10 | — | — | — | — | 0.09 | EXAMPLE |
| 11 | — | — | — | — | 0.09 | EXAMPLE |
| 12 | — | — | — | — | 0.17 | EXAMPLE |
| 13 | — | — | — | — | 0.20 | EXAMPLE |
| 14 | — | — | — | — | 0.15 | EXAMPLE |
| 15 | — | — | — | — | 0.00 | EXAMPLE |
| 16 | 275 | 25 | — | — | 0.18 | EXAMPLE |
| 17 | — | — | — | — | 0.12 | EXAMPLE |
| 18 | — | — | 331 | 27 | 0.08 | EXAMPLE |
| 19 | — | — | — | — | 0.26 | EXAMPLE |
| 20 | — | — | — | — | 0.09 | COMPARATIVE EXAMPLE |
| 21 | 314 | 17 | — | — | 0.18 | EXAMPLE |
| 22 | 341 | 27 | 264 | 16 | 0.19 | EXAMPLE |
| 23 | — | — | — | — | 0.07 | EXAMPLE |
| 24 | — | — | — | — | 0.12 | EXAMPLE |
| 25 | 290 | 51 | — | — | 0.22 | EXAMPLE |
| 26 | — | — | — | — | 0.18 | COMPARATIVE EXAMPLE |
| 27 | — | — | — | — | 0.07 | EXAMPLE |
| 28 | | | EXPERIMENT STOPPED | | | COMPARATIVE EXAMPLE |
| 29 | 326 | 264 | — | — | 0.25 | EXAMPLE |
| 30 | — | — | — | — | 0.09 | EXAMPLE |
| 31 | — | — | 293 | 160 | 0.05 | EXAMPLE |
| 32 | — | — | — | — | 0.17 | EXAMPLE |
| 33 | — | — | — | — | 0.05 | COMPARATIVE EXAMPLE |
| 34 | 334 | 48 | — | — | 0.18 | EXAMPLE |
| 35 | — | — | — | — | 0.14 | EXAMPLE |
| 36 | — | — | — | — | 0.26 | COMPARATIVE EXAMPLE |
| 37 | 308 | 23 | — | — | 0.18 | EXAMPLE |
| 38 | — | — | — | — | 0.09 | EXAMPLE |
| 39 | — | — | — | — | 0.10 | EXAMPLE |
| 40 | — | — | — | — | 0.10 | COMPARATIVE EXAMPLE |
| 41 | — | — | — | — | 0.07 | EXAMPLE |
| 42 | — | — | — | — | 0.08 | COMPARATIVE EXAMPLE |
| 43 | — | — | — | — | 0.12 | EXAMPLE |
| 44 | 308 | 40 | — | — | 0.06 | EXAMPLE |

TABLE 9-continued

| | | | | | | |
|---|---|---|---|---|---|---|
| 45 | 308 | 40 | — | — | 0.06 | EXAMPLE |
| 46 | — | — | — | — | 0.08 | COMPARATIVE EXAMPLE |
| 47 | | EXPERIMENT STOPPED | | | | COMPARATIVE EXAMPLE |
| 48 | | EXPERIMENT STOPPED | | | | COMPARATIVE EXAMPLE |
| 49 | | EXPERIMENT STOPPED | | | | COMPARATIVE EXAMPLE |
| 50 | | EXPERIMENT STOPPED | | | | COMPARATIVE EXAMPLE |

TABLE 10

| EXPERIMENTAL EXAMPLE | STEEL TYPE | PLATING | | | | COOLING AFTER PLATING COOLING RATE (° C./SECOND) |
|---|---|---|---|---|---|---|
| | | EFFECTIVE Al AMOUNT (%) | BATH TEMPERATURE (° C.) | STEEL SHEET ENTRANCE TEMPERATURE (° C.) | IMMERSION TIME (SECOND) | |
| 51 | AI | 0.199 | 449 | 449 | 7.6 | 2.3 |
| 52 | AI | 0.197 | 450 | 448 | 5.2 | 1.8 |
| 53 | AI | 0.198 | 450 | 447 | 4.0 | 3.1 |
| 54 | AI | 0.198 | 450 | 449 | 3.8 | 2.0 |
| 55 | AI | 0.199 | 452 | 449 | 2.6 | 2.5 |
| 56 | AI | 0.197 | 452 | 450 | 3.8 | 1.9 |
| 57 | AI | 0.232 | 457 | 453 | 2.6 | 2.1 |
| 58 | AI | 0.183 | 459 | 459 | 5.5 | 2.5 |
| 59 | AI | 0.197 | 450 | 450 | 5.2 | 2.3 |
| 60 | AI | <u>0.168</u> | 454 | 454 | 7.1 | 2.1 |
| 61 | AJ | 0.193 | 453 | 444 | 3.0 | 2.2 |
| 62 | AJ | 0.191 | 444 | 440 | 7.4 | 2.8 |
| 63 | AJ | 0.193 | 445 | 443 | 5.2 | 2.8 |
| 64 | AJ | 0.180 | 459 | 459 | 3.4 | 1.8 |
| 65 | AJ | 0.195 | 450 | 449 | 3.8 | 1.6 |
| 66 | AJ | 0.194 | 448 | 445 | 4.1 | 1.8 |
| 67 | AJ | <u>0.257</u> | 450 | 449 | 6.3 | 2.0 |
| 68 | AJ | | EXPERIMENT STOPPED | | | |
| 69 | AK | 0.182 | 453 | 454 | 3.8 | 2.6 |
| 70 | AK | 0.197 | 451 | 446 | 5.8 | 2.3 |
| 71 | AK | 0.185 | 452 | 456 | 4.3 | 2.6 |
| 72 | AK | | EXPERIMENT STOPPED | | | |
| 73 | AK | 0.189 | 451 | 447 | 4.6 | 2.1 |
| 74 | AK | 0.187 | 452 | 454 | 2.7 | 1.7 |
| 75 | AK | 0.195 | 448 | 446 | 5.7 | 2.6 |
| 76 | AK | 0.195 | 450 | 447 | 6.9 | 2.3 |
| 77 | AK | 0.182 | 458 | 457 | 7.1 | 1.7 |
| 78 | AL | 0.201 | 451 | 449 | 4.9 | 1.9 |
| 79 | AL | 0.199 | 446 | 449 | 3.2 | 2.1 |
| 80 | AL | 0.199 | 446 | 449 | 6.2 | 2.5 |
| 81 | AL | 0.201 | 455 | 454 | 3.5 | 2.3 |
| 82 | AL | 0.198 | 449 | 450 | 6.3 | 3.1 |
| 83 | AL | 0.222 | 446 | 449 | 6.8 | 2.7 |
| 84 | AM | 0.202 | 450 | 449 | 2.5 | 3.0 |
| 85 | AN | 0.186 | 452 | 449 | 3.4 | 2.1 |
| 86 | AN | 0.180 | 451 | 450 | 5.2 | 2.5 |
| 87 | AN | 0.185 | 453 | 449 | 7.4 | 2.4 |
| 88 | <u>AO</u> | 0.184 | 452 | 451 | 2.8 | 1.7 |
| 89 | <u>AP</u> | 0.216 | 456 | 456 | 5.8 | 2.5 |
| 90 | <u>AQ</u> | 0.204 | 449 | 449 | 4.6 | 2.1 |
| 91 | <u>AR</u> | 0.203 | 446 | 448 | 3.8 | 1.6 |
| 92 | <u>AS</u> | 0.206 | 446 | 445 | 4.7 | 2.1 |
| 93 | <u>AT</u> | 0.215 | 446 | 445 | 3.5 | 2.0 |
| 94 | AK | 0.184 | 454 | 453 | 4.1 | 1.7 |
| 95 | AI | 0.200 | 452 | 450 | 3.8 | 1.9 |
| 96 | AI | 0.197 | 452 | 450 | 3.8 | 1.9 |
| 97 | AI | 0.196 | 450 | 449 | 5.1 | 1.7 |
| 98 | AI | 0.192 | 449 | 448 | 4.5 | 2.0 |
| 99 | AI | 0.189 | 448 | 450 | 4.6 | 1.8 |

TABLE 10-continued

| | COOLING AFTER PLATING | | | | COLD ROLLING | |
|---|---|---|---|---|---|---|
| | BAINITE TRANSFORMATION TREATMENT 2 | | REHEAT TREATMENT | | | |
| EXPERIMENTAL EXAMPLE | TREATMENT TEMPERATURE (° C.) | TREATMENT TIME (SECOND) | TREATMENT TEMPERATURE (° C.) | TREATMENT TIME (SECOND) | REDUCTION RATIO (%) | REMARKS |
| 51 | 338 | 57 | — | — | 0.16 | EXAMPLE |
| 52 | — | — | — | — | 0.09 | EXAMPLE |
| 53 | — | — | — | — | 0.12 | EXAMPLE |
| 54 | — | — | — | — | 0.11 | EXAMPLE |
| 55 | — | — | — | — | 0.10 | EXAMPLE |
| 56 | — | — | — | — | 0.10 | EXAMPLE |
| 57 | 342 | 38 | — | — | 0.06 | EXAMPLE |
| 58 | <u>398</u> | 164 | — | — | 0.10 | COMPARATIVE EXAMPLE |
| 59 | — | — | — | — | 0.08 | EXAMPLE |
| 60 | — | — | — | — | 0.10 | COMPARATIVE EXAMPLE |
| 61 | — | — | — | — | 0.11 | EXAMPLE |
| 62 | — | — | — | — | 0.10 | EXAMPLE |
| 63 | — | — | — | — | 0.10 | EXAMPLE |
| 64 | — | — | — | — | 0.11 | EXAMPLE |
| 65 | — | — | — | — | 0.11 | EXAMPLE |
| 66 | <u>235</u> | 105 | — | — | 0.11 | EXAMPLE |
| 67 | — | — | — | — | 0.10 | COMPARATIVE EXAMPLE |
| 68 | | | EXPERIMENT STOPPED | | | COMPARATIVE EXAMPLE |
| 69 | — | — | — | — | 0.00 | EXAMPLE |
| 70 | 328 | 113 | — | — | 0.00 | EXAMPLE |
| 71 | — | — | 310 | 781 | 0.03 | EXAMPLE |
| 72 | | | EXPERIMENT STOPPED | | | COMPARATIVE EXAMPLE |
| 73 | 347 | 183 | — | — | 0.10 | COMPARATIVE EXAMPLE |
| 74 | — | — | — | — | 0.10 | EXAMPLE |
| 75 | — | — | — | — | 0.10 | EXAMPLE |
| 76 | — | — | — | — | 0.08 | EXAMPLE |
| 77 | 336 | 26 | — | — | 0.05 | EXAMPLE |
| 78 | — | — | — | — | 0.11 | EXAMPLE |
| 79 | — | — | — | — | 0.11 | EXAMPLE |
| 80 | 315 | <u>6</u> | — | — | 0.10 | EXAMPLE |
| 81 | 347 | 9 | — | — | 0.11 | EXAMPLE |
| 82 | 338 | 38 | 317 | 17 | 0.09 | EXAMPLE |
| 83 | — | — | — | — | 0.10 | EXAMPLE |
| 84 | — | — | — | — | 0.09 | EXAMPLE |
| 85 | — | — | — | — | 0.14 | EXAMPLE |
| 86 | — | — | — | — | 0.14 | EXAMPLE |
| 87 | — | — | — | — | 0.10 | EXAMPLE |
| 88 | — | — | — | — | 0.08 | COMPARATIVE EXAMPLE |
| 89 | — | — | — | — | 0.10 | COMPARATIVE EXAMPLE |
| 90 | — | — | — | — | 0.10 | COMPARATIVE EXAMPLE |
| 91 | — | — | — | — | 0.10 | COMPARATIVE EXAMPLE |
| 92 | — | — | — | — | 0.10 | COMPARATIVE EXAMPLE |
| 93 | — | — | — | — | 0.10 | COMPARATIVE EXAMPLE |
| 94 | — | — | — | — | 0.00 | COMPARATIVE EXAMPLE |
| 95 | — | — | — | — | 0.10 | COMPARATIVE EXAMPLE |
| 96 | — | — | — | — | 0.10 | EXAMPLE |
| 97 | — | — | — | — | 0.09 | COMPARATIVE EXAMPLE |
| 98 | — | — | — | — | 0.12 | EXAMPLE |
| 99 | — | — | — | — | 0.10 | COMPARATIVE EXAMPLE |

TABLE 11

| EXPERIMENTAL EXAMPLE | STEEL TYPE | HOT-DIP GALVANIZING LAYER MICROSTRUCTURE CONSTITUENT STRUCTURE | γ FRACTION (%) | CONTENT (%) Fe | CONTENT (%) Al | DEPOSITION AMOUNT (g/m²) | Fe—Al ALLOY LAYER AVERAGE THICKNESS (μm) | Fe—Al ALLOY LAYER THICKNESS DIFFERENCE IN WIDTH DIRECTION (μm) |
|---|---|---|---|---|---|---|---|---|
| 1 | A | F, BF, M, γ | 3 | 1.0 | 0.41 | 61 | 0.5 | 0.2 |
| 2 | A | F, BF, B, M, γ | 5 | 0.5 | 0.37 | 58 | 0.8 | 0.3 |
| 3 | A | F, BF, B, γ | 2 | 6.5 | 0 | 64 | 0 | 0 |
| 4 | B | F, BF, B, γ | 6 | 0.7 | 0.37 | 72 | 0.5 | 0.2 |
| 5 | B | F, BF, B, M, γ | 2 | 1.1 | 0.22 | 58 | 0.5 | 0.2 |
| 6 | B | EXPERIMENT STOPPED | | | | | | |
| 7 | C | F, BF, γ | 8 | 1.3 | 0.22 | 48 | 0.4 | 0.2 |
| 8 | D | WF, BF, B, M, γ | 3 | 0.6 | 0.32 | 43 | 0.6 | 0.3 |
| 9 | D | F, BF, B, tM, γ | 3 | 1.0 | 0.34 | 42 | 0.5 | 0.2 |
| 10 | E | F, BF, B, M, γ | 5 | 1.1 | 0.32 | 63 | 0.5 | 0.6 |
| 11 | E | F, BF, B, M, γ | 5 | 1.3 | 0.28 | 61 | 0.5 | 0.3 |
| 12 | F | F, BF, B, M, γ | 4 | 1.3 | 0.23 | 61 | 0.3 | 0.1 |
| 13 | G | F, BF, γ | 8 | 2.0 | 0.28 | 45 | 0.6 | 0.3 |
| 14 | H | F, BF, M, γ | 10 | 0.8 | 0.24 | 76 | 0.7 | 0.3 |
| 15 | I | F, BF, B, M, γ | 4 | 1.0 | 0.26 | 45 | 0.5 | 0.2 |
| 16 | I | BF, B, tM, M, γ | 2 | 1.0 | 0.34 | 60 | 0.8 | 0.2 |
| 17 | J | F, B, tM, M, γ | 3 | 1.1 | 0.34 | 61 | 0.6 | 0.2 |
| 18 | K | F, BF, tM, γ | 5 | 1.3 | 0.24 | 64 | 0.7 | 0.2 |
| 19 | L | F, BF, B, γ | 11 | 0.9 | 0.23 | 74 | 0.5 | 0.3 |
| 20 | L | F, WF, B, M, γ | 7 | 3.5 | 0.31 | 44 | 0.4 | 0.1 |
| 21 | M | F, M, γ | 11 | 1.0 | 0.35 | 50 | 0.6 | 0.2 |
| 22 | N | F, tM, γ | 4 | 0.4 | 0.41 | 76 | 0.7 | 0.7 |
| 23 | O | F, BF, γ | 11 | 0.9 | 0.28 | 59 | 0.7 | 0.3 |
| 24 | P | F, BF, M, γ | 5 | 0.7 | 0.40 | 63 | 0.6 | 0.3 |
| 25 | Q | F, BF, M, γ | 4 | 0.7 | 0.25 | 72 | 0.6 | 0.2 |
| 26 | Q | F, BF, M, γ | 5 | 1.0 | 0.24 | 50 | 0.4 | 0.2 |
| 27 | R | F, BF, M, γ | 5 | 1.9 | 0.20 | 45 | 0.5 | 0.3 |
| 28 | R | EXPERIMENT STOPPED | | | | | | |
| 29 | S | F, BF, M, γ | 4 | 1.6 | 0.20 | 62 | 0.3 | 0.1 |
| 30 | T | F, BF, γ | 6 | 0.8 | 0.22 | 74 | 0.5 | 0.6 |
| 31 | U | F, NRF, B, BF, tM, γ | 4 | 2.0 | 0.20 | 51 | 0.6 | 0.3 |
| 32 | V | F, BF, M, γ | 3 | 0.9 | 0.23 | 60 | 0.5 | 0.3 |
| 33 | V | F, BF, M, γ | 3 | 3.7 | 0.31 | 73 | 0.6 | 0.5 |
| 34 | W | F, B, M, γ | 3 | 1.4 | 0.34 | 51 | 0.7 | 0.2 |
| 35 | X | F, BF, M, γ | 6 | 1.1 | 0.34 | 75 | 0.5 | 0.3 |
| 36 | X | F, BF, M, γ | 5 | 5.5 | 0.40 | 50 | 0.6 | 0.3 |
| 37 | Y | F, BF, M, γ | 1 | 1.3 | 0.28 | 60 | 0.7 | 0.2 |
| 38 | Z | F, NRF, BF, M, γ | 1 | 1.0 | 0.32 | 47 | 0.6 | 0.2 |
| 39 | AA | BF, B, M, γ | 2 | 2.7 | 0.23 | 63 | 0.4 | 0.2 |
| 40 | AA | F, B | 0 | 3.1 | 0.10 | 45 | 0.08 | 0.1 |
| 41 | AB | F, BF, γ | 13 | 0.8 | 0.34 | 50 | 0.4 | 0.2 |
| 42 | AB | F, NRF, B | 0 | 0.2 | 1.02 | 62 | 2.2 | 0.5 |
| 43 | AC | F, BF, γ | 8 | 1.0 | 0.42 | 46 | 0.6 | 0.6 |
| 44 | AD | F, WF, BF, B, γ | 4 | 1.1 | 0.37 | 49 | 0.6 | 0.7 |
| 45 | AD | F, WF, BF, B, γ | 4 | 1.5 | 0.33 | 52 | 0.7 | 0.2 |
| 46 | AD | F, NRF, B | 0 | 0.1 | 0.36 | 48 | 0.5 | 0.3 |
| 47 | AE | EXPERIMENT STOPPED | | | | | | |
| 48 | AE | EXPERIMENT STOPPED | | | | | | |
| 49 | AG | EXPERIMENT STOPPED | | | | | | |
| 50 | AH | EXPERIMENT STOPPED | | | | | | |

| EXPERIMENTAL EXAMPLE | BASE STEEL SHEET FINE-GRAIN LAYER AVERAGE THICKNESS (μm) | FINE-GRAIN LAYER THICKNESS DIFFERENCE IN WIDTH DIRECTION (μm) | AVERAGE GRAIN DIAMETER OF FERRITE PHASE (μm) | MAXIMUM DIAMETER OF OXIDE (μm) | REMARKS |
|---|---|---|---|---|---|
| 1 | 3.1 | 0.3 | 0.8 | 0.03 | EXAMPLE |
| 2 | 2.7 | 0.4 | 0.4 | 0.1 | EXAMPLE |
| 3 | 2.6 | 0.2 | 0.5 | 0.04 | COMPARATIVE EXAMPLE |
| 4 | 3.3 | 0.3 | 1.2 | 0.02 | EXAMPLE |
| 5 | 0.1 | 0.1 | 0.2 | 0.01 | EXAMPLE |
| 6 | EXPERIMENT STOPPED | | | | COMPARATIVE EXAMPLE |
| 7 | 2 | 0.2 | 2.4 | 0.03 | EXAMPLE |
| 8 | 3.4 | 0.3 | 0.4 | 0.03 | EXAMPLE |

TABLE 11-continued

| | | | | | |
|---|---|---|---|---|---|
| 9 | 3.2 | 0.3 | 2.3 | 0.02 | EXAMPLE |
| 10 | 2.8 | 2.2 | 0.4 | 0.1 | COMPARATIVE EXAMPLE |
| 11 | 2.5 | 0.5 | 0.3 | 0.1 | EXAMPLE |
| 12 | 2.3 | 0.1 | 0.4 | 0.04 | EXAMPLE |
| 13 | 4 | 0.2 | 0.7 | 0.02 | EXAMPLE |
| 14 | 1.9 | 0.2 | 0.4 | 0.03 | EXAMPLE |
| 15 | 2.4 | 0.3 | 0.3 | 0.04 | EXAMPLE |
| 16 | 3.2 | 0.3 | 0.3 | 0.04 | EXAMPLE |
| 17 | 3.2 | 0.1 | 0.3 | 0.1 | EXAMPLE |
| 18 | 2.5 | 0.5 | 0.4 | 0.03 | EXAMPLE |
| 19 | 3 | 0.1 | 0.8 | 0.03 | EXAMPLE |
| 20 | 3.1 | 0.3 | 0.9 | 0.04 | COMPARATIVE EXAMPLE |
| 21 | 2.5 | 0.2 | 0.3 | 0.03 | EXAMPLE |
| 22 | 2.6 | 2.5 | 1.4 | 0.02 | COMPARATIVE EXAMPLE |
| 23 | 3 | 0.2 | 0.3 | 0.1 | EXAMPLE |
| 24 | 3 | 0.3 | 0.3 | 0.1 | EXAMPLE |
| 25 | 2 | 0.1 | 2.4 | 0.02 | EXAMPLE |
| 26 | 1.8 | 0.3 | 1.3 | 0.5 | COMPARATIVE EXAMPLE |
| 27 | 4.1 | 0.4 | 0.4 | 0.03 | EXAMPLE |
| 28 | EXPERIMENT STOPPED | | | | COMPARATIVE EXAMPLE |
| 29 | 2.4 | 0.2 | 0.5 | 0.3 | EXAMPLE |
| 30 | 2.9 | 2.3 | 1.5 | 0.02 | COMPARATIVE EXAMPLE |
| 31 | 3 | 0.2 | 0.4 | 0.1 | EXAMPLE |
| 32 | 3 | 0.3 | 0.4 | 0.03 | EXAMPLE |
| 33 | 6.1 | 0.3 | 0.8 | 0.02 | COMPARATIVE EXAMPLE |
| 34 | 2 | 0.2 | 0.3 | 0.03 | EXAMPLE |
| 35 | 2.4 | 0.4 | 0.4 | 0.02 | EXAMPLE |
| 36 | 12.8 | 0.6 | 0.4 | 0.02 | COMPARATIVE EXAMPLE |
| 37 | 1.7 | 0.2 | 1.5 | 0.02 | EXAMPLE |
| 38 | 3.1 | 0.2 | 1.3 | 0.02 | EXAMPLE |
| 39 | 4.7 | 0.4 | 2.3 | 0.03 | EXAMPLE |
| 40 | 2.2 | 0.3 | 0.5 | 0.1 | COMPARATIVE EXAMPLE |
| 41 | 0.5 | 0.1 | 0.7 | 0.1 | EXAMPLE |
| 42 | 1.3 | 1.1 | 0.4 | 0.04 | COMPARATIVE EXAMPLE |
| 43 | 3.1 | 2.3 | 2.3 | 0.01 | COMPARATIVE EXAMPLE |
| 44 | 2.8 | 3.5 | 1.3 | 0.02 | COMPARATIVE EXAMPLE |
| 45 | 2.1 | 0.9 | 1.1 | 0.02 | EXAMPLE |
| 46 | <0.1 | <0.1 | (3.6) | (<0.01) | COMPARATIVE EXAMPLE |
| 47 | EXPERIMENT STOPPED | | | | COMPARATIVE EXAMPLE |
| 48 | EXPERIMENT STOPPED | | | | COMPARATIVE EXAMPLE |
| 49 | EXPERIMENT STOPPED | | | | COMPARATIVE EXAMPLE |
| 50 | EXPERIMENT STOPPED | | | | COMPARATIVE EXAMPLE |

TABLE 12

| EXPERIMENTAL EXAMPLE | STEEL TYPE | MICROSTRUCTURE CONSTITUENT STRUCTURE | γ FRACTION (%) | HOT-DIP GALVANIZING LAYER CONTENT (%) Fe | HOT-DIP GALVANIZING LAYER CONTENT (%) Al | DEPOSITION AMOUNT (g/m²) | Fe—Al ALLOY LAYER AVERAGE THICKNESS (μm) | Fe—Al ALLOY LAYER THICKNESS DIFFERENCE IN WIDTH DIRECTION (μm) |
|---|---|---|---|---|---|---|---|---|
| 51 | AI | F, BF, M, γ | 3 | 1.1 | 0.37 | 51 | 0.7 | 0.3 |
| 52 | AI | NRF, F, B, γ | 5 | 0.6 | 0.32 | 63 | 0.6 | 0.2 |
| 53 | AI | F, BF, B, M, γ | 6 | 0.5 | 0.37 | 58 | 0.7 | 0.2 |
| 54 | AI | F, M, θ | 0 | 0.9 | 0.35 | 62 | 0.6 | 0.3 |
| 55 | AI | F, P, B | 0 | 1.1 | 0.36 | 54 | 0.8 | 0.2 |

TABLE 12-continued

| | | | | | | | | |
|---|---|---|---|---|---|---|---|---|
| 56 | AI | F, BF, γ | 6 | 0.5 | 0.37 | 58 | 0.8 | 0.2 |
| 57 | AI | F, B, BF, γ | 4 | 0.4 | 0.89 | 60 | 1.2 | 0.4 |
| 58 | AI | F, BF, γ | 6 | <u>3.4</u> | 0.52 | 72 | 0.4 | 0.2 |
| 59 | AI | F, M | <u>0</u> | 1.1 | 0.22 | 63 | 0.6 | 0.2 |
| 60 | AI | F, BF, B, M, γ | 2 | <u>3.7</u> | 0.40 | 64 | <u>0.07</u> | 0.1 |
| 61 | AJ | F, BF, B, γ | 6 | 0.8 | 0.37 | 65 | 0.7 | 0.2 |
| 62 | AJ | F, BF, B, M, γ | 3 | 1.1 | 0.22 | 58 | 0.6 | 0.1 |
| 63 | AJ | F, BF, M, γ | 1 | 1.0 | 0.28 | 53 | 0.8 | 0.2 |
| 64 | AJ | F, BF, B, γ | 5 | 2.6 | 0.38 | 52 | 0.3 | 0.2 |
| 65 | AJ | F, P | <u>0</u> | 1.0 | 0.42 | 60 | 0.7 | 0.3 |
| 66 | AJ | F, BF, M | <u>0</u> | 1.0 | 0.32 | 56 | 0.6 | 0.2 |
| 67 | AJ | F, BF, B, M, γ | 4 | 0.2 | <u>1.07</u> | 52 | <u>2.3</u> | 0.5 |
| 68 | AJ | EXPERIMENT STOPPED | | | | | | |
| 69 | AK | F, BF, γ | 9 | 1.4 | 0.24 | 45 | 0.4 | 0.2 |
| 70 | AK | F, WF, BF, M, γ | 6 | 0.9 | 0.20 | 65 | 0.7 | 0.3 |
| 71 | AK | F, BF, tM, γ | 11 | 1.2 | 0.36 | 72 | 0.6 | 0.3 |
| 72 | AK | EXPERIMENT STOPPED | | | | | | |
| 73 | AK | F, BF, M, γ | 4 | 0.1 | 0.42 | 46 | 0.6 | 0.2 |
| 74 | AK | F, M | <u>0</u> | 1.4 | 0.24 | 54 | 0.6 | 0.2 |
| 75 | AK | F, P, BF, B, M | <u>0</u> | 1.3 | 0.34 | 58 | 0.7 | 0.2 |
| 76 | AK | F, BF, M | <u>0</u> | 1.3 | 0.31 | 51 | 0.6 | 0.3 |
| 77 | AK | BF, B, M, γ | 10 | 1.1 | 0.41 | 50 | 0.4 | 0.2 |
| 78 | AL | F, NRF, θ, M | <u>0</u> | 0.7 | 0.25 | 57 | 0.9 | 0.5 |
| 79 | AL | F, BF, M, γ | 5 | 0.8 | 0.32 | 67 | 0.8 | 0.4 |
| 80 | AL | F, BF, B, M | <u>0</u> | 0.9 | 0.31 | 63 | 0.7 | 0.4 |
| 81 | AL | F, BF, B, M, γ | 3 | 1.2 | 0.20 | 57 | 0.6 | 0.3 |
| 82 | AL | F, BF, E3, tM, γ | 6 | 11 | 0.29 | 57 | 0.7 | 0.2 |
| 83 | AL | F, BF, M, γ | 5 | 0.2 | 0.98 | 49 | 1.0 | 0.3 |
| 84 | AM | F, EL, BF | <u>0</u> | 1.3 | 0.44 | 36 | 0.8 | 0.2 |
| 85 | AN | F, B, BF, γ | 2 | 0.8 | 0.28 | 46 | 0.5 | 0.2 |
| 86 | AN | F, B, BF, γ | 3 | 2.8 | 0.11 | 60 | 0.6 | 0.2 |
| 87 | AN | F, B, BF, P, θ | <u>0</u> | 0.7 | 0.24 | 50 | 0.6 | 0.3 |
| 88 | <u>AQ</u> | BF, M, γ | 29 | 1.6 | 0.30 | 50 | 0.6 | 0.3 |
| 89 | <u>AP</u> | F, θ | <u>0</u> | 1.2 | 0.25 | 60 | 0.9 | 0.3 |
| 90 | <u>AQ</u> | F, P, θ | <u>0</u> | 1.5 | 0.28 | 61 | 0.6 | 0.2 |
| 91 | <u>AR</u> | RBRM, γ | 6 | 1.1 | 0.35 | 48 | 0.7 | 0.3 |
| 92 | <u>AS</u> | RBRM, γ | 6 | 1.2 | 0.26 | 55 | 0.7 | 0.2 |
| 93 | <u>AT</u> | F, BF, B, M, γ | 9 | 1.0 | 0.36 | 63 | 0.8 | 0.2 |
| 94 | AK | RBR γ | 8 | 1.3 | 0.25 | 50 | 0.6 | 0.2 |
| 95 | AI | F, BF, γ | 6 | <u>3.5</u> | 0.31 | 68 | 0.8 | <u>0.8</u> |
| 96 | AI | RBR γ | 6 | 2.6 | 0.23 | 55 | 0.6 | 0.2 |
| 97 | AI | NRF, F, B, γ | 5 | 0.6 | 0.32 | 63 | 0.6 | <u>0.6</u> |
| 98 | AI | NRF, F, B, γ | 6 | 0.8 | 0.31 | 58 | 0.7 | 0.4 |
| 99 | AI | NRF, F, B, γ | 5 | 0.7 | 0.29 | 55 | 0.6 | <u>0.6</u> |

| | BASE STEEL SHEET | | | | |
|---|---|---|---|---|---|
| | FINE-GRAIN LAYER | | | | |
| EXPERIMENTAL EXAMPLE | AVERAGE THICKNESS (μm) | THICKNESS DIFFERENCE IN WIDTH DIRECTION (μm) | AVERAGE GRAIN DIAMETER OF FERRITE PHASE (μm) | MAXIMUM DIAMETER OF OXIDE (μm) | REMARKS |
| 51 | 2.0 | 0.3 | 0.3 | 0.2 | EXAMPLE |
| 52 | 3.1 | 0.4 | 0.3 | 0.04 | EXAMPLE |
| 53 | 2.5 | 0.2 | 0.9 | 0.04 | EXAMPLE |
| 54 | 3.3 | 0.5 | 0.2 | 0.03 | EXAMPLE |
| 55 | 3.5 | 0.3 | 0.3 | 0.2 | EXAMPLE |
| 56 | 0.4 | 0.4 | 1.2 | 0.3 | EXAMPLE |
| 57 | 3.5 | 0.3 | 0.4 | 0.1 | EXAMPLE |
| 58 | 3.2 | 0.3 | 1.8 | 0.03 | COMPARATIVE EXAMPLE |
| 59 | 2.3 | 0.2 | 2.6 | 0.03 | EXAMPLE |
| 60 | 3.5 | 0.3 | 2.3 | 0.03 | COMPARATIVE EXAMPLE |
| 61 | 2.6 | 0.3 | 0.3 | 0.1 | EXAMPLE |
| 62 | 0.8 | 0.2 | 0.9 | 0.3 | EXAMPLE |
| 63 | 1.5 | 0.4 | 0.4 | 0.3 | EXAMPLE |
| 64 | 2.4 | 0.3 | 0.3 | 0.04 | EXAMPLE |
| 65 | 2.1 | 0.3 | 0.4 | 0.03 | EXAMPLE |
| 66 | 1.8 | 0.4 | 0.4 | 0.02 | EXAMPLE |
| 67 | 3.2 | 0.2 | 0.4 | 0.02 | COMPARATIVE EXAMPLE |
| 68 | EXPERIMENT STOPPED | | | | COMPARATIVE EXAMPLE |
| 69 | 1.5 | 0.3 | 0.3 | 0.1 | EXAMPLE |
| 70 | 1.7 | 0.4 | 0.3 | 0.1 | EXAMPLE |
| 71 | 1.3 | 0.4 | 0.6 | 0.04 | EXAMPLE |

TABLE 12-continued

| | | | | | |
|---|---|---|---|---|---|
| 72 | EXPERIMENT STOPPED | | | | COMPARATIVE EXAMPLE |
| 73 | ≤0.1 | <0.1 | (3.3) | (<0.01) | COMPARATIVE EXAMPLE |
| 74 | 1.7 | 0.5 | 2.3 | 0.01 | EXAMPLE |
| 75 | 1.8 | 0.4 | 1.8 | 0.04 | EXAMPLE |
| 76 | 1.7 | 0.6 | 0.3 | 0.1 | EXAMPLE |
| 77 | 1.7 | 0.3 | 0.4 | 0.1 | EXAMPLE |
| 78 | 1.7 | 1.6 | 1.3 | 0.03 | EXAMPLE |
| 79 | 1.9 | 1.2 | 0.3 | 0.04 | EXAMPLE |
| 80 | 2.3 | 1.1 | 1.4 | 0.04 | EXAMPLE |
| 81 | 1.7 | 0.8 | 0.8 | 0.03 | EXAMPLE |
| 82 | 2.1 | 0.5 | 0.3 | 0.04 | EXAMPLE |
| 83 | 1.4 | 0.6 | 1.5 | 0.03 | EXAMPLE |
| 84 | 3.1 | 0.3 | 0.4 | 0.02 | EXAMPLE |
| 85 | 3.1 | 0.4 | 0.4 | 0.03 | EXAMPLE |
| 86 | 3.9 | 0.3 | 0.9 | 0.03 | EXAMPLE |
| 87 | 2.5 | 0.5 | 0.4 | 0.04 | EXAMPLE |
| 88 | 2.8 | 0.6 | 0.3 | 0.1 | COMPARATIVE EXAMPLE |
| 89 | 2.9 | 0.7 | 0.4 | 0.1 | COMPARATIVE EXAMPLE |
| 90 | 2.2 | 0.4 | 0.4 | 0.1 | COMPARATIVE EXAMPLE |
| 91 | 2.1 | 0.8 | 0.4 | 0.03 | COMPARATIVE EXAMPLE |
| 92 | 2.2 | 0.5 | 0.4 | 0.02 | COMPARATIVE EXAMPLE |
| 93 | 1.9 | 0.4 | 0.4 | 0.03 | COMPARATIVE EXAMPLE |
| 94 | 2.3 | 0.5 | 0.7 | 0.5 | COMPARATIVE EXAMPLE |
| 95 | 5.5 | 0.3 | 0.8 | 0.03 | COMPARATIVE EXAMPLE |
| 96 | 4.3 | 0.3 | 1.8 | 0.02 | EXAMPLE |
| 97 | 3.1 | 2.1 | 0.3 | 0.04 | COMPARATIVE EXAMPLE |
| 98 | 1.2 | 0.5 | 0.8 | 0.02 | EXAMPLE |
| 99 | 0.8 | 2.1 | 0.6 | 0.01 | COMPARATIVE EXAMPLE |

TABLE 13

| | | | TENSILE PROPERTIES | | | | |
|---|---|---|---|---|---|---|---|
| EXPERIMENTAL EXAMPLE | STEEL TYPE | SHEET THICKNESS (mm) | MAXIMUM TENSILE STRENGTH TS (MPa) | TOTAL ELONGATION El (%) | HOLE EXPANDABILITY λ (%) | $TS^{1.5} \times El \times \lambda^{0.5}$ | PLATING ADHESION |
| 1 | A | 1.7 | 861 | 24 | 34 | 3535537 | ⊚ |
| 2 | A | 1.2 | 765 | 29 | 35 | 3630147 | ⊚ |
| 3 | A | 1.8 | 694 | 35 | 29 | 3445928 | X |
| 4 | B | 1.4 | 558 | 37 | 57 | 3682057 | ⊚ |
| 5 | B | 2.0 | 597 | 33 | 45 | 3229101 | ○ |
| 6 | B | | EXPERIMENT STOPPED | | | | |
| 7 | C | 1.4 | 1017 | 21 | 29 | 3667750 | ⊚ |
| 8 | D | 1.3 | 738 | 27 | 37 | 3292677 | ⊚ |
| 9 | D | 2.3 | 853 | 23 | 41 | 3668963 | ⊚ |
| 10 | E | 1.7 | 804 | 22 | 54 | 3685561 | ⊚ |
| 11 | E | 1.7 | 800 | 23 | 54 | 3824368 | ⊚ |
| 12 | F | 1.7 | 748 | 25 | 41 | 3274797 | ⊚ |
| 13 | G | 1.2 | 741 | 31 | 34 | 3646099 | ⊚ |
| 14 | H | 1.4 | 950 | 23 | 28 | 3563627 | ⊚ |
| 15 | I | 1.9 | 1042 | 17 | 35 | 3382864 | ⊚ |
| 16 | I | 1.0 | 981 | 17 | 46 | 3542675 | ⊚ |
| 17 | J | 1.3 | 1090 | 17 | 26 | 3119431 | ⊚ |
| 18 | K | 1.2 | 847 | 24 | 33 | 3398547 | ⊚ |
| 19 | L | 2.2 | 948 | 22 | 27 | 3336699 | ⊚ |
| 20 | L | 1.0 | 885 | 23 | 25 | 3027699 | X |
| 21 | M | 2.0 | 918 | 22 | 38 | 3772059 | ⊚ |
| 22 | N | 1.8 | 582 | 27 | 53 | 2759854 | ⊚ |
| 23 | O | 2.0 | 823 | 27 | 29 | 3432911 | ⊚ |
| 24 | P | 1.3 | 804 | 26 | 30 | 3246520 | ⊚ |
| 25 | Q | 1.2 | 755 | 26 | 35 | 3191007 | ⊚ |
| 26 | Q | 1.0 | 692 | 27 | 27 | 2553905 | X |
| 27 | R | 1.4 | 819 | 23 | 45 | 3616262 | ⊚ |

TABLE 13-continued

| | | | | | | | |
|---|---|---|---|---|---|---|---|
| 28 | R | | | EXPERIMENT STOPPED | | | |
| 29 | S | 1.4 | 1109 | 19 | 24 | 3437610 | ⊚ |
| 30 | T | 1.4 | 791 | 22 | 45 | 3283172 | ⊚ |
| 31 | U | 1.6 | 692 | 26 | 38 | 2917590 | ⊚ |
| 32 | V | 1.7 | 639 | 32 | 49 | 3618256 | ⊚ |
| 33 | V | 1.0 | 558 | 33 | 37 | 2645855 | X |
| 34 | W | 1.7 | 845 | 23 | 35 | 3342311 | ⊚ |
| 35 | X | 1.9 | 1010 | 20 | 30 | 3516193 | ⊚ |
| 36 | X | 1.0 | 731 | 25 | 26 | 2519433 | X |
| 37 | Y | 1.0 | 643 | 29 | 42 | 3064355 | ⊚ |
| 38 | Z | 1.3 | 598 | 33 | 35 | 2854958 | ⊚ |
| 39 | AA | 2.0 | 843 | 19 | 41 | 2977741 | ○ |
| 40 | AA | 1.0 | 781 | 18 | 39 | 2453473 | X |
| 41 | AB | 1.4 | 781 | 28 | 35 | 3615502 | ⊚ |
| 42 | AB | 2.0 | 687 | 23 | 43 | 2715796 | X |
| 43 | AC | 1.4 | 721 | 28 | 33 | 3113995 | ⊚ |
| 44 | AD | 1.4 | 584 | 39 | 37 | 3347995 | ⊚ |
| 45 | AD | 1.4 | 587 | 38 | 36 | 3242590 | ⊚ |
| 46 | AD | 1.4 | 618 | 26 | 40 | 2526307 | X |
| 47 | AE | | | EXPERIMENT STOPPED | | | |
| 48 | AF | | | EXPERIMENT STOPPED | | | |
| 49 | AG | | | EXPERIMENT STOPPED | | | |
| 50 | AH | | | EXPERIMENT STOPPED | | | |

| EXPERIMENTAL EXAMPLE | SPOT WELDABILITY | CORROSION RESISTANCE | CHIPPING RESISTANCE | POWDERING RESISTANCE | PLATING APPEARANCE UNIFORMITY | REMARKS |
|---|---|---|---|---|---|---|
| 1 | ○ | ○ | ○ | ○ | ○ | EXAMPLE |
| 2 | ○ | ○ | ○ | ○ | ○ | EXAMPLE |
| 3 | ○ | ○ | X | X | X | COMPARATIVE EXAMPLE |
| 4 | ○ | ○ | ○ | ○ | ○ | EXAMPLE |
| 5 | ○ | ○ | ○ | ○ | ○ | EXAMPLE |
| 6 | | | EXPERIMENT STOPPED | | | COMPARATIVE EXAMPLE |
| 7 | ○ | ○ | ○ | ○ | ○ | EXAMPLE |
| 8 | ○ | ○ | ○ | ○ | ○ | EXAMPLE |
| 9 | ○ | ○ | ○ | ○ | ○ | EXAMPLE |
| 10 | ○ | ○ | ○ | ○ | Δ | COMPARATIVE EXAMPLE |
| 11 | ○ | ○ | ○ | ○ | ○ | EXAMPLE |
| 12 | ○ | ○ | ○ | ○ | ○ | EXAMPLE |
| 13 | ○ | ○ | ○ | ○ | ○ | EXAMPLE |
| 14 | ○ | ○ | ○ | ○ | ○ | EXAMPLE |
| 15 | ○ | ○ | ○ | ○ | ○ | EXAMPLE |
| 16 | ○ | ○ | ○ | ○ | ○ | EXAMPLE |
| 17 | ○ | ○ | ○ | ○ | ○ | EXAMPLE |
| 18 | ○ | ○ | ○ | ○ | ○ | EXAMPLE |
| 19 | ○ | ○ | ○ | ○ | ○ | EXAMPLE |
| 20 | ○ | ○ | X | X | ○ | COMPARATIVE EXAMPLE |
| 21 | ○ | ○ | ○ | ○ | ○ | EXAMPLE |
| 22 | ○ | ○ | ○ | ○ | Δ | COMPARATIVE EXAMPLE |
| 23 | ○ | ○ | ○ | ○ | ○ | EXAMPLE |
| 24 | ○ | ○ | ○ | ○ | ○ | EXAMPLE |
| 25 | ○ | ○ | ○ | ○ | ○ | EXAMPLE |
| 26 | ○ | ○ | ○ | X | ○ | COMPARATIVE EXAMPLE |
| 27 | ○ | ○ | ○ | ○ | ○ | EXAMPLE |
| 28 | | | EXPERIMENT STOPPED | | | COMPARATIVE EXAMPLE |
| 29 | ○ | ○ | ○ | ○ | ○ | EXAMPLE |
| 30 | ○ | ○ | ○ | ○ | Δ | COMPARATIVE EXAMPLE |
| 31 | ○ | ○ | ○ | ○ | ○ | EXAMPLE |
| 32 | ○ | ○ | ○ | ○ | ○ | EXAMPLE |
| 33 | ○ | ○ | X | X | ○ | COMPARATIVE EXAMPLE |
| 34 | ○ | ○ | ○ | ○ | ○ | EXAMPLE |
| 35 | ○ | ○ | ○ | ○ | ○ | EXAMPLE |
| 36 | ○ | ○ | X | X | ○ | COMPARATIVE EXAMPLE |
| 37 | ○ | ○ | ○ | ○ | ○ | EXAMPLE |
| 38 | ○ | ○ | ○ | ○ | ○ | EXAMPLE |
| 39 | ○ | ○ | ○ | ○ | ○ | EXAMPLE |
| 40 | ○ | ○ | X | X | X | COMPARATIVE EXAMPLE |
| 41 | ○ | ○ | ○ | ○ | ○ | EXAMPLE |

TABLE 13-continued

| | | | | | | |
|---|---|---|---|---|---|---|
| 42 | X | ○ | ○ | ○ | ○ | COMPARATIVE EXAMPLE |
| 43 | ○ | ○ | ○ | ○ | Δ | COMPARATIVE EXAMPLE |
| 44 | ○ | ○ | ○ | ○ | Δ | COMPARATIVE EXAMPLE |
| 45 | ○ | ○ | ○ | ○ | ○ | EXAMPLE |
| 46 | ○ | ○ | ○ | ○ | X (UNPILATING) | COMPARATIVE EXAMPLE |
| 47 | | | EXPERIMENT STOPPED | | | COMPARATIVE EXAMPLE |
| 48 | | | EXPERIMENT STOPPED | | | COMPARATIVE EXAMPLE |
| 49 | | | EXPERIMENT STOPPED | | | COMPARATIVE EXAMPLE |
| 50 | | | EXPERIMENT STOPPED | | | COMPARATIVE EXAMPLE |

TABLE 14

| EXPERIMENTAL EXAMPLE | STEEL TYPE | SHEET THICKNESS (mm) | TENSILE PROPERTIES MAXIMUM TENSILE STRENGTH TS (MPa) | TOTAL ELONGATION El (%) | HOLE EXPANDABILITY $\lambda$ (%) | $TS^{1.5} \times El \times \lambda^{0.6}$ | PLATING ADHESION |
|---|---|---|---|---|---|---|---|
| 51 | AI | 1.7 | 861 | 24 | 34 | 3535537 | ⊚ |
| 52 | AI | 1.4 | 902 | 18 | 31 | 2714958 | ⊚ |
| 53 | AI | 1.2 | 765 | 29 | 35 | 3630147 | ⊚ |
| 54 | AI | 1.2 | 733 | 18 | 26 | 1821441 | ⊚ |
| 55 | AI | 1.2 | 587 | 23 | 41 | 2094483 | ⊚ |
| 56 | AI | 0.8 | 642 | 37 | 42 | 3900578 | ○ |
| 57 | AI | 1.8 | 714 | 32 | 29 | 3287731 | ○ |
| 58 | AI | 1.4 | 628 | 34 | 39 | 3341571 | X |
| 59 | AI | 1.4 | 836 | 19 | 24 | 2249928 | ⊚ |
| 60 | AI | 1.8 | 694 | 35 | 29 | 3445928 | X |
| 61 | AJ | 0.7 | 558 | 37 | 57 | 3682057 | ⊚ |
| 62 | AJ | 2.1 | 599 | 30 | 43 | 2884003 | ⊚ |
| 63 | AJ | 0.9 | 660 | 26 | 39 | 2753097 | ⊚ |
| 64 | AJ | 1.0 | 494 | 42 | 51 | 3293251 | ⊚ |
| 65 | AJ | 1.2 | 567 | 19 | 27 | 1332938 | ⊚ |
| 66 | AJ | 1.2 | 701 | 15 | 28 | 1473151 | ⊚ |
| 67 | AJ | 1.0 | 637 | 28 | 41 | 2882432 | X |
| 68 | AJ | | | EXPERIMENT STOPPED | | | |
| 69 | AK | 1.8 | 1016 | 20 | 32 | 3663916 | ⊚ |
| 70 | AK | 2.5 | 981 | 16 | 34 | 2866573 | ⊚ |
| 71 | AK | 1.8 | 930 | 21 | 55 | 4416976 | ⊚ |
| 72 | AK | | | EXPERIMENT STOPPED | | | |
| 73 | AK | 1.8 | 920 | 19 | 27 | 2754972 | X |
| 74 | AK | 1.2 | 1033 | 9 | 19 | 1302476 | ⊚ |
| 75 | AK | 1.2 | 867 | 17 | 28 | 2296448 | ⊚ |
| 76 | AK | 1.2 | 1068 | 13 | 25 | 2268664 | ⊚ |
| 77 | AK | 1.0 | 1201 | 11 | 42 | 2967098 | ⊚ |
| 78 | AL | 1.3 | 814 | 15 | 19 | 1518465 | ⊚ |
| 79 | AL | 1.0 | 680 | 34 | 41 | 3860417 | ⊚ |
| 80 | AL | 1.4 | 666 | 26 | 29 | 2406488 | ⊚ |
| 81 | AL | 1.8 | 703 | 27 | 32 | 2846897 | ⊚ |
| 82 | AL | 2.2 | 709 | 23 | 64 | 3473659 | ⊚ |
| 83 | AL | 0.8 | 649 | 31 | 29 | 2760119 | ⊚ |
| 84 | AM | 1.3 | 580 | 27 | 37 | 2294070 | ⊚ |
| 85 | AN | 1.4 | 624 | 23 | 51 | 2560294 | ⊚ |
| 86 | AN | 1.6 | 604 | 28 | 45 | 2788173 | ⊚ |
| 87 | AN | 1.4 | 510 | 26 | 37 | 1821501 | ⊚ |
| 88 | AO | 1.3 | 1075 | 27 | 19 | 4148139 | ⊚ |
| 89 | AP | 1.3 | 362 | 32 | 95 | 2148200 | ⊚ |
| 90 | AQ | 1.0 | 449 | 25 | 52 | 1715186 | ⊚ |
| 91 | AR | 1.2 | 673 | 19 | 17 | 1357731 | ⊚ |
| 92 | AS | 1.7 | 740 | 14 | 19 | 1228436 | ⊚ |
| 93 | AT | 1.9 | 905 | 10 | 8 | 770048 | ⊚ |
| 94 | AK | 1.8 | 1000 | 20 | 35 | 3741657 | X |
| 95 | AI | 0.8 | 642 | 37 | 42 | 3900578 | X |
| 96 | AI | 0.8 | 642 | 37 | 42 | 3900578 | ○ |
| 97 | AI | 1.4 | 902 | 18 | 31 | 2714958 | ⊚ |
| 98 | AI | 1.4 | 905 | 17 | 31 | 2576930 | ⊚ |
| 99 | AI | 1.4 | 903 | 18 | 31 | 2719474 | ⊚ |

TABLE 14-continued

| EXPERIMENTAL EXAMPLE | SPOT WELDABILITY | CORROSION RESISTANCE | CHIPPING RESISTANCE | POWDERING RESISTANCE | PLATING APPEARANCE UNIFORMITY | REMARKS |
|---|---|---|---|---|---|---|
| 51 | ○ | ○ | ○ | ○ | ○ | EXAMPLE |
| 52 | ○ | ○ | ○ | ○ | ○ | EXAMPLE |
| 53 | ○ | ○ | ○ | ○ | ○ | EXAMPLE |
| 54 | ○ | ○ | ○ | ○ | ○ | EXAMPLE |
| 55 | ○ | ○ | ○ | ○ | ○ | EXAMPLE |
| 56 | ○ | ○ | ○ | ○ | ○ | EXAMPLE |
| 57 | ○ | ○ | ○ | ○ | ○ | EXAMPLE |
| 58 | ○ | ○ | X | X | ○ | COMPARATIVE EXAMPLE |
| 59 | ○ | ○ | ○ | ○ | ○ | EXAMPLE |
| 60 | ○ | ○ | X | X | Δ | COMPARATIVE EXAMPLE |
| 61 | ○ | ○ | ○ | ○ | ○ | EXAMPLE |
| 62 | ○ | ○ | ○ | ○ | ○ | EXAMPLE |
| 63 | ○ | ○ | ○ | ○ | ○ | EXAMPLE |
| 64 | ○ | ○ | ○ | ○ | ○ | EXAMPLE |
| 65 | ○ | ○ | ○ | ○ | ○ | EXAMPLE |
| 66 | ○ | ○ | ○ | ○ | ○ | EXAMPLE |
| 67 | X | ○ | ○ | ○ | ○ | COMPARATIVE EXAMPLE |
| 68 | EXPERIMENT STOPPED | | | | | COMPARATIVE EXAMPLE |
| 69 | ○ | ○ | ○ | ○ | ○ | EXAMPLE |
| 70 | ○ | ○ | ○ | ○ | ○ | EXAMPLE |
| 71 | ○ | ○ | ○ | ○ | ○ | EXAMPLE |
| 72 | EXPERIMENT STOPPED | | | | | COMPARATIVE EXAMPLE |
| 73 | ○ | ○ | ○ | ○ | X (UNPLATING | COMPARATIVE EXAMPLE |
| 74 | ○ | ○ | ○ | ○ | ○ | EXAMPLE |
| 75 | ○ | ○ | ○ | ○ | ○ | EXAMPLE |
| 76 | ○ | ○ | ○ | ○ | ○ | EXAMPLE |
| 77 | ○ | ○ | ○ | ○ | ○ | EXAMPLE |
| 78 | ○ | ○ | ○ | ○ | ○ | EXAMPLE |
| 79 | ○ | ○ | ○ | ○ | ○ | EXAMPLE |
| 80 | ○ | ○ | ○ | ○ | ○ | EXAMPLE |
| 81 | ○ | ○ | ○ | ○ | ○ | EXAMPLE |
| 82 | ○ | ○ | ○ | ○ | ○ | EXAMPLE |
| 83 | ○ | ○ | ○ | ○ | ○ | EXAMPLE |
| 84 | ○ | ○ | ○ | ○ | ○ | EXAMPLE |
| 85 | ○ | ○ | ○ | ○ | ○ | EXAMPLE |
| 86 | ○ | ○ | ○ | ○ | ○ | EXAMPLE |
| 87 | ○ | ○ | ○ | ○ | ○ | EXAMPLE |
| 88 | X | ○ | ○ | ○ | ○ | COMPARATIVE EXAMPLE |
| 89 | ○ | ○ | ○ | ○ | ○ | COMPARATIVE EXAMPLE |
| 90 | ○ | ○ | ○ | ○ | ○ | COMPARATIVE EXAMPLE |
| 91 | ○ | ○ | ○ | ○ | ○ | COMPARATIVE EXAMPLE |
| 92 | ○ | ○ | ○ | ○ | ○ | COMPARATIVE EXAMPLE |
| 93 | ○ | ○ | ○ | ○ | ○ | COMPARATIVE EXAMPLE |
| 94 | ○ | ○ | ○ | ○ | ○ | COMPARATIVE EXAMPLE |
| 95 | ○ | ○ | X | X | X | COMPARATIVE EXAMPLE |
| 96 | ○ | ○ | ○ | ○ | ○ | EXAMPLE |
| 97 | ○ | ○ | ○ | ○ | Δ | COMPARATIVE EXAMPLE |
| 98 | ○ | ○ | ○ | ○ | ○ | EXAMPLE |
| 99 | ○ | ○ | ○ | ○ | Δ | COMPARATIVE EXAMPLE |

In Experimental Example 64 and Experimental Example 86 in which the effective Al amount is 0.180%, the Fe—Al alloy layer was generated uniformly in the width direction and the decrease in plating adhesion described in the aforesaid Patent Literature 12 did not occur.

In Experimental Example 3, due to the very low effective Al concentration in the plating bath the Fe—Al alloy layer was not formed and the Fe content in the hot-dip galvanizing layer excessively increased, resulting in insufficient plating adhesion, chipping resistance, powdering resistance, and appearance uniformity of the plating.

In Experimental Example 6, since the flatness of the steel sheet was poor due to no cold rolling applied to the hot-rolled steel sheet, the annealing could not be performed and the experiment was stopped.

In Experimental Example 20, due to the low cooling rate after the plating, the Fe content in the hot-dip galvanizing layer excessively increased, resulting in insufficient plating adhesion, chipping resistance, and powdering resistance.

In Experimental Example 26, due to the low heating rate in the annealing, the growth of oxides in the base steel sheet excessively progressed, and coarse oxides serving as starting points of breakage were generated in the surface of the base steel sheet, resulting in poor plating adhesion and powdering resistance.

In Experimental Example 28, since the steel sheet fractured due to the excessively large reduction ratio of the cold rolling, the experiment was stopped.

In Experimental Example 33, due to large $Log(P(H_2O)/P(H_2))$ in the soaking zone, the fine-grain layer in the surface layer of the base steel sheet became excessively thick, the alloying in which a Zn—Fe alloy is generated excessively progressed in the hot-dip galvanizing layer, and the Fe content in the hot-dip galvanizing layer increased, resulting in poor plating adhesion, chipping resistance, and powdering resistance.

In Experimental Example 36, since the decarburization in the surface of the steel sheet excessively progressed due to the large air ratio in the preheating zone, the average thickness of the fine-grain layer became large, the alloying in which the Zn—Fe alloy is generated excessively progressed in the hot-dip galvanizing layer, and the Fe content in the hot-dip galvanizing layer increased, resulting in poor plating adhesion, chipping resistance, and powdering resistance.

In Experimental Example 40, due to the low effective Al concentration in the plating bath, the Fe—Al alloy layer with a sufficient thickness was not generated and the Fe content in the hot-dip galvanizing layer excessively increased, resulting in insufficient plating adhesion, chipping resistance, powdering resistance, appearance uniformity of the plating.

In Experimental Example 42, due to the high effective Al concentration in the plating bath, the Al content in the hot-dip galvanizing layer excessively increased and the Fe—Al alloy layer with an excessively large thickness was generated, resulting in insufficient plating adhesion and spot weldability.

In Experimental Example 46, due to small $Log(P(H_2O)/P(H_2))$ in the soaking zone, unplating occurred, resulting in poor plating adhesion. In Experimental Example 46, the fine-grain layer was not formed, the average grain diameter of the ferrite phases in the surface of the base steel sheet was 3.6 μm, and the maximum value of the diameters of the oxides inside the steel sheet in a range up to a 0.5 μm depth from the surface was less than 0.01 μm.

In Experimental Example 47, since the slab cracked during the cooling in the casting due to the large Si content, the experiment was discontinued.

In Experimental Example 48, since the slab cracked during the heating in the hot rolling due to the large Mn content, the experiment was discontinued.

In Experimental Example 49, since the slab cracked during the heating in the hot rolling due to the large P content, the experiment was discontinued.

In Experimental Example 50, since the slab cracked during the cooling in the casting due to the large Al content, the experiment was discontinued.

In Experimental Example 54, due to the low maximum heating temperature in the annealing, the retained austenite was not generated, and the coarse cementite was present in large number in the steel sheet, resulting in poor $TS^{1.5} \times El \times \lambda^{0.5}$ and insufficient properties.

In Experimental Example 55, due to the low average cooling rate from 750° C. to 700° C., a large amount of a carbide was generated and the retained austenite was not obtained, resulting in a poor balance between strength and formability.

In Experimental Example 58, due to the high bainite transformation treatment temperature after the plating, the Fe content in the hot-dip galvanizing layer increased, resulting in poor plating adhesion, chipping resistance, and powdering resistance.

In Experimental Example 59, due to the short bainite transformation treatment time before the plating, the bainite transformation did not progress sufficiently and the retained austenite was not obtained, resulting in a poor balance between strength and formability.

In Experimental Example 60, due to the excessively small effective Al amount in the plating bath, the Fe—Al alloy layer with a sufficient thickness was not generated and the Fe content in the hot-dip galvanizing layer excessively increased, resulting in poor plating adhesion, chipping resistance, and powdering resistance.

In Experimental Example 65, due to the low average cooling rate from 700° C. to 500° C., a large amount of a carbide was generated and the retained austenite was not obtained, resulting in a poor balance between strength and formability.

In Experimental Example 66, due to the low bainite transformation treatment temperature after the plating, the progress of the bainite transformation was excessively restrained and the retained austenite was not obtained, resulting in a poor balance between strength and formability.

In Experimental Example 67, due to the high effective Al concentration in the plating bath, the Al content in the hot-dip galvanizing layer excessively increased and the Fe—Al alloy layer with an excessively large thickness was generated, resulting in insufficient plating adhesion and spot weldability.

In Experimental Example 68, since the shape of the steel sheet was greatly worsened due to the low completion temperature of the hot rolling, the experiment was stopped.

In Experimental Example 72, since the steel sheet fractured in the cold rolling due to the low coiling temperature, the experiment was stopped.

In Experimental Example 73, due to small $Log(P(H_2O)/P(H_2))$ in the preheating zone, unplating occurred and the grain diameter in the surface layer was not miniaturized, resulting in poor plating adhesion. In Experimental Example 73, the fine-grain layer was not formed, the average grain diameter of the ferrite phases in the surface of the base steel sheet was 3.3 μm, and the maximum diameter of the oxides in the inner portion of the steel sheet in a range up to a 0.5 μm depth from the surface was less than 0.01 μm.

In Experimental Example 74, the bainite transformation treatment was applied neither before the plating nor after the plating and the retained austenite was not obtained, resulting in a poor balance between strength and formability.

In Experimental Example 75, due to the high bainite transformation treatment temperature before the plating, a large amount of a carbide was generated and the retained austenite was not obtained, resulting in a poor balance between strength and formability.

In Experimental Example 76, due to the low bainite transformation treatment temperature before the plating, the progress of the bainite transformation was excessively restrained and the retained austenite was not obtained, resulting in a poor balance between strength and formability.

In Experimental Example 78, due to the maximum heating temperature lower than Ac1+50° C. in the annealing, the retained austenite was not generated and the coarse cementite was present in large number in the steel sheet, resulting in poor $TS^{1.5} \times El \times \lambda^{0.5}$ and insufficient properties.

In Experimental Example 80, due to the small sum of the bainite transformation treatment time before the plating and the bainite transformation treatment time after the plating, the bainite transformation did not progress sufficiently and the retained austenite was not obtained, resulting in a poor balance between strength and formability.

In Experimental Example 84, since the Si content and the Al content did not satisfy Formula (1), a large amount of a carbide was generated and the retained austenite was not obtained, resulting in a poor balance between strength and formability.

In Experimental Example 87, due to the long bainite transformation treatment time before the plating, a large amount of a carbide was generated and the retained austenite was not obtained, resulting in a poor balance between strength and formability.

In Experimental Example 88, due to the large C content, spot weldability and formability were poor.

In Experimental Example 89, due to the small C content, the retained austenite was not generated and a volume fraction of a hard phase was small, resulting in insufficient tensile strength.

In Experimental Example 90, due to the small Mn content, large amounts of pearlite and coarse cementite were generated in the annealing and the plating and the retained austenite was not generated, resulting in insufficient tensile strength and formability of the steel sheet.

In Experimental Example 91, due to the large S content, a large amount of a coarse sulfide was generated, resulting in poor ductility and hole expandability.

In Experimental Example 92, due to the large N content, a large amount of a coarse nitride was generated, resulting in poor ductility and hole expandability.

In Experimental Example 93, due to the large O content, a large amount of coarse oxides was generated, resulting in poor ductility and hole expandability.

In Experimental Example 94, due to the high preheating completion temperature, the growth of oxides in the base steel sheet excessively progressed and coarse oxides serving as starting points of breakage were generated in the surface of the steel sheet, resulting in poor plating adhesion.

In Experimental Example 95, due to large $Log(P(H_2O)/P(H_2))$ in the preheating zone, the fine-grain layer in the surface layer of the base steel sheet became excessively thick, the alloying in which the Zn—Fe alloy is generated excessively progressed in the hot-dip galvanizing layer, and the Fe content in the hot-dip galvanizing layer increased, resulting in poor plating adhesion, chipping resistance, and powdering resistance. Further, the difference between the maximum value and the minimum value of the thickness of the Fe—Al alloy layer in the width direction of the steel sheet was more than 0.5 μm, resulting in nonuniform plating appearance.

In Experimental Example 10, Experimental Example 22, Experimental Example 30, Experimental Example 43, and Experimental Example 44, due to the coiling temperature of 650° C. or higher, the difference between the maximum value and the minimum value of the thickness of the Fe—Al alloy layer in the width direction of the steel sheet was more than 0.5 μm, resulting in slightly nonuniform plating appearance. Further, the difference between the maximum value and the minimum value of the thickness of the fine-grain layer in the width direction of the steel sheet was more than 2.0 μm. In Experimental Example 11 and Experimental Example 45, though the coiling temperature was 650° C. or higher, owing to the long acid pickling time, a difference between the maximum value and the minimum value of the thickness of the fine-grain layer in the width direction of the steel sheet fell within 2.0 μm, resulting in good plating appearance uniformity. In Example 97, though the coiling temperature was lower than 650° C., due to the short acid pickling time of 15 seconds, it was not possible to completely remove the nonuniformly generated internal oxide layer and the difference between the maximum value and the minimum value of the thickness of the fine-grain layer in the width direction of the steel sheet became more than 2.0 μm, resulting in slightly nonuniform plating appearance. In Experimental Example 99, due to the average heating rate of higher than 50° C./second in the preheating zone, the difference between the maximum value and the minimum value of the thickness of the Fe—Al alloy layer in the width direction of the steel sheet was more than 0.5 μm and the difference between the maximum value and the minimum value of the thickness of the fine-grain layer in the width direction of the steel sheet was more than 2.0 μm, resulting in slightly nonuniform plating appearance.

INDUSTRIAL APPLICABILITY

The present invention is usable in industries relating to a hot-dip galvanized steel sheet suitable, for example, as outer panels and so on of automobiles.

The invention claimed is:
1. A hot-dip galvanized steel sheet comprising a hot-dip galvanizing layer on at least one side of a base steel sheet, wherein the base steel sheet has a chemical composition comprised by, in mass %,
C: 0.040% to 0.400%,
Si: 0.05% to 2.50%,
Mn: 0.50% to 3.50%,
P: 0.0001% to 0.1000%,
S: 0.0001% to 0.0100%,
Al: 0.001% to 1.500%,
N: 0.0001% to 0.0100%,
O: 0.0001% to 0.0100%,
Ti: 0.000% to 0.150%,
Nb: 0.000% to 0.100%,
V: 0.000% to 0.300%,
Cr: 0.00% to 2.00%,
Ni: 0.00% to 2.00%,
Cu: 0.00% to 2.00%,

Mo: 0.00% to 2.00%,
B: 0.0000% to 0.0100%,
W: 0.00% to 2.00%,
Ca, Ce, Mg, Zr, La, and REM: 0.0000% to 0.0100% in total, and
the balance: Fe and an impurity, and
wherein the hot-dip galvanizing layer has a Fe content of more than 0% and 3.0% or less and an Al content of more than 0% and 1.0% or less,
the hot-dip galvanized steel sheet comprising:
a Fe—Al alloy layer provided on an interface between the hot-dip galvanizing layer and the base steel sheet,
the Fe—Al alloy layer having a thickness of 0.1 μm to 2.0 μm, and
a difference between a maximum value and a minimum value of the thickness of the Fe—Al alloy layer in a width direction of the base steel sheet being within 0.5 μm; and
a fine-grain layer provided in the base steel sheet and directly in contact with the Fe—Al alloy layer,
the fine-grain layer having an average thickness of 0.1 μm to 5.0 μm,
the fine-grain layer including a ferrite phase with an average grain diameter of 0.1 μm to 3.0 μm,
the fine-grain layer containing oxides of one or more out of Si and Mn,
a maximum diameter of the oxides being 0.01 μm to 0.4 μm, and
a difference between a maximum value and a minimum value of the thickness of the fine-grain layer in the width direction of the base steel sheet being within 2.0 μm.

2. The hot-dip galvanized steel sheet according to claim 1, wherein a plating deposition amount of the hot-dip galvanizing layer on at least one side of the base steel sheet is 10 g/m² or more and 100 g/m² or less.

3. The hot-dip galvanized steel sheet according to claim 2, wherein, in the chemical composition, one of or any combination of
Ti: 0.001% to 0.150%,
Nb: 0.001% to 0.100%,
V: 0.001% to 0.300%,
Cr: 0.01% to 2.00%,
Ni: 0.01% to 2.00%,
Cu: 0.01% to 2.00%,
Mo: 0.01% to 2.00%,
B: 0.0001% to 0.0100%,
W: 0.01% to 2.00%, and
Ca, Ce, Mg, Zr, La, and REM: 0.0001% to 0.0100% in total is satisfied.

4. The hot-dip galvanized steel sheet according to claim 1, wherein, in the chemical composition, one of or any combination of
Ti: 0.001% to 0.150%,
Nb: 0.001% to 0.100%,
V: 0.001% to 0.300%,
Cr: 0.01% to 2.00%,
Ni: 0.01% to 2.00%,
Cu: 0.01% to 2.00%,
Mo: 0.01% to 2.00%,
B: 0.0001% to 0.0100%,
W: 0.01% to 2.00%, and
Ca, Ce, Mg, Zr, La, and REM: 0.0001% to 0.0100% in total is satisfied.

5. The hot-dip galvanized steel sheet according to claim 1, wherein the base steel sheet satisfies Formula 1 below, where [Si] is a Si content (mass %) and [Al] is an Al content (mass %), and
wherein a volume fraction of retained austenite is 1% or more in a ⅛ thickness to ⅜ thickness range whose middle is a ¼ thickness of a total thickness of the base steel sheet from a surface of the base steel sheet, $$[Si]+0.7[Al] \geq 0.30 \qquad \text{(Formula 1)}.$$

6. The hot-dip galvanized steel sheet according to claim 5, wherein, in the chemical composition, one of or any combination of
Ti: 0.001% to 0.150%,
Nb: 0.001% to 0.100%,
V: 0.001% to 0.300%,
Cr: 0.01% to 2.00%,
Ni: 0.01% to 2.00%,
Cu: 0.01% to 2.00%,
Mo: 0.01% to 2.00%,
B: 0.0001% to 0.0100%,
W: 0.01% to 2.00%, and
Ca, Ce, Mg, Zr, La, and REM: 0.0001% to 0.0100% in total is satisfied.

7. The hot-dip galvanized steel sheet according to claim 5, wherein a plating deposition amount of the hot-dip galvanizing layer on at least one side of the base steel sheet is 10 g/m² or more and 100 g/m² or less.

8. The hot-dip galvanized steel sheet according to claim 7, wherein, in the chemical composition, one of or any combination of
Ti: 0.001% to 0.150%,
Nb: 0.001% to 0.100%,
V: 0.001% to 0.300%,
Cr: 0.01% to 2.00%,
Ni: 0.01% to 2.00%,
Cu: 0.01% to 2.00%,
Mo: 0.01% to 2.00%,
B: 0.0001% to 0.0100%,
W: 0.01% to 2.00%, and
Ca, Ce, Mg, Zr, La, and REM: 0.0001% to 0.0100% in total is satisfied.

* * * * *